United States Patent
Caffaro et al.

(10) Patent No.: US 12,491,254 B2
(45) Date of Patent: Dec. 9, 2025

(54) INTERLEUKIN 10 CONJUGATES AND USES THEREOF

(71) Applicant: Synthorx, Inc., La Jolla, CA (US)

(72) Inventors: Carolina E. Caffaro, La Jolla, CA (US); Jerod Ptacin, La Jolla, CA (US); Marcos Milla, La Jolla, CA (US)

(73) Assignee: SYNTHORX, INC., Morristown, NJ (US)

( * ) Notice: Subject to any disclaimer, the term of this patent is extended or adjusted under 35 U.S.C. 154(b) by 971 days.

(21) Appl. No.: 17/313,579

(22) Filed: May 6, 2021

(65) Prior Publication Data

US 2021/0338829 A1    Nov. 4, 2021

Related U.S. Application Data

(63) Continuation of application No. PCT/US2019/060261, filed on Nov. 7, 2019.

(60) Provisional application No. 62/911,036, filed on Oct. 4, 2019, provisional application No. 62/757,690, filed on Nov. 8, 2018.

(51) Int. Cl.
A61K 47/64        (2017.01)
A61K 47/60        (2017.01)
C07K 14/54        (2006.01)

(52) U.S. Cl.
CPC ............ *A61K 47/642* (2017.08); *A61K 47/60* (2017.08); *C07K 14/5428* (2013.01)

(58) Field of Classification Search
CPC .............. A61K 38/2066; A61K 47/545; A61K 47/642; A61K 47/60; C07K 14/5428
See application file for complete search history.

(56) References Cited

U.S. PATENT DOCUMENTS

| | | |
|---|---|---|
| 3,687,808 A | 8/1972 | Merigan, Jr. et al. |
| 4,469,863 A | 9/1984 | Ts'o et al. |
| 4,476,301 A | 10/1984 | Imbach et al. |
| 4,587,044 A | 5/1986 | Miller et al. |
| 4,605,735 A | 8/1986 | Miyoshi et al. |
| 4,667,025 A | 5/1987 | Miyoshi et al. |
| 4,762,779 A | 8/1988 | Snitman |
| 4,789,737 A | 12/1988 | Miyoshi et al. |
| 4,824,941 A | 4/1989 | Gordon et al. |
| 4,828,979 A | 5/1989 | Klevan et al. |
| 4,835,263 A | 5/1989 | Nguyen et al. |
| 4,845,205 A | 7/1989 | Dinh et al. |
| 4,849,513 A | 7/1989 | Smith et al. |
| 4,876,335 A | 10/1989 | Yamane et al. |
| 4,904,582 A | 2/1990 | Tullis |
| 4,910,300 A | 3/1990 | Urdea et al. |
| 4,948,882 A | 8/1990 | Ruth |
| 4,958,013 A | 9/1990 | Letsinger |
| 4,981,957 A | 1/1991 | Lebleu et al. |
| 5,015,733 A | 5/1991 | Smith et al. |
| 5,023,243 A | 6/1991 | Tullis |
| 5,034,506 A | 7/1991 | Summerton et al. |
| 5,082,830 A | 1/1992 | Brakel et al. |
| 5,093,232 A | 3/1992 | Urdea et al. |
| 5,109,124 A | 4/1992 | Ramachandran et al. |
| 5,112,963 A | 5/1992 | Pieles et al. |
| 5,118,800 A | 6/1992 | Smith et al. |
| 5,118,802 A | 6/1992 | Smith et al. |
| 5,130,302 A | 7/1992 | Spielvogel et al. |
| 5,134,066 A | 7/1992 | Rogers et al. |
| 5,138,045 A | 8/1992 | Cook et al. |
| 5,166,315 A | 11/1992 | Summerton et al. |
| 5,175,273 A | 12/1992 | Bischofberger et al. |
| 5,177,196 A | 1/1993 | Meyer, Jr. et al. |
| 5,185,444 A | 2/1993 | Summerton et al. |
| 5,188,897 A | 2/1993 | Suhadolnik et al. |
| 5,214,134 A | 5/1993 | Weis et al. |
| 5,214,136 A | 5/1993 | Lin et al. |
| 5,216,141 A | 6/1993 | Benner |
| 5,218,105 A | 6/1993 | Cook et al. |
| 5,235,033 A | 8/1993 | Summerton et al. |
| 5,245,022 A | 9/1993 | Weis et al. |
| 5,254,469 A | 10/1993 | Warren, III et al. |
| 5,258,506 A | 11/1993 | Urdea et al. |
| 5,262,536 A | 11/1993 | Hobbs, Jr. |
| 5,264,423 A | 11/1993 | Cohen et al. |
| 5,264,564 A | 11/1993 | Matteucci |
| 5,272,250 A | 12/1993 | Spielvogel et al. |
| 5,276,019 A | 1/1994 | Cohen et al. |
| 5,278,302 A | 1/1994 | Caruthers et al. |

(Continued)

FOREIGN PATENT DOCUMENTS

| | | |
|---|---|---|
| EP | 0614907 A1 | 9/1994 |
| EP | 0629633 A2 | 12/1994 |

(Continued)

OTHER PUBLICATIONS

Vanbrunt et al. Genetically Encoded Azide Containing Amino Acid in Mammalian Cells Enables Site-Specific Antibody-Drug Conjugates Using Click Cycloaddition Chemistry. Bioconjug Chem. Nov. 18, 2015;26(11):2249-60 (Year: 2015).*
Beigelman et al., Synthesis of 5'-C-Methyl-D-allo- & L-Talo-ribonucleoside 3'-O-Phosphoramidites & Their Incorporation into Hammerhead Ribozymes, Nucleosides & Nucleotides, vol. 14(3-5), pp. 901-905, 1995.
Betz et al., Structural insights into DNA replication without hydrogen bonds, J Am Chem Soc, vol. 135, pp. 18637-18643, 2013.
Bohringer et al., Synthesis of 5'-deoxy-5'-methylphosphonate linked thymidine oligonucleotides, Tet Lett, vol. 34, pp. 2723-2726, 1993.
Braasch et al., Locked nucleic acid (LNA): fine-tuning the recognition of DNA and RNA, Chem Bio, vol. 8:1-7, 2001.

(Continued)

*Primary Examiner* — Vanessa L. Ford
*Assistant Examiner* — Sandra Carter
(74) *Attorney, Agent, or Firm* — McNeill PLLC

(57) ABSTRACT

Disclosed herein are interleukin 10 conjugates and uses in the treatment of one or more indications. Also described herein are pharmaceutical compositions and kits comprising one or more of the IL-10 conjugates.

18 Claims, 7 Drawing Sheets

Specification includes a Sequence Listing.

(56) References Cited

U.S. PATENT DOCUMENTS

| | | |
|---|---|---|
| 5,286,717 A | 2/1994 | Cohen et al. |
| 5,292,873 A | 3/1994 | Rokita et al. |
| 5,317,098 A | 5/1994 | Shizuya et al. |
| 5,319,080 A | 6/1994 | Leumann |
| 5,321,131 A | 6/1994 | Agrawal et al. |
| 5,359,044 A | 10/1994 | Cook et al. |
| 5,367,066 A | 11/1994 | Urdea et al. |
| 5,371,241 A | 12/1994 | Brush |
| 5,391,723 A | 2/1995 | Priest |
| 5,393,878 A | 2/1995 | Leumann |
| 5,399,676 A | 3/1995 | Froehler |
| 5,405,938 A | 4/1995 | Summerton et al. |
| 5,405,939 A | 4/1995 | Suhadolnik et al. |
| 5,414,077 A | 5/1995 | Lin et al. |
| 5,416,203 A | 5/1995 | Letsinger |
| 5,432,272 A | 7/1995 | Benner |
| 5,434,257 A | 7/1995 | Matteucci et al. |
| 5,446,137 A | 8/1995 | Maag et al. |
| 5,451,463 A | 9/1995 | Nelson et al. |
| 5,453,496 A | 9/1995 | Caruthers et al. |
| 5,455,233 A | 10/1995 | Spielvogel et al. |
| 5,457,187 A | 10/1995 | Gmeiner et al. |
| 5,459,255 A | 10/1995 | Cook et al. |
| 5,466,677 A | 11/1995 | Baxter et al. |
| 5,466,786 A | 11/1995 | Buhr et al. |
| 5,470,967 A | 11/1995 | Huie et al. |
| 5,476,925 A | 12/1995 | Letsinger et al. |
| 5,484,908 A | 1/1996 | Froehler et al. |
| 5,489,677 A | 2/1996 | Sanghvi et al. |
| 5,502,177 A | 3/1996 | Matteucci et al. |
| 5,510,475 A | 4/1996 | Agrawal et al. |
| 5,512,439 A | 4/1996 | Hornes et al. |
| 5,512,667 A | 4/1996 | Reed et al. |
| 5,514,785 A | 5/1996 | Ness et al. |
| 5,519,126 A | 5/1996 | Hecht |
| 5,519,134 A | 5/1996 | Acevedo et al. |
| 5,525,465 A | 6/1996 | Haralambidis et al. |
| 5,525,711 A | 6/1996 | Hawkins et al. |
| 5,536,821 A | 7/1996 | Agrawal et al. |
| 5,539,082 A | 7/1996 | Nielsen et al. |
| 5,541,306 A | 7/1996 | Agrawal et al. |
| 5,541,307 A | 7/1996 | Cook et al. |
| 5,541,313 A | 7/1996 | Ruth |
| 5,545,730 A | 8/1996 | Urdea et al. |
| 5,550,111 A | 8/1996 | Suhadolnik et al. |
| 5,552,538 A | 9/1996 | Urdea et al. |
| 5,552,540 A | 9/1996 | Haralambidis |
| 5,561,225 A | 10/1996 | Maddry et al. |
| 5,563,253 A | 10/1996 | Agrawal et al. |
| 5,565,552 A | 10/1996 | Magda et al. |
| 5,567,810 A | 10/1996 | Weis et al. |
| 5,567,811 A | 10/1996 | Misiura et al. |
| 5,571,799 A | 11/1996 | Tkachuk et al. |
| 5,574,142 A | 11/1996 | Meyer, Jr. et al. |
| 5,576,427 A | 11/1996 | Cook et al. |
| 5,578,717 A | 11/1996 | Urdea et al. |
| 5,578,718 A | 11/1996 | Cook et al. |
| 5,580,731 A | 12/1996 | Chang et al. |
| 5,585,481 A | 12/1996 | Arnold, Jr. et al. |
| 5,587,361 A | 12/1996 | Cook et al. |
| 5,587,371 A | 12/1996 | Sessler et al. |
| 5,587,469 A | 12/1996 | Cook et al. |
| 5,591,584 A | 1/1997 | Chang et al. |
| 5,591,722 A | 1/1997 | Montgomery et al. |
| 5,594,121 A | 1/1997 | Froehler et al. |
| 5,595,726 A | 1/1997 | Magda et al. |
| 5,596,086 A | 1/1997 | Matteucci et al. |
| 5,596,091 A | 1/1997 | Switzer |
| 5,597,696 A | 1/1997 | Linn et al. |
| 5,597,909 A | 1/1997 | Urdea et al. |
| 5,599,923 A | 2/1997 | Sessler et al. |
| 5,599,928 A | 2/1997 | Hemmi et al. |
| 5,602,240 A | 2/1997 | Mesmaeker et al. |
| 5,608,046 A | 3/1997 | Cook et al. |
| 5,610,289 A | 3/1997 | Cook et al. |
| 5,610,300 A | 3/1997 | Altmann et al. |
| 5,614,617 A | 3/1997 | Cook et al. |
| 5,618,704 A | 4/1997 | Sanghvi et al. |
| 5,623,070 A | 4/1997 | Cook et al. |
| 5,625,050 A | 4/1997 | Beaton et al. |
| 5,627,053 A | 5/1997 | Usman et al. |
| 5,633,360 A | 5/1997 | Bischofberger et al. |
| 5,639,873 A | 6/1997 | Barascut et al. |
| 5,645,985 A | 7/1997 | Froehler et al. |
| 5,646,265 A | 7/1997 | McGee |
| 5,658,873 A | 8/1997 | Bertsch-Frank et al. |
| 5,663,312 A | 9/1997 | Chaturvedula |
| 5,670,633 A | 9/1997 | Cook et al. |
| 5,677,437 A | 10/1997 | Teng et al. |
| 5,677,439 A | 10/1997 | Weis et al. |
| 5,681,941 A | 10/1997 | Cook et al. |
| 5,688,941 A | 11/1997 | Cook et al. |
| 5,714,331 A | 2/1998 | Buchardt et al. |
| 5,719,262 A | 2/1998 | Buchardt et al. |
| 5,750,692 A | 5/1998 | Cook et al. |
| 5,763,588 A | 6/1998 | Matteucci et al. |
| 5,830,653 A | 11/1998 | Froehler et al. |
| 6,005,096 A | 12/1999 | Matteucci et al. |
| 6,268,490 B1 | 7/2001 | Imanishi et al. |
| 6,525,191 B1 | 2/2003 | Ramasamy |
| 6,670,461 B1 | 12/2003 | Wengel et al. |
| 6,770,748 B2 | 8/2004 | Imanishi et al. |
| 6,794,499 B2 | 9/2004 | Wengel et al. |
| 6,955,807 B1 | 10/2005 | Shanafelt et al. |
| 7,034,133 B2 | 4/2006 | Wengel et al. |
| 7,053,207 B2 | 5/2006 | Wengel |
| 7,399,845 B2 | 7/2008 | Seth et al. |
| 7,427,672 B2 | 9/2008 | Imanishi et al. |
| 7,744,861 B2 | 6/2010 | Zhao et al. |
| 7,803,777 B2 | 9/2010 | DeFrees |
| 8,012,465 B2 | 9/2011 | Elias et al. |
| 8,273,833 B2 | 9/2012 | Bentley et al. |
| 8,426,569 B2 | 4/2013 | Hirao et al. |
| 8,501,805 B2 | 8/2013 | Seth et al. |
| 8,546,556 B2 | 10/2013 | Seth et al. |
| 8,778,631 B2 | 7/2014 | Voloshin et al. |
| 9,089,614 B2 | 7/2015 | Lin et al. |
| 9,682,934 B2 | 6/2017 | Stafford et al. |
| 9,732,134 B2 | 8/2017 | Gavin et al. |
| 9,840,493 B2 | 12/2017 | Yang et al. |
| 9,861,705 B2 | 1/2018 | Bossard et al. |
| 9,938,516 B2 | 4/2018 | Zimmerman et al. |
| 9,988,619 B2 | 6/2018 | Zimmerman et al. |
| 10,610,571 B2 | 4/2020 | Ptacin et al. |
| 10,851,144 B2 | 12/2020 | Butz et al. |
| 10,960,079 B2 | 3/2021 | Bossard et al. |
| 11,077,195 B2 | 8/2021 | Ptacin et al. |
| 11,622,993 B2 | 4/2023 | Ptacin et al. |
| 11,701,407 B2 | 7/2023 | Ptacin et al. |
| 2004/0171570 A1 | 9/2004 | Allerson et al. |
| 2005/0130923 A1 | 6/2005 | Bhat et al. |
| 2006/0074035 A1 | 4/2006 | Hong et al. |
| 2007/0287831 A1 | 12/2007 | Seth et al. |
| 2008/0039618 A1 | 2/2008 | Allerson et al. |
| 2010/0316595 A1 | 12/2010 | Elias et al. |
| 2014/0315245 A1 | 10/2014 | Yam et al. |
| 2015/0038678 A1* | 2/2015 | Eaton ............... C07K 14/5428 530/351 |
| 2017/0260137 A1 | 9/2017 | Stafford et al. |
| 2017/0283469 A1 | 10/2017 | Thanos et al. |
| 2017/0313753 A1 | 11/2017 | Gavin et al. |
| 2018/0051065 A1 | 2/2018 | Yin |
| 2020/0181220 A1 | 6/2020 | Ptacin et al. |
| 2020/0188484 A1 | 6/2020 | Ptacin et al. |
| 2020/0231644 A1 | 7/2020 | Ptacin et al. |
| 2020/0299349 A1 | 9/2020 | Garcia et al. |
| 2020/0330601 A1 | 10/2020 | Ptacin et al. |
| 2020/0399338 A1 | 12/2020 | Caffaro et al. |
| 2021/0023230 A1 | 1/2021 | Bossard et al. |
| 2021/0024602 A1 | 1/2021 | Sprogoe et al. |
| 2021/0046160 A1 | 2/2021 | Ptacin et al. |
| 2021/0054040 A1 | 2/2021 | Caffaro et al. |
| 2021/0060169 A1 | 3/2021 | Ikeda et al. |
| 2021/0070827 A1 | 3/2021 | Ptacin et al. |

(56) References Cited

U.S. PATENT DOCUMENTS

| | | |
|---|---|---|
| 2021/0139554 A1 | 5/2021 | Butz et al. |
| 2021/0196796 A1 | 7/2021 | Penaflor-Aspuria et al. |
| 2021/0221863 A1 | 7/2021 | Kang et al. |
| 2022/0016249 A1 | 1/2022 | Ptacin et al. |
| 2022/0016252 A1 | 1/2022 | Abbadessa et al. |
| 2022/0273767 A1 | 9/2022 | Caffaro et al. |
| 2022/0324792 A1 | 10/2022 | Aerni et al. |
| 2023/0277627 A1 | 9/2023 | Caffaro et al. |
| 2023/0302089 A1 | 9/2023 | Caffaro et al. |
| 2023/0416327 A1 | 12/2023 | Caffaro et al. |
| 2024/0082359 A1 | 3/2024 | Ptacin et al. |

FOREIGN PATENT DOCUMENTS

| | | |
|---|---|---|
| EP | 2382228 A1 | 11/2011 |
| EP | 3280725 A2 | 2/2018 |
| RU | 2015149387 A | 5/2017 |
| WO | 9213869 A1 | 8/1992 |
| WO | 9422890 A1 | 10/1994 |
| WO | 9735869 A1 | 10/1997 |
| WO | 9914226 A2 | 3/1999 |
| WO | 9962923 A2 | 12/1999 |
| WO | 0105801 A1 | 1/2001 |
| WO | 02070533 A2 | 9/2002 |
| WO | 2004007713 A1 | 1/2004 |
| WO | 2004044006 A1 | 5/2004 |
| WO | 2004106356 A1 | 12/2004 |
| WO | 2005021570 A1 | 3/2005 |
| WO | 2005026187 A1 | 3/2005 |
| WO | 2004089421 A3 | 5/2005 |
| WO | 2006049297 A1 | 5/2006 |
| WO | 2007015557 A1 | 2/2007 |
| WO | 2007066737 A1 | 6/2007 |
| WO | 2007090071 A2 | 8/2007 |
| WO | 2007134181 A3 | 1/2008 |
| WO | 2008101157 A1 | 8/2008 |
| WO | 2008106186 A2 | 9/2008 |
| WO | 2009006478 A2 | 1/2009 |
| WO | 2008150729 A3 | 3/2009 |
| WO | 2008154401 A3 | 3/2009 |
| WO | 2009123216 A1 | 10/2009 |
| WO | 2011043385 A1 | 4/2011 |
| WO | 2011139699 A3 | 7/2013 |
| WO | 2013130913 A1 | 9/2013 |
| WO | 2014172392 A1 | 10/2014 |
| WO | 2015021432 A1 | 2/2015 |
| WO | 2015038426 A1 | 3/2015 |
| WO | 2014204816 A2 | 8/2015 |
| WO | 2015157555 | 3/2016 |
| WO | 2016115168 A1 | 7/2016 |
| WO | 2017035232 A1 | 3/2017 |
| WO | 2017106767 A1 | 6/2017 |
| WO | 2017223528 A1 | 12/2017 |
| WO | 2019014262 A1 | 1/2019 |
| WO | 2019014267 A1 | 1/2019 |
| WO | 2019028419 A1 | 2/2019 |
| WO | 2019028425 A1 | 2/2019 |
| WO | 2019165453 A1 | 8/2019 |
| WO | 2020020783 A1 | 1/2020 |
| WO | 2020056066 A1 | 3/2020 |
| WO | 2020082057 A1 | 4/2020 |
| WO | 2020097325 A1 | 5/2020 |
| WO | 2020146221 A1 | 7/2020 |
| WO | 2020163532 A1 | 8/2020 |
| WO | 2020201095 A1 | 10/2020 |
| WO | 2020219943 A1 | 10/2020 |
| WO | 2020252418 A2 | 12/2020 |
| WO | 2021030374 A1 | 2/2021 |
| WO | 2021030483 A1 | 2/2021 |
| WO | 2021030602 A1 | 2/2021 |
| WO | 2021030706 A1 | 2/2021 |
| WO | 2021041206 A1 | 3/2021 |
| WO | 2021050554 A1 | 3/2021 |
| WO | 2021091986 A1 | 5/2021 |
| WO | 2021093633 A1 | 5/2021 |
| WO | 2021133839 A1 | 7/2021 |
| WO | 2021140416 A2 | 7/2021 |
| WO | 2021263026 A1 | 12/2021 |
| WO | 2022076853 A1 | 4/2022 |
| WO | 2022076859 A1 | 4/2022 |
| WO | 2022174101 A1 | 8/2022 |
| WO | 2022256538 A1 | 12/2022 |
| WO | 2023122750 A1 | 6/2023 |
| WO | 2023137401 A1 | 7/2023 |

OTHER PUBLICATIONS

Chattopadhyay et al., Structural Basis of Inducible Costimulator Ligand Costimulatory Function: State and Functional Mapping of the Determination of the Cell Surface Oligomeric Receptor Binding Site of the Protein, J Immunol, vol. 177, pp. 3920-3929, 2006.

Chaturvedi et al., Stabilization of triple-stranded oligonucleotide complexes: use of probes containing alternating phosphodiester and stereo-uniform cationic phosphoramidate linkages, Nucleic Acids Res., vol. 24, pp. 2318-2323, 1996.

Chen et al., Phosphonate Analogues of Cytosine Arabinoside Monophosphate, Phosphorus, Sulfur and Silicon, vol. 177, pp. 1783-1786, 2002.

Chen et al., Selective chemical labeling of proteins, Org. Biomol. Chem., vol. 14, p. 5417, 2016.

Collingwood et al., The Synthesis and Incorporation in Oligonucleotides of a Thymidine Dimer Containing an Internucleoside Phosphinate Linkage, Synlett vol. 7, pp. 703-705, 1995.

Co-pending U.S. Appl. No. 16/634,479, filed Jan. 27, 2020; also cited herein as US 2020/0181220.

Co-pending U.S. Appl. No. 16/634,487, filed Jan. 27, 2020; also cited herein as US 2020/0231644.

Co-pending U.S. Appl. No. 16/803,816, filed Feb. 27, 2020; also cited herein as US 2020/0188484.

Co-pending U.S. Appl. No. 16/918,930, filed Jul. 1, 2020; also cited herein as US 2020/0330601.

Co-pending U.S. Appl. No. 16/993,967, filed Aug. 14, 2020; also cited herein as US 2021/0046160.

Co-pending U.S. Appl. No. 16/999,638, filed Aug. 21, 2020; also cited herein as US 2021/0054040.

Co-pending U.S. Appl. No. 17/001,965, filed Aug. 25, 2020; also cited herein as US 2020/0399338.

Co-pending U.S. Appl. No. 17/016,003, filed Sep. 9, 2020; also cited herein as US 2021/0070827.

Co-pending U.S. Appl. No. 17/313,579, filed May 6, 2021.

Co-pending U.S. Appl. No. 17/350,672, filed Jun. 17, 2021.

Co-pending U.S. Appl. No. 17/357,615, filed Jun. 24, 2021.

Crooke et al., Pharmacokinetic properties of several novel oligonucleotide analogs in mice, J Pharmacol Exp Ther, vol. 277, pp. 923-937, 1996.

De Mesmaeker et al., Amide-Modified Oligonucleotides with Preorganized Backbone and Furanose Rings: Highly Increased Thermodynamic Stability of the Duplexes Formed with their RNA and DNA Complements, Synlett, vol. 11, pp. 1287-1290, 1997.

Dhami et al., Systematic exploration of a class of hydrophobic unnatural base pairs yields multiple new candidates for the expansion of the genetic alphabet, Nucleic Acids Res, vol. 42, pp. 10235-10244, 2014.

Dien et al., Progress Toward a Semi-Synthetic Organism with an Unrestricted Expanded Genetic Alphabet, J Am Chem Soc., vol. 140, pp. 16115-16123, 2018.

Dumas et al., Designing logical codon reassignment—Expanding the chemistry in biology, Chem Sci, vol. 6, pp. 50-69, 2015.

Elayadi et al., Application of PNA and LNA oligomers to chemotherapy, Curr Opinion Invens Drugs, vol. 2, pp. 558-561, 2001.

Englisch et al., Chemically Modified Oligonucleotides as Probes and Inhibitors, Angew. Chem. Int. Ed. Eng., vol. 30, pp. 613-629, 1991.

Eppacher et al., Synthesis and Incorporation of C(5')-Ethynylated Uracil-Derived Phosphoramidites into RNA, Helvetica Chimica Acta, vol. 87, pp. 3004-3020, 2004.

(56) References Cited

OTHER PUBLICATIONS

Fairhurst et al., Synthesis and Hybridisation Properties of Phosphonamidate Ester Modified Nucleic Acid, Synlett, vol. 4, pp. 467-472, 2001.
Feldman et al., In Vivo Structure-Activity Relationships and Optimization of an Unnatural Base Pair for Replication in a Semi-Synthetic Organism, J Am Chem Soc, vol. 139, pp. 11427-11433, 2017.
Gallier et al. Ex-Chiral-Pool Synthesis of 13-Hydroxyphosphonate Nucleoside Analogues. Eur J Org Chem 6:925-933 (2007).
Geze et al., Synthesis of Sinefungin and Its C-6' Epimer, J. Am. Chem. Soc, vol. 105(26), pp. 7638-7640, 1983.
Gong et al., Recent advances in bioorthogonal reactions for site-specific protein labeling and engineering, Tetrahedron Letters, vol. 56, pp. 2123-2131, 2015.
Hampton et al., Design of substrate-site-directed inhibitors of adenylate kinase and hexokinase. Effect of substrate substituents on affinity on affinity for the adenine nucleotide sites, J Med Chem, vol. 19, pp. 1371-1377, 1976.
Hampton et al., Design of substrate-site-directed irreversible inhibitors of adenosine 5'- phosphate aminohydrolase. Effect of substrate substituents on affinity for the substrate site, J Med Chem, vol. 19(8), pp. 1029-1033, 1976.
Hampton et al., Synthesis of 6'-cyano-6'-deoxyhomoadenosine-6'-phosphonic acid and its phosphoryl and byrophosphoryl an hydrides and studies of their interactions with adenine nucleotide utilizing enzymes, J Am Chem Soc, vol. 95(13), pp. 4404-4414, 1973.
Hutter et al., From Phosphate to Bis(methylene) Sulfone: Non-Ionic Backbone Linkers in DNA, Helvetica Chimica Acta, vol. 85, pp. 2777-2806, 2002.
Imran et al., Influence of architecture of high molecular weight linear and branched polyglycerols on their biocompatibility and biodistribution, Biomaterials, vol. 33, pp. 9135-9147, 2012.
Jager et al., Oligonucleotide N-alkylphosphoramidates: synthesis and binding to polyn ucleotides, Biochemistry, vol. 27, pp. 7247-7246, 1988.
Jung et al., Synthesis of phosphonate derivatives of uridine, cytidine, and cytosine arabinoside, Bioorg Med Chem, vol. 8, pp. 2501-2509, 2000.
Kabanov et al., A new class of antivirals: antisense oligonucleotides combined with a hydrophobic substituent effectively inhibit influenza virus reproduction and synthesis of virus-specific proteins in MOCK cells, FEBS Lett vol. 259, pp. 327-330, 1990.
Kandimalla et al., Effect of chemical modifications of cytosine and guanine in a CpG-motif of oligonucleotides: structure-immunostimulatory activity relationships, Bioorg. Med. Chem., vol. 9, pp. 807-813, 2001.
Kappler et al., Isozyme-specific enzyme inhibitors. 11. L-homocysteine-ATP S-C5' covalent adducts as inhibitors of rat methionine adenosyltransferases, J Med Chem, vol. 29, pp. 1030-1038, 1986.
Kappler et al., Species- or isozyme-specific enzyme inhibitors. 8. Synthesis of disubstituted two-substrate condensation products as inhibitors of rat adenylate kinases, J Med Chem, vol. 25, pp. 1179-1184, 1982.
Koshkin et al., LNA (locked nucleic acids): synthesis of the adenine, cytosine, guanine 5- methylcytosine, thymine and uracil bicyclonucleoside monomers, oligomerisation, and unprecedented nucleic acid recognition, Tetrahedron, vol. 54(14), pp. 3607-3630, 1998.
Kroschwitz, The Concise Encyclopedia of Polymer Science and Engineering, Ed., John Wiley & Sons, pp. 858-859, 1990.
Kumar et al., The First Analogues of LNA (Locked Nucleic Acids): Phosphorothioate LNA and 2'-Thio-LNA, Bioorg Med Chem Lett, vol. 8, pp. 2219-2222, 1998.
Lavergne et al., Expanding the scope of replicable unnatural DNA: Stepwise optimization of a predominantly hydrophobic base pair, JAGS, vol. 135, pp. 5408-5419, 2013.
Ledbetter et al., Reprograming the Replisome of a Semisynthetic Organism for the Expansion of the Genetic Alphabet, J Am Chem Soc, vol. 140, pp. 758-765, 2018.
Letsinger et al., Cholesteryl-conjugated oligonucleotides: Synthesis, properties, and activity as inhibitors of replication of human immunodeficiency virus in cell culture, PNAS, vol. 86, pp. 6553-6556, 1989.
International Search Report and Written Opinion, Feb. 7, 2020, PCT/US2019/060261, 11 pages.
Li et al., Synthesis of linear polyether polyol derivatives as new materials for bioconjugation, Bioconjugate Chem, vol. 20, pp. 780-789, 2009.
Lyon et al., Self-hydrolyzing maleimides improve the stability and pharmacological properties of antibody-drug conjugates, Nat. Biotechnol., vol. 32(10), pp. 1059-1062, 2014.
Malyshev et al., A semi-synthetic organism with an expanded genetic alphabet, Nature, vol. 509(7500), pp. 385-388, 2014.
Malyshev et al., Efficient and sequence-independent replication of DNA containing a third base pair establishes a functional six-letter genetic alphabet, PNAS USA, vol. 109, pp. 12005-12010, 2012.
Manoharan et al., Chemical Modifications to Improve Uptake and Bioavailability of Antisense Oligonucleotides, Ann. N.Y. Acad. Scie, vol. 660, pp. 306-309, 1992.
Manoharan et al., Cholic Acid-Oligonucleotide Conjugates for Antisense Applications, Bioorg. Med. Chem. Let., vol. 4, pp. 1053-1060, 1994.
Manoharan et al., Introduction of a Lipophilic Thioether in the Minor Groove of Nucleic Acids for Antisense Applications, Bioorg. Med. Chem. Let., vol. 3, pp. 2765-2770, 1993.
Manoharan et al., Lipidic Nucleic Acids, Tetrahedron Lett, vol. 36, pp. 3651-3654, 1995.
Manoharan et al., Oligonucleotide Conjugates: Alteration of the Pharmacokinetic Properties of Antisense Agents, Nucleosides & Nucleotides, vol. 14, pp. 969-973, 1995.
Matteucci, Oligonucleotide Analogs: an Overview, Oligonucleotides as therapeutic agents, Chadwick and Cardew ed., Ciba Foundation Symposium 209, pp. 5-18, 1997.
Micklefield, Backbone Modification of Nucleic Acids: Synthesis, Structure and Therapeutic Applications, Current Medicinal Chemistry, vol. 8, pp. 1157-1179, 2001.
Mikhailov et al., Substrate Properties of C'-Methylnucleoside and C'-Methyl-2'-deoxynucleoside 5'-Triphosphates in RNA and DNA Synthesis Reactions Catalysed by RNA and DNA Polymerases, Nucleosides & Nucleotides, vol. 10 (1-3), pp. 339-343, 1991.
Miller et al., Conformation and interaction of dinucleoside mono- and diphosphates. V. Syntheses and properties of adenine and thymine nucleoside alkyl phosphotriesters, the neutral analogs of dinucleoside monophosphates, JAGS, vol. 93, pp. 6657-6665, 1971.
Mishra et al., Improved leishmanicidal effect of phosphorotioate antisense oligonucleotides by LDL-mediated delivery, Biochem Biophys Acta, vol. 1264, pp. 229-237, 1995.
Napolitano et al., Emergent rules for codon choice elucidated by editing rare argine codons in *Escherichia coli*, PNAS, vol. 113(38), pp. 5588-5597, 2016.
Nawrot et al., A novel class of DNA analogs bearing 5'-C-phosphonothymidine units: synthesis and physicochemical and biochemical properties, Oligonucleotides, vol. 16(1), pp. 68-82, 2006.
Nelson et al., N3'—> PS' Oligodeoxyribonucleotide Phosphoramidates: A New Method of Synthesis Based on a Phosphoramidite Amine-Exchange Reaction, J Org Chem, vol. 62, pp. 7278-7287, 1997.
Neumann et al., Encoding multiple unnatural amino acids via evolution of a quadruplet-decoding ribosome, Nature, vol. 464(7287), pp. 441-444, 2010.
Nielsen et al., Sequence-selective recognition of DNA by strand displacement with a thymine-substituted polyamidem, Science, vol. 254, pp. 1497-1500, 1991.
Oberhauser et al., Effective incorporation of 2'-O-methyl-oligoribonucleotides into liposomes and enhanced cell association through modification with thiocholesterol, Nucl. Acids Res., vol. 20, pp. 533-538, 1992.
Orum et al., Locked nucleic acids: a promising molecular family for gene-function analysis and antisense drug development, Curr Opinion Mol Ther, vol. 3, pp. 239-243, 2001.
Ostrov et al., Design, synthesis, and testing toward a 57-codon genome, Science, vol. 353(6301), pp. 819-822, 2016.

(56) References Cited

OTHER PUBLICATIONS

Peyrottes et al., Oligodeoxynucleoside phosphoramidates (P-NH2): synthesis and thermal stability of duplexes with DNA and RNA targets, Nucleic Acids Res, vol. 24, pp. 1841-1848, 1996.
Saha et al., 5'-Methyl-DNA—A New Oligonucleotide Analog: Synthesis and Biochemical Properties, J Org Chem, vol. 60, pp. 788-789, 1995.
Saison-Behmoaras et al., Short modified antisense oligonucleotides directed against Ha-ras point mutation induce selective cleavage of the mRNA and inhibit T24 cells proliferation, EMBO J, vol. 10, pp. 1111-1118, 1991.
Sanghvi, Chapter 15, Antisense Research and Applications, Crooke and Lebleu Eds., CRC Press, pp. 273-288, 1993.
Schultz et al., Oligo-2'-fluoro-2'-deoxynucleotide N3'—> PS' phosphoramidates: synthesis and properties, Nucleic Acids Res, vol. 24, pp. 2966-2973, 1996.
Shea et al., Synthesis, hybridization properties and antiviral activity of lipid-oligodeoxynucleotide conjugates, Nucleic Acids Research, vol. 18, No. 13, pp. 3777-3783, 1990.
Singh et al., LNA (locked nucleic acids): synthesis and high-affinity nucleic acid recognition, Chem Commun, vol. 4, pp. 455-456, 1998.
Singh et al., Synthesis of 2'-amino-LNA: A novel conformationally restricted high-affinity oligonucleotide analogues with a handle, J Bio Chem, vol. 63, pp. 10035-10039, 1998.
Srivastava et al., Five- and six-membered conformationally locked 2',4'-carbocyclic ribo-thymidines: synthesis, structure, and biochemical studies, J Am Chem Soc, vol. 129(26), pp. 8362-8379, 2007.
Svinarchuk et al., Inhibition of HIV proliferation in MT-4 cells by antisense oligonucleotide conjugated to lipophilic groups, Biochimie, vol. 75, pp. 49-54, 1993.
Vrudhula et al., Isozyme-specific enzyme inhibitors. 13. S-[5'(R)-[(N-triphosphoamino)methyl]adenosyl]-L-homocysteine, a potent inhibitor of rat methionine adenosyltransferases, J Med Chem, vol. 30, pp. 888-894, 1987.
Wahlestedt et al., Potent and nontoxic antisense oligonucleotides containing locked nucleic acids, PNAS USA, vol. 97, pp. 5633-5638, 2000.
Wan et al., Pyrrolysyl-tRNA synthetase: an ordinary enzyme but an outstanding genetic code expansion tool, Biocheim Biophys Aceta, vol. 1844(6), pp. 1059-1070, 2014.
Wang et al., Biophysical and biochemical properties of oligodeoxynucleotides containing 4'-C-and 5'-C-substituted thymidines, Bioorg Med Chem Lett, vol. 9, pp. 885-890, 1999.
Wang et al., Synthesis of Azole Nucleoside 5'-Monophosphate Mimics (P1 Ms) and Their Inhibitory Properties of IMP Dehydrogenases, Nucleosides Nucleotides & Nucleic Acids, vol. 23(1 & 2), pp. 317-337, 2004.
Wu et al., Functionalization of the sugar moiety of oligoribonucleotides on solid support, Bioconjugate Chem, vol. 10, pp. 921-924, 1999.
Wu et al., Synthesis of 5'-C- and 2'-O-(Bromoalkyl)-Substituted Ribonucleoside Phosphoramidites for the Post-synthetic Functionalization of Oligonucleotides on Solid Support, Helvetica Chimica Acta, vol. 83, pp. 1127-1143, 2000.
Wurm et al., Squaric acid mediated synthesis and biological activity of a library of linear and hyperbranched poly (glycerol)-protein conjugates, Biomacromolecules, vol. 13, pp. 1161-1171, 2012.
Young et al., Beyond the canonical 20 amino acids: expanding the genetic lexicon, J Biol Chem, vol. 285, pp. 11039-11044, 2010.
Zhang et al., A semisynthetic organism engineered for the stable expansion of the genetic alphabet, PNAS USA, vol. 114(6), pp. 1317-1322, 2017.
Zhang et al., A Semi-Synthetic Organism that Stores and Retrieves Increased Genetic Information, Nature, vol. 551 (7682), pp. 644-647, 2017.
Zon, Chapter 8: Oligonucleotide Phosphorothioates in Protocols for Oligonucleotides and Analogs, Synthesis and Properties. Humana Press, pp. 165-190, 1993.
Extended European Search Report (EESR) issued in EP Application No. 19882876.6, Jul. 6, 2022, 7 pages.
Vanbrunt et al., "Genetically Encoded Azide Containing Amino Acid in Mammalian Cells Enables Site-Specific Antibody-Drug Conjugates Using Click Cycloaddition Chemistry", Bioconjugate Chemistry, vol. 26, No. 11, pp. 2249-2260 (Sep. 11, 2015).
Abbadessa et al., Co-pending US U.S. Appl. No. 18/524,157, filed Nov. 30, 2023.
Aerni et al., Co-pending U.S. Appl. No. 17/845,495, filed Jun. 21, 2022; also cited herein as US 2022/0324792.
Caffaro et al., Co-pending U.S. Appl. No. 17/735,564, filed May 3, 2022; also cited herein as US 2022/0273767.
Caffaro et al., Co-pending U.S. Appl. No. 18/179,198, filed Mar. 6, 2023; also cited herein as US 2023/0302089.
Caffaro et al., Co-pending U.S. Appl. No. 18/296,710, filed Apr. 6, 2023; also cited herein as US 2023/0277627.
Caffaro et al., Co-pending U.S. Appl. No. 18/296,711, filed Apr. 6, 2023; also cited herein as US 2023/0416327.
Caffaro et al., Co-pending U.S. Appl. No. 18/415,445, filed Jan. 17, 2024.
Caffaro et al., Co-pending U.S. Appl. No. 18/424,573, filed Jan. 26, 2024.
Ptacin et al., Co-pending U.S. Appl. No. 18/327,535, filed Jun. 1, 2023.
Chen et al., "Fusion protein linkers: Property, Design and Functionality", Advanced drug delivery reviews, vol. 65, No. 10, pp. 1357-1369 (Oct. 15, 20213).
Lightman et al., "Diabetic Retinopathy", Clinical Cornerstone, V. 5, N. 2, p. 12-21 (2003).
Maeda et al., "Engineering of Functional Chimeric Protein G-Vargula Luciferase", Analytical biochemistry, V. 249, N. 2, pp. 147-152 (1997).
Muller et al., "Spliceosomal Peptide P140 for Immunotherapy of Systemic Lupus Erythematosus: Results of an Early Phase II Clinical Trial", Arthritis & Rheumatism: Official Journal of the American College of Rheumatology, V. 58, N. 12, pp. 3873-3883 (2008).
Orlando M., "Modification of proteins and low molecular weight substances with hydroxyethyl starch (HES)", Inaugural dissertation, Giesen, p. 166, p. 15 (2003).
Rowley et al., "Inhibition of tumor growth by NK1. 1+ cells and CD8+T cells activated by IL-15 through receptor β/ common γ signaling in trans", The Journal of Immunology, V 181, N. 12, pp. 8237-8247, c.8237 (2008).
Schweppe K.W., "Significance of progestins in treatment of endometriosis", Zentralbl Gynakol, V.119, Suppl 2, pp. 64-69 (1997).
Singer et al., "Genes and Genomes: two volumes", vol. 1, English translation, M .: Mir, 373sh., pp. 33-35 (1998).
Treetharnmathurot et al., "Effect of PEG molecular weight and linking chemistry on the biological activity and thermal stability of PEGylated trypsin", International Journal of Pharmaceutics, V. 357, pp. 252-259 (2008).
Zhou et al., "Preparation and PEGylation of exendin-4 peptide secreted from yeast *Pichia pastoris*", European Journal of Pharmaceutics and Biopharmaceutics, V. 72, N. 2, pp. 412-417 (2009).

\* cited by examiner

INTERLEUKIN 10 CONJUGATES AND USES THEREOF

CROSS-REFERENCE

This application is a continuation of International Application No. PCT/US2019/060261, filed Nov. 7, 2019, which claims the benefit of U.S. Provisional Application Ser. No. 62/757,690, filed Nov. 8, 2018, and U.S. Provisional Application Ser. No. 62/911,036, filed Oct. 4, 2019, the disclosures of each of which are hereby incorporated herein by reference in their entirety.

SEQUENCE LISTING

The instant application contains a Sequence Listing which has been submitted electronically in ASCII format and is hereby incorporated by reference in its entirety. Said ASCII copy created Nov. 4, 2019, is named 46085-727_851_SL.txt and is 4,157 bytes in size.

BACKGROUND OF THE DISCLOSURE

Distinct populations of T cells modulate the immune system to maintain immune homeostasis and tolerance. For example, regulatory T (Treg) cells prevent inappropriate responses by the immune system by preventing pathological self-reactivity while cytotoxic T cells target and destroy infected cells and/or cancerous cells. In some instances, modulation of the different populations of T cells provides an option for treatment of a disease or indication.

SUMMARY OF THE DISCLOSURE

Disclosed herein, in certain embodiments, are interleukin 10 (IL-10) conjugates and uses thereof in the treatment of one or more indications. In some embodiments, disclosed herein are IL-10 conjugates for the treatment of cancer. In additional cases, disclosed herein are pharmaceutical compositions and kits that comprise an IL-10 conjugate described herein.

Disclosed herein, in some embodiments, are modified interleukin 10 (IL-10) polypeptides comprising an amino acid sequence comprising at least one unnatural amino acid bound to at least one conjugating moiety, wherein the amino acid sequence is 99.0% identical to amino acids 33 to 158 of SEQ ID NO: 1. In some embodiments, the amino acid sequence is at least 95.0% identical to amino acids 1 to 160 of SEQ ID NO: 1. In some embodiments, the amino acid sequence is at least 97.0% identical to amino acids 1 to 160 of SEQ ID NO: 1. In some embodiments, the amino acid sequence is at least 98.0% identical to amino acids 1 to 160 of SEQ ID NO: 1. In some embodiments, the amino acid sequence comprises 13 lysine amino acid residues. In some embodiments, the unnatural amino acid is located at an amino acid position selected from E67, Q70, E74, E75, Q79, N82, K88, K125, N126, N129, K130, or Q132 within SEQ ID NO: 1. In some embodiments, the position of the at least one unnatural amino acid is selected from E67, Q70, E74, E75, Q79, or N82, wherein the residue positions correspond to positions 67, 70, 74, 75, 79, and 82 as set forth in SEQ ID NO: 1. In some embodiments, the position of the at least one unnatural amino acid is selected from K88, K125, N126, N129, K130, or Q132, wherein the residue positions correspond to positions 88, 125, 126, 129, 130, and 132 as set forth in SEQ ID NO: 1. In some embodiments, the position of the at least one unnatural amino acid is selected from K125, N126, N129, K130, or Q132, wherein the residue positions correspond to positions 125, 126, 129, 130, and 132 as set forth in SEQ ID NO: 1. In some embodiments, the position of the at least one unnatural amino acid is selected from Q70, E74, N82, K88, N126, K130, or Q132, wherein the residue positions correspond to positions 70, 74, 82, 88, 126, 130, and 132 as set forth in SEQ ID NO: 1. In some embodiments, the at least one unnatural amino acid is located proximal to the N-terminus. In some embodiments, the at least one unnatural amino acid is located within the first 10, 20, 30, 40, or 50 residues from the N-terminus. In some embodiments, the at least one unnatural amino acid is located proximal to the C-terminus. In some embodiments, the at least one unnatural amino acid is located within the first 10, 20, 30, 40, or 50 residues from the C-terminus. In some embodiments, the at least one unnatural amino acid: a) is a lysine analogue; b) comprises an aromatic side chain; c) comprises an azido group; d) comprises an alkyne group; or e) comprises an aldehyde or ketone group. In some embodiments, the at least one unnatural amino acid does not comprise an aromatic side chain. In some embodiments, the at least one unnatural amino acid comprises N6-((2-azidoethoxy)-carbonyl)-L-lysine (AzK). In some embodiments, the at least one unnatural amino acid comprises N6-((2-azidoethoxy)-carbonyl)-L-lysine (AzK), N6-(propargylethoxy)-L-lysine (PraK), BCN-L-lysine, norbornene lysine, TCO-lysine, methyltetrazine lysine, allyloxycarbonyllysine, 2-amino-8-oxononanoic acid, 2-amino-8-oxooctanoic acid, p-acetyl-L-phenylalanine, p-azidomethyl-L-phenylalanine (pAMF), p-iodo-L-phenylalanine, m-acetylphenylalanine, 2-amino-8-oxononanoic acid, p-propargyloxyphenylalanine, p-propargyl-phenylalanine, 3-methyl-phenylalanine, L-Dopa, fluorinated phenylalanine, isopropyl-L-phenylalanine, p-azido-L-phenylalanine, p-acyl-L-phenylalanine, p-benzoyl-L-phenylalanine, p-bromophenylalanine, p-amino-L-phenylalanine, isopropyl-L-phenylalanine, O-allyltyrosine, O-methyl-L-tyrosine, O-4-allyl-L-tyrosine, 4-propyl-L-tyrosine, phosphonotyrosine, tri-O-acetyl-GlcNAcp-serine, L-phosphoserine, phosphonoserine, L-3-(2-naphthyl)alanine, 2-amino-3-((2-((3-(benzyloxy)-3-oxopropyl)amino)ethyl)selanyl)propanoic acid, 2-amino-3-(phenylselanyl)propanoic, or selenocysteine. In some embodiments, the at least one unnatural amino acid is incorporated into the modified IL-10 polypeptide by an orthogonal tRNA synthetase/tRNA pair. In some embodiments, the orthogonal tRNA of the orthogonal synthetase/tRNA pair comprises at least one unnatural nucleobase. In some embodiments, the modified IL-10 polypeptide dimerizes with a second modified IL-10 polypeptide, thereby generating an IL-10 dimer comprising two unnatural amino acids. In some embodiments, the unnatural amino acid of the modified IL-10 polypeptide is located at a residue position that is different from the unnatural amino acid of the second modified IL-10 polypeptide. In some embodiments, both unnatural amino acids are located at the same residue position in the respective IL-10 polypeptides. In some embodiments, the modified IL-10 polypeptide dimerizes with an IL-10 polypeptide that does not comprise an unnatural amino acid. In some embodiments, the modified IL-10 polypeptide dimerizes with a wild-type IL-10 polypeptide. In some embodiments, the at least one conjugating moiety comprises water-soluble polymer, a lipid, a protein, or a peptide. In some embodiments, the water-soluble polymer comprises polyethylene glycol (PEG) molecule. In some embodiments, the water-soluble polymer comprises polyethylene glycol (PEG), poly(propylene glycol) (PPG), copolymers of ethylene glycol and propylene glycol, poly(oxyethylated polyol), poly(olefinic alcohol), poly(vinylpyrrolidone), poly(hydroxyalkylmethacrylamide), poly(hydroxyalkylmethacrylate), poly(saccharides), poly(α-hydroxy acid), poly(vinyl alcohol), polyphosphazene, polyoxazolines (POZ), poly(N-acryloylmorpholine), or a combination thereof. In some embodiments, the water-soluble polymer comprises a PEG molecule. In some embodiments, the PEG molecule is a linear PEG. In some embodiments, the PEG molecule is a branched PEG. In some embodiments, the water-soluble polymer comprises a polysaccharide. In some embodiments, the polysaccharide comprises dextran, polysialic acid (PSA), hyaluronic acid (HA), amylose, heparin, heparan sulfate (HS), dextrin, or hydroxyethyl-starch (HES). In some embodiments, the lipid comprises a fatty acid. In some embodiments, the fatty acid comprises from about 6 to about 26 carbon atoms, from about 6 to about 24 carbon atoms, from about 6 to about 22 carbon atoms, from about 6 to about 20 carbon atoms, from about 6 to about 18 carbon atoms, from about 20 to about 26 carbon atoms, from about 12 to about 26 carbon atoms, from about 12 to about 24 carbon atoms, from about 12 to about 22 carbon atoms, from about 12 to about 20 carbon atoms, or from about 12 to about 18 carbon atoms. In some embodiments, the fatty acid is a saturated fatty acid. In some embodiments, the protein comprises an albumin, a transferrin, or a transthyretin. In some embodiments, the protein comprises an antibody or its binding fragments thereof. In some embodiments, the antibody or its binding fragments thereof comprises an Fc portion of an antibody. In some embodiments, the peptide comprises a XTEN peptide, a glycine-rich homoamino acid polymer (HAP), a PAS polypeptide, an elastin-like polypeptide (ELP), a CTP peptide, or a gelatin-like protein (GLK) polymer. In some embodiments, the conjugating moiety is indirectly bound to the at least one unnatural amino acid of the modified IL-10 through a linker. In some embodiments, the linker comprises a homobifunctional linker, a heterobifunctional linker, a zero-length linker, a cleavable or a non-cleavable dipeptide linker, a maleimide group, a spacer, or a combination thereof. In some embodiments, the modified IL-10 polypeptide is: a) a functionally active fragment of a full-length IL-10 polypeptide; b) a recombinant IL-10 polypeptide; or c) a recombinant human IL-10 polypeptide. In some embodiments, the modified IL-10 polypeptide comprises an N-terminal deletion, a C-terminal deletion, or a combination thereof. In some embodiments, the N-terminal deletion comprises a deletion of the first 1, 2, 3, 4, 5, 6, 7, 8, 9, 10, 11, 12, 13, 14, 15, 20, 25, or 30 residues from the N-terminus, wherein the residue positions are in reference to the positions in SEQ ID NO: 1. In some embodiments, the C-terminal deletion comprises a deletion of the last 1, 2, 3, 4, 5, 6, 7, 8, 9, 10, 11, 12, 13, 14, 15, 20, or more residues from the C-terminus, wherein the residue positions are in reference to the positions in SEQ ID NO: 1. In some embodiments, the modified IL-10 polypeptide comprises about 80%, 85%, 90%, 95%, 96%, 97%, 98%, or 99% sequence identity to SEQ ID NO: 1. In some embodiments, the IL-10 dimer binds to an IL-10R to form an IL-10/IL-10R complex. In some embodiments, the enhanced plasma half-life of the IL-10 dimer is at least 90 minutes, 2 hours, 3 hours, 4 hours, 5 hours, 6 hours, 7 hours, 8 hours, 9 hours, 10 hours, 11 hours, 12 hours, 18 hours, 24 hours, 36 hours, 48 hours, 3 days, 4 days, 5 days, 6 days, 7 days, 10 days, 12 days, 14 days, 21 days, 28 days, 30 days, or longer than the plasma half-life of the wild-type IL-10 dimer. In some embodiments, the enhanced plasma half-life of the IL-10 dimer is about 90 minutes, 2 hours, 3 hours, 4 hours, 5 hours, 6 hours, 7 hours, 8 hours, 9 hours, 10 hours, 11 hours, 12 hours, 18 hours, 24 hours, 36 hours, 48 hours, 3 days, 4 days, 5 days, 6 days, 7 days, 10 days, 12 days, 14 days, 21 days, 28 days, or 30 days. In some embodiments, the location of the at least one unnatural amino acid does not substantially interfere with dimerization of the IL-10 polypeptide. In some embodiments, the location of the at least one unnatural amino acid does not significantly interfere with binding of the IL-10 dimer to IL-10R. In some embodiments, the location of the at least one unnatural amino acid impairs signaling of the IL-10R by less than 90%, 80%, 70%, 60%, 50%, 40%, 30%, 20%, 10%, 5%, 4%, 3%, 2%, 1%, or less. In some embodiments, the location of the at least one unnatural amino acid does not significantly impair signaling of the IL-10R as defined by the ability of the cell to phosphorylate Stat3 and/or activate IL-10R signaling. In some embodiments, the modified IL-10 polypeptide is isolated and purified. In some embodiments, the modified IL-10 polypeptide is formulated as a pharmaceutical formulation comprising a pharmaceutically acceptable excipient. In some embodiments, the pharmaceutical formulation is formulated for systemic delivery.

Disclosed herein, in some embodiments, are modified IL-10 homodimers comprising two of the modified IL-10 polypeptides of claim 1.

Disclosed herein, in some embodiments, are compositions comprising a complex of the modified homodimer of the present disclosure bound to an IL-10 receptor (IL-10R).

Disclosed herein, in some embodiments, are methods of treating a proliferative disease or condition in a subject in need thereof, comprising administering to the subject a therapeutically effective amount of the modified IL-10 polypeptide of the present disclosure. In some embodiments, the proliferative disease or condition is a cancer. In some embodiments, the cancer is a solid tumor cancer. In some embodiments, the solid tumor cancer is bladder cancer, bone cancer, brain cancer, breast cancer, colorectal cancer, esophageal cancer, eye cancer, head and neck cancer, kidney cancer, lung cancer, melanoma, ovarian cancer, pancreatic cancer, or prostate cancer.

Disclosed herein, in some embodiments, are nucleic acid molecules encoding the modified IL-10 polypeptide of the present disclosure.

Disclosed herein, in some embodiments, are vectors comprising the nucleic acid molecule of the present disclosure.

Disclosed herein, in certain embodiments, is an isolated and modified interleukin 10 (IL-10) polypeptide comprising at least one unnatural amino acid at a position on the polypeptide that enhances plasma half-life, without significantly altering interaction with the IL-10 receptor, wherein the enhanced plasma half-life is compared to a plasma half-life of a wild-type IL-10 protein. In some embodiments, the at least one unnatural amino acid is located in helix C, D, or E. In some embodiments, the at least one unnatural amino acid is located at a surface exposed location in helix C, D, or E. In some embodiments, the position of the at least one unnatural amino acid is selected from E67, Q70, E74, E75, Q79, N82, K88, K125, N126, N129, K130, or Q132, wherein the residue positions correspond to positions 67, 70, 74, 75, 79, 82, 88, 125, 126, 129, 130, and 132 as set forth in SEQ ID NO: 1. In some embodiments, the position of the at least one unnatural amino acid is selected from E67, Q70, E74, E75, Q79, or N82, wherein the residue positions correspond to positions 67, 70, 74, 75, 79, and 82 as set forth in SEQ ID NO: 1. In some embodiments, the position of the at least one unnatural amino acid is selected from K88, K125, N126, N129, K130, or Q132, wherein the residue positions correspond to positions 88, 125, 126, 129, 130, and 132 as set forth in SEQ ID NO: 1. In some embodiments, the position of the at least one unnatural amino acid is selected from K125, N126, N129, K130, or Q132, wherein the residue positions correspond to positions 125, 126, 129, 130, and 132 as set forth in SEQ ID NO: 1. In some embodiments, the position of the at least one unnatural amino acid is selected from Q70, E74, N82, K88, N126, K130, or Q132, wherein the residue positions correspond to positions 70, 74, 82, 88, 126, 130, and 132 as set forth in SEQ ID NO: 1. In some embodiments, the amino acid sequence is at least or about 99.0% identical to amino acids 33 to 158 of SEQ ID NO: 1. In some embodiments, the amino acid sequence comprises at least 1, 2, 3, 4, 5, 6, 7, 8, 9, 10, 11, 12, or 13 wild-type lysines. In some embodiments, the amino acid sequence comprises a wild-type lysine at one or more of K34, K40, K49, K57, K88, K99, K117, K119, K125, K130, K134, K138, and K157. In some embodiments, the amino acid sequence comprises a wild type lysine at least 2, 3, 4, 5, 6, 7, 8, 9, 10, 11, or 12 of K34, K40, K49, K57, K88, K99, K117, K119, K125, K130, K134, K138, and K157. In some embodiments, the amino acid sequence comprises a wild-type lysine at K34, K40, K49, K57, K88, K99, K117, K119, K125, K130, K134, K138, and K157. In some embodiments, the at least one unnatural amino acid is located proximal to the N-terminus. In some embodiments, the at least one unnatural amino acid is located within the first 10, 20, 30, 40, or 50 residues from the N-terminus. In some embodiments, the at least one unnatural amino acid is located proximal to the C-terminus. In some embodiments, the at least one unnatural amino acid is located within the first 10, 20, 30, 40, or 50 residues from the C-terminus. In some embodiments, the at least one unnatural amino acid: a) is a lysine analogue; b) comprises an aromatic side chain; c) comprises an azido group; d) comprises an alkyne group; or e) comprises an aldehyde or ketone group. In some embodiments, the at least one unnatural amino acid does not comprise an aromatic side chain. In some embodiments, the at least one unnatural amino acid comprises N6-((2-azido-ethoxy)-carbonyl)-L-lysine (AzK), N6-(propargylethoxy)-L-lysine (PraK), BCN-L-lysine, norbornene lysine, TCO-lysine, methyltetrazine lysine, allyloxycarbonyllysine, 2-amino-8-oxononanoic acid, 2-amino-8-oxooctanoic acid, p-acetyl-L-phenylalanine, p-azidomethyl-L-phenylalanine (pAMF), p-iodo-L-phenylalanine, m-acetylphenylalanine, 2-amino-8-oxononanoic acid, p-propargyloxyphenylalanine, p-propargyl-phenylalanine, 3-methyl-phenylalanine, L-Dopa, fluorinated phenylalanine, isopropyl-L-phenylalanine, p-azido-L-phenylalanine, p-acyl-L-phenylalanine, p-benzoyl-L-phenylalanine, p-bromophenylalanine, p-amino-L-phenylalanine, isopropyl-L-phenylalanine, O-allyltyrosine, O-methyl-L-tyrosine, O-4-allyl-L-tyrosine, 4-propyl-L-tyrosine, phosphonotyrosine, tri-O-acetyl-GlcNAcp-serine, L-phosphoserine, phosphonoserine, L-3-(2-naphthyl)alanine, 2-amino-3-((2-((3-(benzyloxy)-3-oxopropyl)amino)ethyl)selanyl)propanoic acid, 2-amino-3-(phenylselanyl)propanoic, or selenocysteine. In some embodiments, the at least one unnatural amino acid is incorporated into the modified IL-10 polypeptide by an orthogonal tRNA synthetase/tRNA pair. In some embodiments, the orthogonal tRNA of the orthogonal synthetase/tRNA pair comprises at least one unnatural nucleobase. In some embodiments, the modified IL-10 polypeptide dimerizes with a second modified IL-10 polypeptide, thereby generating an IL-10 dimer comprising two unnatural amino acids. In some embodiments, the unnatural amino acid of the modified IL-10 polypeptide is located at a residue position that is different from the unnatural amino acid of the second modified IL-10 polypeptide. In some embodiments, both unnatural amino acids are located at the same residue position in the respective IL-10 polypeptides. In some embodiments, the modified IL-10 polypeptide dimerizes with an IL-10 polypeptide that does not comprise an unnatural amino acid. In some embodiments, the modified IL-10 polypeptide dimerizes with a wild-type IL-10 polypeptide. In some embodiments, the modified IL-10 polypeptide is covalently attached to a conjugating moiety through the at least one unnatural amino acid. In some embodiments, the conjugating moiety comprises a water-soluble polymer, a lipid, a protein, or a peptide. In some embodiments, the water-soluble polymer comprises polyethylene glycol (PEG), poly(propylene glycol) (PPG), copolymers of ethylene glycol and propylene glycol, poly(oxyethylated polyol), poly(olefinic alcohol), poly(vinylpyrrolidone), poly(hydroxyalkylmethacrylamide), poly(hydroxyalkylmethacrylate), poly(saccharides), poly(α-hydroxy acid), poly(vinyl alcohol), polyphosphazene, polyoxazolines (POZ), poly(N-acryloylmorpholine), or a combination thereof. In some embodiments, the water-soluble polymer comprises a PEG molecule. In some embodiments, the PEG molecule is a linear PEG. In some embodiments, the PEG molecule is a branched PEG. In some embodiments, the water-soluble polymer comprises a polysaccharide. In some embodiments, the polysaccharide comprises dextran, polysialic acid (PSA), hyaluronic acid (HA), amylose, heparin, heparan sulfate (HS), dextrin, or hydroxyethyl-starch (HES). In some embodiments, the lipid comprises a fatty acid. In some embodiments, the fatty acid comprises from about 6 to about 26 carbon atoms, from about 6 to about 24 carbon atoms, from about 6 to about 22 carbon atoms, from about 6 to about 20 carbon atoms, from about 6 to about 18 carbon atoms, from about 20 to about 26 carbon atoms, from about 12 to about 26 carbon atoms, from about 12 to about 24 carbon atoms, from about 12 to about 22 carbon atoms, from about 12 to about 20 carbon atoms, or from about 12 to about 18 carbon atoms. In some embodiments, the fatty acid is a saturated fatty acid. In some embodiments, the protein comprises an albumin, a transferrin, or a transthyretin. In some embodiments, the protein comprises an antibody or its binding fragments thereof. In some embodiments, the antibody or its binding fragments thereof comprises an Fc portion of an antibody. In some embodiments, the peptide comprises a XTEN peptide, a glycine-rich homoamino acid polymer (HAP), a PAS polypeptide, an elastin-like polypeptide (ELP), a CTP peptide, or a gelatin-like protein (GLK) polymer. In some embodiments, the conjugating moiety is indirectly bound to the at least one unnatural amino acid of the modified IL-10 through a linker. In some embodiments, the linker comprises a homobifunctional linker, a heterobifunctional linker, a zero-length linker, a cleavable or a non-cleavable dipeptide linker, a maleimide group, a spacer, or a combination thereof. In some embodiments, the modified IL-10 polypeptide is: a) a functionally active fragment of a full-length IL-10 polypeptide; b) a recombinant IL-10 polypeptide; or c) a recombinant human IL-10 polypeptide. In some embodiments, the modified IL-10 polypeptide comprises an N-terminal deletion, a C-terminal deletion, or a combination thereof. In some embodiments, the N-terminal deletion comprises a deletion of the first 1, 2, 3, 4, 5, 6, 7, 8, 9, 10, 11, 12, 13, 14, 15, 20, 25, or 30 residues from the N-terminus, wherein the residue positions are in reference to the positions in SEQ ID NO: 1. In some embodiments, the C-terminal deletion comprises a deletion of the last 1, 2, 3, 4, 5, 6, 7, 8, 9, 10, 11, 12, 13, 14, 15, 20, or more residues from the C-terminus, wherein the residue positions are in reference to the positions in SEQ ID NO: 1. In some embodiments, the modified IL-10 polypeptide comprises about 80%, 85%, 90%, 95%, 96%, 97%, 98%, or 99% sequence identity to SEQ ID NO: 1. In some embodiments, the IL-10 dimer binds to an IL-10R to form an IL-10/IL-10R complex. In some embodiments, the enhanced plasma half-life of the IL-10 dimer is at least 90 minutes, 2 hours, 3 hours, 4 hours, 5 hours, 6 hours, 7 hours, 8 hours, 9 hours, 10 hours, 11 hours, 12 hours, 18 hours, 24 hours, 36 hours, 48 hours, 3 days, 4 days, 5 days, 6 days, 7 days, 10 days, 12 days, 14 days, 21 days, 28 days, 30 days, or longer than the plasma half-life of the wild-type IL-10 dimer. In some embodiments, the enhanced plasma half-life of the IL-10 dimer is about 90 minutes, 2 hours, 3 hours, 4 hours, 5 hours, 6 hours, 7 hours, 8 hours, 9 hours, 10 hours, 11 hours, 12 hours, 18 hours, 24 hours, 36 hours, 48 hours, 3 days, 4 days, 5 days, 6 days, 7 days, 10 days, 12 days, 14 days, 21 days, 28 days, or 30 days. In some embodiments, the location of the at least one unnatural amino acid does not substantially interfere with dimerization of the IL-10 polypeptide. In some embodiments, the location of the at least one unnatural amino acid does not significantly interfere with binding of the IL-10 dimer to IL-10R. In some embodiments, the location of the at least one unnatural amino acid impairs signaling of the IL-10R by less than 90%, 80%, 70%, 60%, 50%, 40%, 30%, 20%, 10%, 5%, 4%, 3%, 2%, 1%, or less. In some embodiments, the location of the at least one unnatural amino acid does not significantly impair signaling of the IL-10R as defined by the ability of the cell to phosphorylate Stat3 and/or activate IL-10R signaling.

Disclosed herein, in certain embodiments, the position of the at least one unnatural amino acid is selected from N82, K88, N129, K130, or Q132, wherein the residue positions correspond to positions 82, 88, 129, 130, and 132 as set forth in SEQ ID NO: 1. In some embodiments, the position of the at least one unnatural amino acid is selected from N82, N129, K130, or Q132, wherein the residue positions correspond to positions 82, 129, 130, and 132 as set forth in SEQ ID NO: 1. In some embodiments, the position of the at least one unnatural amino acid is selected from N82, N129, K130, or Q132, wherein the residue positions correspond to positions 82, 129, 130, and 132 as set forth in SEQ ID NO: 1. In some embodiments, the position of the at least one unnatural amino acid is selected from N82, N129, or Q132, wherein the residue positions correspond to positions 82, 129, 132 as set forth in SEQ ID NO: 1. In some embodiments, the position of the at least one unnatural amino acid is selected from N82 or N129, wherein the residue positions correspond to positions 82 and 129 as set forth in SEQ ID NO: 1. In some embodiments, the position of the at least one unnatural amino acid is selected from N82, wherein the residue positions correspond to positions 82 as set forth in SEQ ID NO: 1. In some embodiments, the position of the at least one unnatural amino acid is selected from N129, wherein the residue positions correspond to positions 129 as set forth in SEQ ID NO: 1.

Disclosed herein, in certain embodiments, the at least one unnatural amino acid comprises N6-((2-azidoethoxy)-carbonyl)-L-lysine (AzK), N6-(propargylethoxy)-L-lysine (PraK), N6-(((2-azidobenzyl)oxy)carbonyl)-L-lysine, N6-(((3-azidobenzyl)oxy)carbonyl)-L-lysine, or N6-(((4-azidobenzyl)oxy)carbonyl)-L-lysine. In some embodiments, the at least one unnatural amino acid comprises N6-((2-azidoethoxy)-carbonyl)-L-lysine (AzK). In some embodiments, the at least one unnatural amino acid comprises N6-(propargylethoxy)-L-lysine (PraK). In some embodiments, the at least one unnatural amino acid comprises N6-(((2-azidobenzyl)oxy)carbonyl)-L-lysine. In some embodiments, the at least one unnatural amino acid comprises N6-(((3-azidobenzyl)oxy)carbonyl)-L-lysine. In some embodiments, the at least one unnatural amino acid comprises N6-(((4-azidobenzyl)oxy)carbonyl)-L-lysine.

Disclosed herein, in certain embodiments, the position of the at least one unnatural amino acid is selected from N82, K88, N129, K130, or Q132, wherein the residue positions correspond to positions 82, 88, 129, 130, and 132 as set forth in SEQ ID NO: 1, and the at least one unnatural amino acid comprises N6-((2-azidoethoxy)-carbonyl)-L-lysine (AzK), N6-(propargylethoxy)-L-lysine (PraK), N6-(((2-azidobenzyl)oxy)carbonyl)-L-lysine, N6-(((3-azidobenzyl)oxy)carbonyl)-L-lysine, or N6-(((4-azidobenzyl)oxy)carbonyl)-L-lysine. In some embodiments, the position of the at least one unnatural amino acid is selected from N82, N129, K130, or Q132, wherein the residue positions correspond to positions 82, 129, 130, and 132 as set forth in SEQ ID NO: 1, and the at least one unnatural amino acid comprises N6-((2-azidoethoxy)-carbonyl)-L-lysine (AzK), N6-(propargylethoxy)-L-lysine (PraK), N6-(((2-azidobenzyl)oxy)carbonyl)-L-lysine, N6-(((3-azidobenzyl)oxy)carbonyl)-L-lysine, or N6-(((4-azidobenzyl)oxy)carbonyl)-L-lysine. In some embodiments, the position of the at least one unnatural amino acid is selected from N82, N129, K130, or Q132, wherein the residue positions correspond to positions 82, 129, 130, and 132 as set forth in SEQ ID NO: 1, and the at least one unnatural amino acid comprises N6-((2-azidoethoxy)-carbonyl)-L-lysine (AzK), N6-(propargylethoxy)-L-lysine (PraK), N6-(((2-azidobenzyl)oxy)carbonyl)-L-lysine, N6-(((3-azidobenzyl)oxy)carbonyl)-L-lysine, or N6-(((4-azidobenzyl)oxy)carbonyl)-L-lysine. In some embodiments, the position of the at least one unnatural amino acid is selected from N82, N129, or Q132, wherein the residue positions correspond to positions 82, 129, 132 as set forth in SEQ ID NO: 1, and the at least one unnatural amino acid comprises N6-((2-azidoethoxy)-carbonyl)-L-lysine (AzK), N6-(propargylethoxy)-L-lysine (PraK), N6-(((2-azidobenzyl)oxy)carbonyl)-L-lysine, N6-(((3-azidobenzyl)oxy)carbonyl)-L-lysine, or N6-(((4-azidobenzyl)oxy)carbonyl)-L-lysine. In some embodiments, the position of the at least one unnatural amino acid is selected from N82 or N129, wherein the residue positions correspond to positions 82 and 129 as set forth in SEQ ID NO: 1, and the at least one unnatural amino acid comprises N6-((2-azidoethoxy)-carbonyl)-L-lysine (AzK), N6-(propargylethoxy)-L-lysine (PraK), N6-(((2-azidobenzyl)oxy)carbonyl)-L-lysine, N6-(((3-azidobenzyl)oxy)carbonyl)-L-lysine, or N6-(((4-azidobenzyl)oxy)carbonyl)-L-lysine. In some embodiments, the position of the at least one unnatural amino acid is selected from N82, wherein the residue positions correspond to positions 82 as set forth in SEQ ID NO: 1, and the at least one unnatural amino acid comprises N6-((2-azidoethoxy)-carbonyl)-L-lysine (AzK), N6-(propargylethoxy)-L-lysine (PraK), N6-(((2-azidobenzyl)oxy)carbonyl)-L-lysine, N6-(((3-azidobenzyl)oxy)carbonyl)-L-lysine, or N6-(((4-azidobenzyl)oxy)carbonyl)-L-lysine. In some embodiments, the position of the at least one unnatural amino acid is selected from N129, wherein the residue positions correspond to positions 129 as set forth in SEQ ID NO: 1, and the at least one unnatural amino acid comprises N6-((2-azidoethoxy)-carbonyl)-L-lysine (AzK), N6-(propargylethoxy)-L-lysine (PraK), N6-(((2-azidobenzyl)oxy)carbonyl)-L-lysine, N6-(((3-azidobenzyl)oxy)carbonyl)-L-lysine, or N6-(((4-azidobenzyl)oxy)carbonyl)-L-lysine.

Disclosed herein, in certain embodiments, the position of the at least one unnatural amino acid is selected from N82, N129, or Q132, wherein the residue positions correspond to positions 82, 129, 132 as set forth in SEQ ID NO: 1, and the at least one unnatural amino acid comprises N6-((2-azido-ethoxy)-carbonyl)-L-lysine (AzK). In some embodiments, the position of the at least one unnatural amino acid is selected from N82, N129, or Q132, wherein the residue positions correspond to positions 82, 129, 132 as set forth in SEQ ID NO: 1, and the at least one unnatural amino acid comprises N6-(propargylethoxy)-L-lysine (PraK). In some embodiments, the position of the at least one unnatural amino acid is selected from N82, N129, or Q132, wherein the residue positions correspond to positions 82, 129, 132 as set forth in SEQ ID NO: 1, and the at least one unnatural amino acid comprises N6-(((2-azidobenzyl)oxy)carbonyl)-L-lysine. In some embodiments, the position of the at least one unnatural amino acid is selected from N82, N129, or Q132, wherein the residue positions correspond to positions 82, 129, 132 as set forth in SEQ ID NO: 1, and the at least one unnatural amino acid comprises N6-(((3-azidobenzyl)oxy)carbonyl)-L-lysine. In some embodiments, the position of the at least one unnatural amino acid is selected from N82, N129, or Q132, wherein the residue positions correspond to positions 82, 129, 132 as set forth in SEQ ID NO: 1, and the at least one unnatural amino acid comprises N6-(((4-azidobenzyl)oxy)carbonyl)-L-lysine.

Disclosed herein, in certain embodiments, the position of the at least one unnatural amino acid is selected from N82 or N129, wherein the residue positions correspond to positions 82 and 129 as set forth in SEQ ID NO: 1, and the at least one unnatural amino acid comprises N6-((2-azidoethoxy)-carbonyl)-L-lysine (AzK). In some embodiments, the position of the at least one unnatural amino acid is selected from N82 or N129, wherein the residue positions correspond to positions 82 and 129 as set forth in SEQ ID NO: 1, and the at least one unnatural amino acid comprises N6-(propargylethoxy)-L-lysine (PraK). In some embodiments, the position of the at least one unnatural amino acid is selected from N82 or N129, wherein the residue positions correspond to positions 82 and 129 as set forth in SEQ ID NO: 1, and the at least one unnatural amino acid comprises N6-(((2-azidobenzyl)oxy)carbonyl)-L-lysine. In some embodiments, the position of the at least one unnatural amino acid is selected from N82 or N129, wherein the residue positions correspond to positions 82 and 129 as set forth in SEQ ID NO: 1, and the at least one unnatural amino acid comprises N6-(((3-azidobenzyl)oxy)carbonyl)-L-lysine. In some embodiments, the position of the at least one unnatural amino acid is selected from N82 or N129, wherein the residue positions correspond to positions 82 and 129 as set forth in SEQ ID NO: 1, and the at least one unnatural amino acid comprises N6-(((4-azidobenzyl)oxy)carbonyl)-L-lysine.

Disclosed herein, in certain embodiments, the position of the at least one unnatural amino acid is selected from N82, wherein the residue positions correspond to positions 82 as set forth in SEQ ID NO: 1, and the at least one unnatural amino acid comprises N6-((2-azidoethoxy)-carbonyl)-L-lysine (AzK). In some embodiments, the position of the at least one unnatural amino acid is selected from N82, wherein the residue positions correspond to positions 82 as set forth in SEQ ID NO: 1, and the at least one unnatural amino acid comprises N6-(propargylethoxy)-L-lysine (PraK). In some embodiments, the position of the at least one unnatural amino acid is selected from N82, wherein the residue positions correspond to positions 82 as set forth in SEQ ID NO: 1, and the at least one unnatural amino acid comprises N6-(((2-azidobenzyl)oxy)carbonyl)-L-lysine. In some embodiments, the position of the at least one unnatural amino acid is selected from N82, wherein the residue positions correspond to positions 82 as set forth in SEQ ID NO: 1, and the at least one unnatural amino acid comprises N6-(((3-azidobenzyl)oxy)carbonyl)-L-lysine. In some embodiments, the position of the at least one unnatural amino acid is selected from N82, wherein the residue positions correspond to positions 82 as set forth in SEQ ID NO: 1, and the at least one unnatural amino acid comprises N6-(((4-azidobenzyl)oxy)carbonyl)-L-lysine.

Disclosed herein, in certain embodiments, the position of the at least one unnatural amino acid is selected from N129, wherein the residue positions correspond to positions 129 as set forth in SEQ ID NO: 1, and the at least one unnatural amino acid comprises N6-((2-azidoethoxy)-carbonyl)-L-lysine (AzK). In some embodiments, the position of the at least one unnatural amino acid is selected from N129, wherein the residue positions correspond to positions 129 as set forth in SEQ ID NO: 1, and the at least one unnatural amino acid comprises N6-(propargylethoxy)-L-lysine (PraK). In some embodiments, the position of the at least one unnatural amino acid is selected from N129, wherein the residue positions correspond to positions 129 as set forth in SEQ ID NO: 1, and the at least one unnatural amino acid comprises N6-(((2-azidobenzyl)oxy)carbonyl)-L-lysine. In some embodiments, the position of the at least one unnatural amino acid is selected from N129, wherein the residue positions correspond to positions 129 as set forth in SEQ ID NO: 1, and the at least one unnatural amino acid comprises N6-(((3-azidobenzyl)oxy)carbonyl)-L-lysine, or N6-(((4-azidobenzyl)oxy)carbonyl)-L-lysine.

Disclosed herein, in certain embodiments, the modified IL-10 polypeptide is covalently attached to a conjugating moiety through the at least one unnatural amino acid. In some embodiments, the conjugating moiety comprises a water-soluble polymer, a lipid, a protein, or a peptide. In some embodiments, the water-soluble polymer comprises polyethylene glycol (PEG), poly(propylene glycol) (PPG), copolymers of ethylene glycol and propylene glycol, poly(oxyethylated polyol), poly(olefinic alcohol), poly(vinylpyrrolidone), poly(hydroxyalkylmethacrylamide), poly(hydroxyalkylmethacrylate), poly(saccharides), poly(α-hydroxy acid), poly(vinyl alcohol), polyphosphazene, polyoxazolines (POZ), poly(N-acryloylmorpholine), or a combination thereof.

Disclosed herein, in certain embodiments, the modified IL-10 polypeptide is covalently attached to a PEG molecule through the at least one unnatural amino acid. In some embodiments, the PEG molecule is a linear PEG. In some embodiments, the PEG molecule is a branched PEG. In some embodiments, the weight-average molecular weight of the PEG is from about 100 Daltons to about 150,000 Daltons. Exemplary ranges include, for example, weight-average molecular weights in the range of greater than 5,000 Daltons to about 100,000 Daltons, in the range of from about 6,000 Daltons to about 90,000 Daltons, in the range of from about 10,000 Daltons to about 85,000 Daltons, in the range of greater than 10,000 Daltons to about 85,000 Daltons, in the range of from about 20,000 Daltons to about 85,000 Daltons, in the range of from about 53,000 Daltons to about 85,000 Daltons, in the range of from about 25,000 Daltons to about 120,000 Daltons, in the range of from about 29,000 Daltons to about 120,000 Daltons, in the range of from about 35,000 Daltons to about 120,000 Daltons, and in the range of from about 40,000 Daltons to about 120,000 Daltons.

Exemplary weight-average molecular weights for the PEG include about 100 Daltons, about 200 Daltons, about 300 Daltons, about 400 Daltons, about 500 Daltons, about 600 Daltons, about 700 Daltons, about 750 Daltons, about 800 Daltons, about 900 Daltons, about 1,000 Daltons, about 1,500 Daltons, about 2,000 Daltons, about 2,200 Daltons, about 2,500 Daltons, about 3,000 Daltons, about 4,000 Daltons, about 4,400 Daltons, about 4,500 Daltons, about 5,000 Daltons, about 5,500 Daltons, about 6,000 Daltons, about 7,000 Daltons, about 7,500 Daltons, about 8,000 Daltons, about 9,000 Daltons, about 10,000 Daltons, about 11,000 Daltons, about 12,000 Daltons, about 13,000 Daltons, about 14,000 Daltons, about 15,000 Daltons, about 20,000 Daltons, about 22,500 Daltons, about 25,000 Daltons, about 30,000 Daltons, about 35,000 Daltons, about 40,000 Daltons, about 45,000 Daltons, about 50,000 Daltons, about 55,000 Daltons, about 60,000 Daltons, about 65,000 Daltons, about 70,000 Daltons, and about 75,000 Daltons. Branched versions of the PEG (e.g., a branched 40,000 Dalton PEG comprised of two 20,000 Dalton polymers) having a total molecular weight of any of the foregoing can also be used. In some embodiments, the molecular weight of the PEG is about 5,000 Daltons. In some embodiments, the molecular weight of the PEG is about 7,500 Daltons. In some embodiments, the molecular weight of the PEG is about 8,000 Daltons. In some embodiments, the molecular weight of the PEG is about 9,000 Daltons. In some embodiments, the molecular weight of the PEG is about 10,000 Daltons. In some embodiments, the molecular weight of the PEG is about 11,000 Daltons. In some embodiments, the molecular weight of the PEG is about 12,000 Daltons. In some embodiments, the molecular weight of the PEG is about 13,000 Daltons. In some embodiments, the molecular weight of the PEG is about 14,000 Daltons. In some embodiments, the molecular weight of the PEG is about 15,000 Daltons. In some embodiments, the molecular weight of the PEG is about 16,000 Daltons. In some embodiments, the molecular weight of the PEG is about 17,000 Daltons. In some embodiments, the molecular weight of the PEG is about 18,000 Daltons. In some embodiments, the molecular weight of the PEG is about 19,000 Daltons. In some embodiments, the molecular weight of the PEG is about 20,000 Daltons. In some embodiments, the molecular weight of the PEG is about 21,000 Daltons. In some embodiments, the molecular weight of the PEG is about 22,000 Daltons. In some embodiments, the molecular weight of the PEG is about 23,000 Daltons. In some embodiments, the molecular weight of the PEG is about 25,000 Daltons. In some embodiments, the molecular weight of the PEG is about 30,000 Daltons. In some embodiments, the molecular weight of the PEG is about 40,000 Daltons. In some embodiments, the molecular weight of the PEG is about 50,000 Daltons. In some embodiments, the molecular weight of the PEG is about 60,000 Daltons. In some embodiments, the molecular weight of the PEG is about 70,000 Daltons. In some embodiments, the molecular weight of the PEG is about 80,000 Daltons. In some embodiments, the molecular weight of the PEG is about 90,000 Daltons. In some embodiments, the molecular weight of the PEG is about 100,000 Daltons. In some embodiments, the molecular weight of the PEG is about 120,000 Daltons. In some embodiments, the molecular weight of the PEG is about 130,000 Daltons. In some embodiments, the molecular weight of the PEG is about 140,000 Daltons. In some embodiments, the molecular weight of the PEG is about 150,000 Daltons. In some embodiments, the molecular weight of the PEG is about 175,000 Daltons. In some embodiments, the molecular weight of the PEG is about 200,000 Daltons.

Disclosed herein, in certain embodiments, the modified IL-10 polypeptide is covalently attached to a monosaccharide or polysaccharide. In certain embodiments, the modified IL-10 polypeptide is covalently attached to a monosaccharide. In certain embodiments, the modified IL-10 polypeptide is covalently attached to a polysaccharide. In certain embodiments, the monosaccharide or polysaccharide are bonded to the IL-10 polypeptide by a linker through a cysteine or asparagine residue in the polypeptide. In certain embodiments, the monosaccharide or polysaccharide are bonded to the IL-10 polypeptide by a linker through a cysteine residue in the polypeptide. In certain embodiments, the monosaccharide or polysaccharide are bonded to the IL-10 polypeptide by a linker through an asparagine residue in the polypeptide.

Disclosed herein, in certain embodiments, the modified IL-10 polypeptide is covalently attached to a PEG molecule through the at least one unnatural amino acid and covalently attached to a monosaccharide or polysaccharide through another amino acid in the polypeptide. In some embodiments, the PEG molecule is a linear PEG. In some embodiments, the PEG molecule is a branched PEG. In certain embodiments, the modified IL-10 polypeptide is covalently attached to a PEG molecule through the at least one unnatural amino acid and covalently attached to a monosaccharide through another amino acid in the polypeptide. In certain embodiments, the modified IL-10 polypeptide is covalently attached to a PEG molecule through the at least one unnatural amino acid and covalently attached to a polysaccharide through another amino acid in the polypeptide. In certain embodiments, the monosaccharide or polysaccharide are bonded to the IL-10 polypeptide by a linker through a cysteine or asparagine residue in the polypeptide. In certain embodiments, the monosaccharide or polysaccharide are bonded to the IL-10 polypeptide by a linker through a cysteine residue in the polypeptide. In certain embodiments, the monosaccharide or polysaccharide are bonded to the IL-10 polypeptide by a linker through an asparagine residue in the polypeptide.

Disclosed herein, in certain embodiments, is an isolated and modified interleukin 10 (IL-10) polypeptide comprising at least one unnatural amino acid, wherein the isolated and modified IL-10 polypeptide is a biologically active IL-10 polypeptide that binds to an IL-10 receptor (IL-10R) to form an IL-10/IL-10R complex. In some embodiments, the biologically active IL-10 polypeptide has a substantially enhanced plasma half-life compared to a plasma half-life of a wild-type IL-10 protein. In some embodiments, the at least one unnatural amino acid is located in helix C, D, or E. In some embodiments, the at least one unnatural amino acid is located at a surface exposed location in helix C, D, or E. In some embodiments, the position of the at least one unnatural amino acid is selected from E67, Q70, E74, E75, Q79, N82, K88, K125, N126, N129, K130, or Q132, wherein the residue positions correspond to positions 67, 70, 74, 75, 79, 82, 88, 125, 126, 129, 130, and 132 as set forth in SEQ ID NO: 1. In some embodiments, the position of the at least one unnatural amino acid is selected from E67, Q70, E74, E75, Q79, or N82, wherein the residue positions correspond to positions 67, 70, 74, 75, 79, and 82 as set forth in SEQ ID NO: 1. In some embodiments, the position of the at least one unnatural amino acid is selected from K88, K125, N126, N129, K130, or Q132, wherein the residue positions correspond to positions 88, 125, 126, 129, 130, and 132 as set forth in SEQ ID NO: 1. In some embodiments, the position of the at least one unnatural amino acid is selected from K125, N126, N129, K130, or Q132, wherein the residue positions correspond to positions 125, 126, 129, 130, and 132 as set forth in SEQ ID NO: 1. In some embodiments, the position of the at least one unnatural amino acid is selected from Q70, E74, N82, K88, N126, K130, or Q132, wherein the residue positions correspond to positions 70, 74, 82, 88, 126, 130, and 132 as set forth in SEQ ID NO: 1. In some embodiments, the amino acid sequence is at least or about 99.0% identical to amino acids 33 to 158 of SEQ ID NO: 1. In some embodiments, the amino acid sequence comprises at least 1, 2, 3, 4, 5, 6, 7, 8, 9, 10, 11, 12, or 13 wild-type lysines. In some embodiments, the amino acid sequence comprises a wild-type lysine at one or more of K34, K40, K49, K57, K88, K99, K117, K119, K125, K130, K134, K138, and K157. In some embodiments, the amino acid sequence comprises a wild type lysine at least 2, 3, 4, 5, 6, 7, 8, 9, 10, 11, or 12 of K34, K40, K49, K57, K88, K99, K117, K119, K125, K130, K134, K138, and K157. In some embodiments, the amino acid sequence comprises a wild-type lysine at K34, K40, K49, K57, K88, K99, K117, K119, K125, K130, K134, K138, and K157. In some embodiments, the at least one unnatural amino acid is located proximal to the N-terminus. In some embodiments, the at least one unnatural amino acid is located within the first 10, 20, 30, 40, or 50 residues from the N-terminus. In some embodiments, the at least one unnatural amino acid is located proximal to the C-terminus. In some embodiments, the at least one unnatural amino acid is located within the first 10, 20, 30, 40, or 50 residues from the C-terminus. In some embodiments, the at least one unnatural amino acid: a) is a lysine analogue; b) comprises an aromatic side chain; c) comprises an azido group; d) comprises an alkyne group; or e) comprises an aldehyde or ketone group. In some embodiments, the at least one unnatural amino acid does not comprise an aromatic side chain. In some embodiments, the at least one unnatural amino acid comprises N6-((2-azidoethoxy)-carbonyl)-L-lysine (AzK), N6-(propargylethoxy)-L-lysine (PraK), BCN-L-lysine, norbornene lysine, TCO-lysine, methyltetrazine lysine, allyloxycarbonyllysine, 2-amino-8-oxononanoic acid, 2-amino-8-oxooctanoic acid, p-acetyl-L-phenylalanine, p-azidomethyl-L-phenylalanine (pAMF), p-iodo-L-phenylalanine, m-acetylphenylalanine, 2-amino-8-oxononanoic acid, p-propargyloxyphenylalanine, p-propargyl-phenylalanine, 3-methyl-phenylalanine, L-Dopa, fluorinated phenylalanine, isopropyl-L-phenylalanine, p-azido-L-phenylalanine, p-acyl-L-phenylalanine, p-benzoyl-L-phenylalanine, p-bromophenylalanine, p-amino-L-phenylalanine, isopropyl-L-phenylalanine, O-allyltyrosine, O-methyl-L-tyrosine, O-4-allyl-L-tyrosine, 4-propyl-L-tyrosine, phosphonotyrosine, tri-O-acetyl-GlcNAcp-serine, L-phosphoserine, phosphonoserine, L-3-(2-naphthyl)alanine, 2-amino-3-((2-((3-(benzyloxy)-3-oxopropyl)amino)ethyl)selanyl)propanoic acid, 2-amino-3-(phenylselanyl)propanoic, or selenocysteine. In some embodiments, the at least one unnatural amino acid is incorporated into the modified IL-10 polypeptide by an orthogonal tRNA synthetase/tRNA pair. In some embodiments, the orthogonal tRNA of the orthogonal synthetase/tRNA pair comprises at least one unnatural nucleobase. In some embodiments, the modified IL-10 polypeptide dimerizes with a second modified IL-10 polypeptide, thereby generating an IL-10 dimer comprising two unnatural amino acids. In some embodiments, the unnatural amino acid of the modified IL-10 polypeptide is located at a residue position that is different from the unnatural amino acid of the second modified IL-10 polypeptide. In some embodiments, both unnatural amino acids are located at the same residue position in the respective IL-10 polypeptides. In some embodiments, the modified IL-10 polypeptide dimerizes with an IL-10 polypeptide that does not comprise an unnatural amino acid. In some embodiments, the modified IL-10 polypeptide dimerizes with a wild-type IL-10 polypeptide. In some embodiments, the modified IL-10 polypeptide is covalently attached to a conjugating moiety through the at least one unnatural amino acid. In some embodiments, the conjugating moiety comprises a water-soluble polymer, a lipid, a protein, or a peptide. In some embodiments, the water-soluble polymer comprises polyethylene glycol (PEG), poly(propylene glycol) (PPG), copolymers of ethylene glycol and propylene glycol, poly(oxyethylated polyol), poly(olefinic alcohol), poly(vinylpyrrolidone), poly(hydroxyalkylmethacrylamide), poly(hydroxyalkylmethacrylate), poly(saccharides), poly(α-hydroxy acid), poly(vinyl alcohol), polyphosphazene, polyoxazolines (POZ), poly(N-acryloylmorpholine), or a combination thereof. In some embodiments, the water-soluble polymer comprises a PEG molecule. In some embodiments, the PEG molecule is a linear PEG. In some embodiments, the PEG molecule is a branched PEG. In some embodiments, the water-soluble polymer comprises a polysaccharide. In some embodiments, the polysaccharide comprises dextran, polysialic acid (PSA), hyaluronic acid (HA), amylose, heparin, heparan sulfate (HS), dextrin, or hydroxyethyl-starch (HES). In some embodiments, the lipid comprises a fatty acid. In some embodiments, the fatty acid comprises from about 6 to about 26 carbon atoms, from about 6 to about 24 carbon atoms, from about 6 to about 22 carbon atoms, from about 6 to about 20 carbon atoms, from about 6 to about 18 carbon atoms, from about 20 to about 26 carbon atoms, from about 12 to about 26 carbon atoms, from about 12 to about 24 carbon atoms, from about 12 to about 22 carbon atoms, from about 12 to about 20 carbon atoms, or from about 12 to about 18 carbon atoms. In some embodiments, the fatty acid is a saturated fatty acid. In some embodiments, the protein comprises an albumin, a transferrin, or a transthyretin. In some embodiments, the protein comprises an antibody or its binding fragments thereof. In some embodiments, the antibody or its binding fragments thereof comprises an Fc portion of an antibody. In some embodiments, the peptide comprises a XTEN peptide, a glycine-rich homoamino acid polymer (HAP), a PAS polypeptide, an elastin-like polypeptide (ELP), a CTP peptide, or a gelatin-like protein (GLK) polymer. In some embodiments, the conjugating moiety is indirectly bound to the at least one unnatural amino acid of the modified IL-10 through a linker. In some embodiments, the linker comprises a homobifunctional linker, a heterobifunctional linker, a zero-length linker, a cleavable or a non-cleavable dipeptide linker, a maleimide group, a spacer, or a combination thereof. In some embodiments, the modified IL-10 polypeptide is: a) a functionally active fragment of a full-length IL-10 polypeptide; b) a recombinant IL-10 polypeptide; or c) a recombinant human IL-10 polypeptide. In some embodiments, the modified IL-10 polypeptide comprises an N-terminal deletion, a C-terminal deletion, or a combination thereof. In some embodiments, the N-terminal deletion comprises a deletion of the first 1, 2, 3, 4, 5, 6, 7, 8, 9, 10, 11, 12, 13, 14, 15, 20, 25, or 30 residues from the N-terminus, wherein the residue positions are in reference to the positions in SEQ ID NO: 1. In some embodiments, the C-terminal deletion comprises a deletion of the last 1, 2, 3, 4, 5, 6, 7, 8, 9, 10, 11, 12, 13, 14, 15, 20, or more residues from the C-terminus, wherein the residue positions are in reference to the positions in SEQ ID NO: 1. In some embodiments, the modified IL-10 polypeptide comprises about 80%, 85%, 90%, 95%, 96%, 97%, 98%, or 99% sequence identity to SEQ ID NO: 1. In some embodiments, the IL-10 dimer binds to an IL-10R to form an IL-10/IL-10R complex. In some embodiments, the enhanced plasma half-life of the IL-10 dimer is at least 90 minutes, 2 hours, 3 hours, 4 hours, 5 hours, 6 hours, 7 hours, 8 hours, 9 hours, 10 hours, 11 hours, 12 hours, 18 hours, 24 hours, 36 hours, 48 hours, 3 days, 4 days, 5 days, 6 days, 7 days, 10 days, 12 days, 14 days, 21 days, 28 days, 30 days, or longer than the plasma half-life of the wild-type IL-10 dimer. In some embodiments, the enhanced plasma half-life of the IL-10 dimer is about 90 minutes, 2 hours, 3 hours, 4 hours, 5 hours, 6 hours, 7 hours, 8 hours, 9 hours, 10 hours, 11 hours, 12 hours, 18 hours, 24 hours, 36 hours, 48 hours, 3 days, 4 days, 5 days, 6 days, 7 days, 10 days, 12 days, 14 days, 21 days, 28 days, or 30 days. In some embodiments, the location of the at least one unnatural amino acid does not substantially interfere with dimerization of the IL-10 polypeptide. In some embodiments, the location of the at least one unnatural amino acid does not significantly interfere with binding of the IL-10 dimer to IL-10R. In some embodiments, the location of the at least one unnatural amino acid impairs signaling of the IL-10R by less than 90%, 80%, 70%, 60%, 50%, 40%, 30%, 20%, 10%, 5%, 4%, 3%, 2%, 1%, or less. In some embodiments, the location of the at least one unnatural amino acid does not significantly impair signaling of the IL-10R.

Disclosed herein, in certain embodiments, is an isolated and modified interleukin 10 (IL-10) polypeptide comprising at least one unnatural amino acid at a position on the polypeptide that enhances exposure of a plurality of tumor cells to tumor infiltrating immune cells, wherein the enhanced exposure of the plurality of tumor cells is compared to an exposure of the plurality of tumor cells in the presence of a wild-type IL-10 protein. In some embodiments, also described herein is an isolated and modified interleukin 10 (IL-10) polypeptide comprising at least one unnatural amino acid at a position on the polypeptide that enhances and/or sustains cytotoxicity and/or clonal expansion of tumor infiltrating immune cells, wherein the enhanced cytotoxicity and clonal expansion is compared to an exposure of tumor infiltrating immune cells resulting from an equal dose of a wild-type IL-10 protein. In some embodiments, the at least one unnatural amino acid is located in helix C, D, or E. In some embodiments, the at least one unnatural amino acid is located at a surface exposed location in helix C, D, or E. In some embodiments, the position of the at least one unnatural amino acid is selected from E67, Q70, E74, E75, Q79, N82, K88, K125, N126, N129, K130, or Q132, wherein the residue positions correspond to positions 67, 70, 74, 75, 79, 82, 88, 125, 126, 129, 130, and 132 as set forth in SEQ ID NO: 1. In some embodiments, the position of the at least one unnatural amino acid is selected from E67, Q70, E74, E75, Q79, or N82, wherein the residue positions correspond to positions 67, 70, 74, 75, 79, and 82 as set forth in SEQ ID NO: 1. In some embodiments, the position of the at least one unnatural amino acid is selected from K88, K125, N126, N129, K130, or Q132, wherein the residue positions correspond to positions 88, 125, 126, 129, 130, and 132 as set forth in SEQ ID NO: 1. In some embodiments, the position of the at least one unnatural amino acid is selected from K125, N126, N129, K130, or Q132, wherein the residue positions correspond to positions 125, 126, 129, 130, and 132 as set forth in SEQ ID NO: 1. In some embodiments, the position of the at least one unnatural amino acid is selected from Q70, E74, N82, K88, N126, K130, or Q132, wherein the residue positions correspond to positions 70, 74, 82, 88, 126, 130, and 132 as set forth in SEQ ID NO: 1. In some embodiments, the amino acid sequence is at least or about 99.0% identical to amino acids 33 to 158 of SEQ ID NO: 1. In some embodiments, the amino acid sequence comprises at least 1, 2, 3, 4, 5, 6, 7, 8, 9, 10, 11, 12, or 13 wild-type lysines. In some embodiments, the amino acid sequence comprises a wild-type lysine at one or more of K34, K40, K49, K57, K88, K99, K117, K119, K125, K130, K134, K138, and K157. In some embodiments, the amino acid sequence comprises a wild type lysine at least 2, 3, 4, 5, 6, 7, 8, 9, 10, 11, or 12 of K34, K40, K49, K57, K88, K99, K117, K119, K125, K130, K134, K138, and K157. In some embodiments, the amino acid sequence comprises a wild-type lysine at K34, K40, K49, K57, K88, K99, K117, K119, K125, K130, K134, K138, and K157. In some embodiments, the position of the at least one unnatural amino acid is located proximal to the N-terminus. In some embodiments, the at least one unnatural amino acid is located within the first 10, 20, 30, 40, or 50 residues from the N-terminus. In some embodiments, the at least one unnatural amino acid is located proximal to the C-terminus. In some embodiments, the at least one unnatural amino acid is located within the first 10, 20, 30, 40, or 50 residues from the C-terminus. In some embodiments, the at least one unnatural amino acid: a) is a lysine analogue; b) comprises an aromatic side chain; c) comprises an azido group; d) comprises an alkyne group; or e) comprises an aldehyde or ketone group. In some embodiments, the at least one unnatural amino acid does not comprise an aromatic side chain. In some embodiments, the at least one unnatural amino acid comprises N6-((2-azidoethoxy)-carbonyl)-L-lysine (AzK), N6-(propargylethoxy)-L-lysine (PraK), BCN-L-lysine, norbornene lysine, TCO-lysine, methyltetrazine lysine, allyloxycarbonyllysine, 2-amino-8-oxononanoic acid, 2-amino-8-oxooctanoic acid, p-acetyl-L-phenylalanine, p-azidomethyl-L-phenylalanine (pAMF), p-iodo-L-phenylalanine, m-acetylphenylalanine, 2-amino-8-oxononanoic acid, p-propargyloxyphenylalanine, p-propargyl-phenylalanine, 3-methyl-phenylalanine, L-Dopa, fluorinated phenylalanine, isopropyl-L-phenylalanine, p-azido-L-phenylalanine, p-acyl-L-phenylalanine, p-benzoyl-L-phenylalanine, p-bromophenylalanine, p-amino-L-phenylalanine, isopropyl-L-phenylalanine, O-allyltyrosine, O-methyl-L-tyrosine, O-4-allyl-L-tyrosine, 4-propyl-L-tyrosine, phosphonotyrosine, tri-O-acetyl-GlcNAcp-serine, L-phosphoserine, phosphonoserine, L-3-(2-naphthyl)alanine, 2-amino-3-((2-((3-(benzyloxy)-3-oxopropyl)amino)ethyl)selanyl)propanoic acid, 2-amino-3-(phenylselanyl)propanoic, or selenocysteine. In some embodiments, the at least one unnatural amino acid is incorporated into the modified IL-10 polypeptide by an orthogonal tRNA synthetase/tRNA pair. In some embodiments, the orthogonal tRNA of the orthogonal synthetase/tRNA pair comprises at least one unnatural nucleobase. In some embodiments, the modified IL-10 polypeptide dimerizes with a second modified IL-10 polypeptide, thereby generating an IL-10 dimer comprising two unnatural amino acids. In some embodiments, the unnatural amino acid of the modified IL-10 polypeptide is located at a residue position that is different from the unnatural amino acid of the second modified IL-10 polypeptide. In some embodiments, both unnatural amino acids are located at the same residue position in the respective IL-10 polypeptides. In some embodiments, the modified IL-10 polypeptide dimerizes with an IL-10 polypeptide that does not comprise an unnatural amino acid. In some embodiments, the modified IL-10 polypeptide dimerizes with a wild-type IL-10 polypeptide.

In some embodiments, the modified IL-10 polypeptide is covalently attached to a conjugating moiety through the at least one unnatural amino acid. In some embodiments, the conjugating moiety comprises a water-soluble polymer, a lipid, a protein, or a peptide. In some embodiments, the water-soluble polymer comprises polyethylene glycol (PEG), poly(propylene glycol) (PPG), copolymers of ethylene glycol and propylene glycol, poly(oxyethylated polyol), poly(olefinic alcohol), poly(vinylpyrrolidone), poly(hydroxyalkylmethacrylamide), poly(hydroxyalkylmethacrylate), poly(saccharides), poly(α-hydroxy acid), poly(vinyl alcohol), polyphosphazene, polyoxazolines (POZ), poly(N-acryloylmorpholine), or a combination thereof. In some embodiments, the water-soluble polymer comprises a PEG molecule. In some embodiments, the PEG molecule is a linear PEG. In some embodiments, the PEG molecule is a branched PEG. In some embodiments, the water-soluble polymer comprises a polysaccharide. In some embodiments, the polysaccharide comprises dextran, polysialic acid (PSA), hyaluronic acid (HA), amylose, heparin, heparan sulfate (HS), dextrin, or hydroxyethyl-starch (HES). In some embodiments, the lipid comprises a fatty acid. In some embodiments, the fatty acid comprises from about 6 to about 26 carbon atoms, from about 6 to about 24 carbon atoms, from about 6 to about 22 carbon atoms, from about 6 to about 20 carbon atoms, from about 6 to about 18 carbon atoms, from about 20 to about 26 carbon atoms, from about 12 to about 26 carbon atoms, from about 12 to about 24 carbon atoms, from about 12 to about 22 carbon atoms, from about 12 to about 20 carbon atoms, or from about 12 to about 18 carbon atoms. In some embodiments, the fatty acid is a saturated fatty acid. In some embodiments, the protein comprises an albumin, a transferrin, or a transthyretin. In some embodiments, the protein comprises an antibody or its binding fragments thereof. In some embodiments, the antibody or its binding fragments thereof comprises an Fc portion of an antibody. In some embodiments, the peptide comprises a XTEN peptide, a glycine-rich homoamino acid polymer (HAP), a PAS polypeptide, an elastin-like polypeptide (ELP), a CTP peptide, or a gelatin-like protein (GLK) polymer. In some embodiments, the conjugating moiety is indirectly bound to the at least one unnatural amino acid of the modified IL-10 through a linker. In some embodiments, the linker comprises a homobifunctional linker, a heterobifunctional linker, a zero-length linker, a cleavable or a non-cleavable dipeptide linker, a maleimide group, a spacer, or a combination thereof. In some embodiments, the modified IL-10 polypeptide is: a) a functionally active fragment of a full-length IL-10 polypeptide; b) a recombinant IL-10 polypeptide; or c) a recombinant human IL-10 polypeptide. In some embodiments, the modified IL-10 polypeptide comprises an N-terminal deletion, a C-terminal deletion, or a combination thereof. In some embodiments, the N-terminal deletion comprises a deletion of the first 1, 2, 3, 4, 5, 6, 7, 8, 9, 10, 11, 12, 13, 14, 15, 20, 25, or 30 residues from the N-terminus, wherein the residue positions are in reference to the positions in SEQ ID NO: 1. In some embodiments, the C-terminal deletion comprises a deletion of the last 1, 2, 3, 4, 5, 6, 7, 8, 9, 10, 11, 12, 13, 14, 15, 20, or more residues from the C-terminus, wherein the residue positions are in reference to the positions in SEQ ID NO: 1. In some embodiments, the modified IL-10 polypeptide comprises about 80%, 85%, 90%, 95%, 96%, 97%, 98%, or 99% sequence identity to SEQ ID NO: 1. In some embodiments, the IL-10 dimer binds to an IL-10R to form an IL-10/IL-10R complex. In some embodiments, the enhanced plasma half-life of the IL-10 dimer is at least 90 minutes, 2 hours, 3 hours, 4 hours, 5 hours, 6 hours, 7 hours, 8 hours, 9 hours, 10 hours, 11 hours, 12 hours, 18 hours, 24 hours, 36 hours, 48 hours, 3 days, 4 days, 5 days, 6 days, 7 days, 10 days, 12 days, 14 days, 21 days, 28 days, 30 days, or longer than the plasma half-life of the wild-type IL-10 dimer. In some embodiments, the enhanced plasma half-life of the IL-10 dimer is about 90 minutes, 2 hours, 3 hours, 4 hours, 5 hours, 6 hours, 7 hours, 8 hours, 9 hours, 10 hours, 11 hours, 12 hours, 18 hours, 24 hours, 36 hours, 48 hours, 3 days, 4 days, 5 days, 6 days, 7 days, 10 days, 12 days, 14 days, 21 days, 28 days, or 30 days. In some embodiments, the location of the at least one unnatural amino acid does not substantially interfere with dimerization of the IL-10 polypeptide. In some embodiments, the location of the at least one unnatural amino acid does not significantly interfere with binding of the IL-10 dimer to IL-10R. In some embodiments, the location of the at least one unnatural amino acid impairs signaling of the IL-10R by less than 90%, 80%, 70%, 60%, 50%, 40%, 30%, 20%, 10%, 5%, 4%, 3%, 2%, 1%, or less. In some embodiments, the location of the at least one unnatural amino acid does not significantly impair signaling of the IL-10R. In some embodiments, the location of the at least one unnatural amino acid does not impair signaling of the IL-10R as measured by phosphorylation of Stat3 and/or by activation of the IL-10R signaling.

Disclosed herein, in certain embodiments, is a polynucleic acid polymer encoding a modified IL-10 polypeptide described herein.

Disclosed herein, in certain embodiments, is a vector comprising a polynucleic acid polymer described herein.

Disclosed herein, in certain embodiments, is an interleukin 10 (IL-10) conjugate comprising an IL-10 polypeptide comprising at least one unnatural amino acid, and a conjugating moiety bound to the at least one unnatural amino acid. In some embodiments, the conjugating moiety is directly bound to the at least one unnatural amino acid. In some embodiments, the conjugating moiety is indirectly bound to the at least one unnatural amino acid via a linker. In some embodiments, the at least one unnatural amino acid is located in helix C, D, or E. In some embodiments, the at least one unnatural amino acid is located at a surface exposed location in helix C, D, or E. In some embodiments, the position of the at least one unnatural amino acid is selected from E67, Q70, E74, E75, Q79, N82, K88, K125, N126, N129, K130, or Q132, wherein the residue positions correspond to positions 67, 70, 74, 75, 79, 82, 88, 125, 126, 129, 130, and 132 as set forth in SEQ ID NO: 1. In some embodiments, the position of the at least one unnatural amino acid is selected from E67, Q70, E74, E75, Q79, or N82, wherein the residue positions correspond to positions 67, 70, 74, 75, 79, and 82 as set forth in SEQ ID NO: 1. In some embodiments, the position of the at least one unnatural amino acid is selected from K88, K125, N126, N129, K130, or Q132, wherein the residue positions correspond to positions 88, 125, 126, 129, 130, and 132 as set forth in SEQ ID NO: 1. In some embodiments, the position of the at least one unnatural amino acid is selected from K125, N126, N129, K130, or Q132, wherein the residue positions correspond to positions 125, 126, 129, 130, and 132 as set forth in SEQ ID NO: 1. In some embodiments, the position of the at least one unnatural amino acid is selected from Q70, E74, N82, K88, N126, K130, or Q132, wherein the residue positions correspond to positions 70, 74, 82, 88, 126, 130, and 132 as set forth in SEQ ID NO: 1. In some embodiments, the amino acid sequence is at least or about 99.0% identical to amino acids 33 to 158 of SEQ ID NO: 1. In some embodiments, the amino acid sequence comprises at least 1, 2, 3, 4, 5, 6, 7, 8, 9, 10, 11, 12, or 13 wild-type lysines. In some embodiments, the amino acid sequence comprises a wild-type lysine at one or more of K34, K40, K49, K57, K88, K99, K117, K119, K125, K130, K134, K138, and K157. In some embodiments, the amino acid sequence comprises a wild type lysine at least 2, 3, 4, 5, 6, 7, 8, 9, 10, 11, or 12 of K34, K40, K49, K57, K88, K99, K117, K119, K125, K130, K134, K138, and K157. In some embodiments, the amino acid sequence comprises a wild-type lysine at K34, K40, K49, K57, K88, K99, K117, K119, K125, K130, K134, K138, and K157. In some embodiments, the at least one unnatural amino acid is located proximal to the N-terminus. In some embodiments, the at least one unnatural amino acid is located within the first 10, 20, 30, 40, or 50 residues from the N-terminus. In some embodiments, the at least one unnatural amino acid is located proximal to the C-terminus. In some embodiments, the at least one unnatural amino acid is located within the first 10, 20, 30, 40, or 50 residues from the C-terminus. In some embodiments, the IL-10 polypeptide comprises two or more unnatural amino acids. In some embodiments, the IL-10 polypeptide dimerizes with a second IL-10 polypeptide comprising at least one unnatural amino acid. In some embodiments, the IL-10 polypeptide dimerizes with a second IL-10 polypeptide that does not comprise an unnatural amino acid. In some embodiments, the IL-10 polypeptide dimerizes with a wild-type IL-10 polypeptide. In some embodiments, the IL-10 dimer comprises two or more conjugating moieties, wherein each of the two or more conjugating moieties is bound to an unnatural amino acid located at the same residue position within the respective IL-10 monomer. In some embodiments, the IL-10 dimer comprises two or more conjugating moieties, wherein each of the two or more conjugating moieties is bound to an unnatural amino acid located at a different residue position within the IL-10 dimer. In some embodiments, the IL-10 polypeptide comprises an enhanced plasma half-life, wherein the enhanced plasma half-life is compared to a plasma half-life of a wild-type IL-10 protein. In some embodiments, the IL-10 polypeptide is a biologically active IL-10 polypeptide that binds to an IL-10 receptor (IL-10R) to form an IL-10/IL-10R complex and activates the IL-10R signaling pathway.

Disclosed herein, in certain embodiments, is an IL-10/IL-10R complex comprising a modified IL-10 dimer comprising at least one unnatural amino acid and an IL-10R, wherein the modified IL-10 dimer has an enhanced plasma half-life compared to a plasma half-life of a wild-type IL-10 dimer. In some embodiments, the modified IL-10 dimer further comprises a conjugating moiety covalently attached to the at least one unnatural amino acid.

Disclosed herein, in certain embodiments, is a pharmaceutical composition comprising: an isolated and modified IL-10 polypeptide described herein or an IL-10 conjugate described herein; and a pharmaceutically acceptable excipient. In some embodiments, the pharmaceutical composition is formulated for systemic delivery. In some embodiments, the pharmaceutical composition is formulated for parenteral administration.

Disclosed herein, in certain embodiments, is a method of treating a proliferative disease or condition in a subject in need thereof, comprising: administering to the subject a therapeutically effective amount of an isolated and modified IL-10 polypeptide described herein, an IL-10 conjugate described herein; or a pharmaceutical composition described herein. In some embodiments, the proliferative disease or condition is a cancer. In some embodiments, the cancer is a solid tumor cancer. In some embodiments, the solid tumor cancer is bladder cancer, bone cancer, brain cancer, breast cancer, colorectal cancer, esophageal cancer, eye cancer, head and neck cancer, kidney cancer, lung cancer, melanoma, ovarian cancer, pancreatic cancer, or prostate cancer. In some embodiments, the cancer is a hematologic malignancy. In some embodiments, the hematologic malignancy is chronic lymphocytic leukemia (CLL), small lymphocytic lymphoma (SLL), follicular lymphoma (FL), diffuse large B-cell lymphoma (DLBCL), mantle cell lymphoma (MCL), Waldenstrom's macroglobulinemia, multiple myeloma, extranodal marginal zone B cell lymphoma, nodal marginal zone B cell lymphoma, Burkitt's lymphoma, non-Burkitt high grade B cell lymphoma, primary mediastinal B-cell lymphoma (PMBL), immunoblastic large cell lymphoma, precursor B-lymphoblastic lymphoma, B cell prolymphocytic leukemia, lymphoplasmacytic lymphoma, splenic marginal zone lymphoma, plasma cell myeloma, plasmacytoma, mediastinal (thymic) large B cell lymphoma, intravascular large B cell lymphoma, primary effusion lymphoma, or lymphomatoid granulomatosis. In some embodiments, the method further comprises administering an additional therapeutic agent. In some embodiments, the isolated and modified IL-10 polypeptide described herein, the IL-10 conjugate described herein; or the pharmaceutical composition described herein and the additional therapeutic agent are administered simultaneously or are co-formulated. In some embodiments, the isolated and modified IL-10 polypeptide described herein, the IL-10 conjugate described herein; or the pharmaceutical composition described herein and the additional therapeutic agent are administered sequentially. In some embodiments, the isolated and modified IL-10 polypeptide described herein, the IL-10 conjugate described herein; or the pharmaceutical composition described herein is administered prior to the additional therapeutic agent. In some embodiments, the isolated and modified IL-10 polypeptide described herein, the IL-10 conjugate described herein; or the pharmaceutical composition described herein is administered after the administration of the additional therapeutic agent.

Disclosed herein, in certain embodiments, is a kit comprising an isolated and modified IL-10 polypeptide described herein, an IL-10 conjugate described herein; or a pharmaceutical composition described herein.

BRIEF DESCRIPTION OF THE DRAWINGS

Various aspects of the disclosure are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

FIG. 2A illustrates exemplary lysine derivatives. FIG. 2B illustrates exemplary phenylalanine derivatives.

FIG. 3B—UAA #43-89; FIG. 3C—UAA #90-128; FIG.

3D—UAA #129-167). FIGS. 3A-3D are adopted from Table 1 of Dumas et al., *Chemical Science* 2015, 6, 50-69.

DETAILED DESCRIPTION OF THE DISCLOSURE

Figure 1:
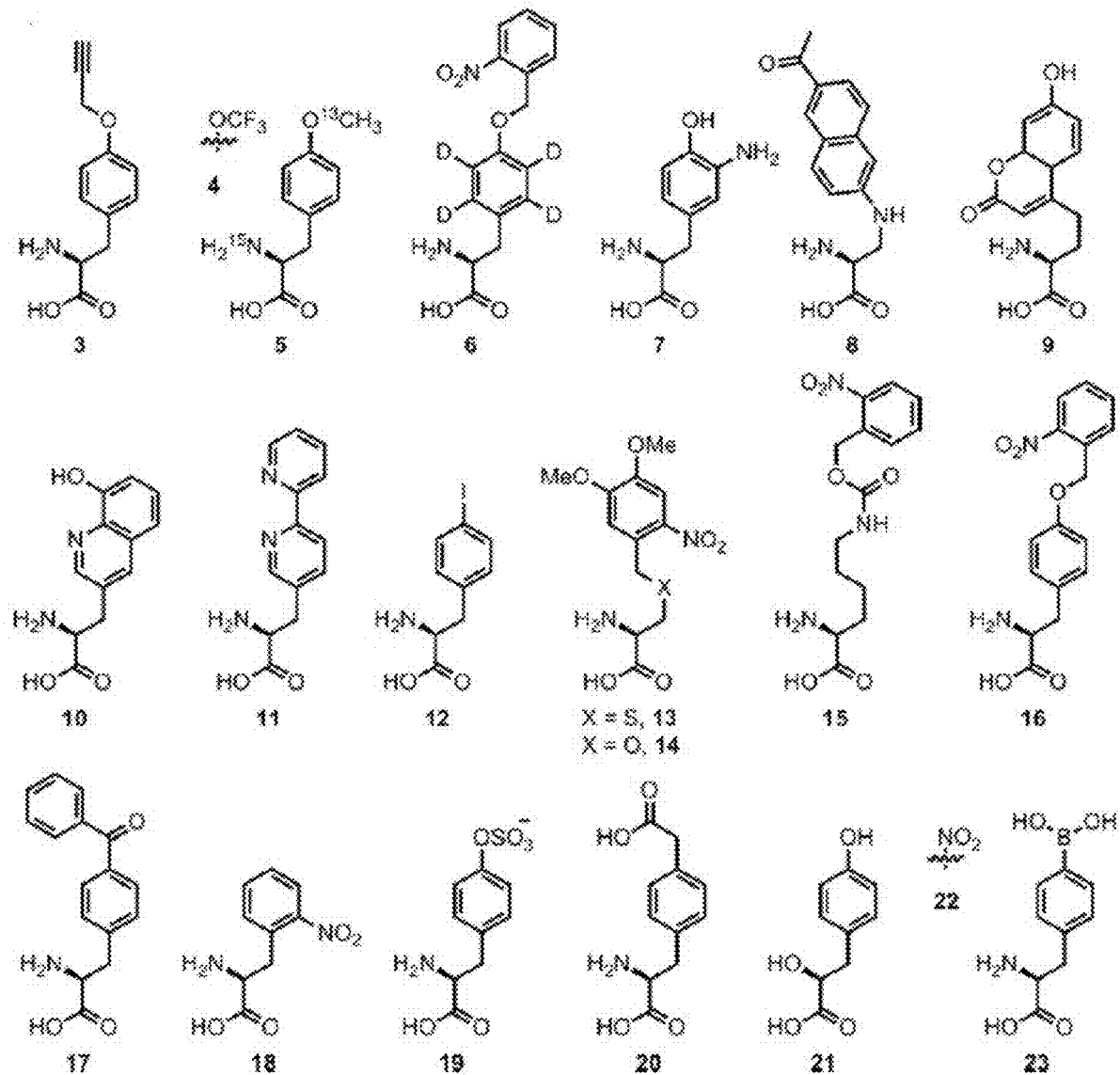
FIG. 1 shows exemplary unnatural amino acids. This figure is adapted from FIG. 2 of Young et al., "Beyond the canonical 20 amino acids: expanding the genetic lexicon," *J. of Biological Chemistry* 285(15): 11039-11044 (2010).

Cytokines comprise a family of cell signaling proteins such as chemokines, interferons, interleukins, lymphokines, tumor necrosis factors, and other growth factors playing roles in innate and adaptive immune cell homeostasis. Cytokines are produced by immune cells such as macrophages, B lymphocytes, T lymphocytes and mast cells, endothelial cells, fibroblasts, and different stromal cells. In some instances, cytokines modulate the balance between humoral and cell-based immune responses.

Interleukins are signaling proteins which modulate the development and differentiation of T and B lymphocytes, cell of the monocytic lineage, neutrophils, basophils, eosinophils, megakaryocytes, and hematopoietic cells. Interleukins are produced by helper CD4 T and B lymphocytes, monocytes, macrophages, endothelial cells, and other tissue residents. In some cases, there are about 15 interleukins, interleukins 1-13, interleukin 15, and interleukin 17.

IL-10 generates tumor immunity by activation of tumor-infiltrating CD8+ T cells, cellular proliferation of CD8+ T cells, induction of IFN-γ which increases MHC class I on tumor cells and MHC class II on macrophages and induction of cytotoxic proteins mediating target cell lysis. Increased T cell receptor stimulation on CD8+ T cells provides antiapoptotic and proliferation signals. An unexpected role for IL-10 in the tumor microenvironment (TME) is the inhibition of pro-inflammatory Th17 cells and cytokines responsible for tumor associated inflammation leading to suppression of anti-tumor effector cell responses. Preclinical studies have shown that IL-10 deficiency increases tumor incidence and reduces immune surveillance. Additionally, treatment of Her2 transgenic mice with pegylated IL-10 has led to tumor rejection but requires expression of IFN-γ and granzyme-expressing CD8+ T cells, with a significant increase in CD8a/b+ T cells in the tumor.

IL-10 has a relatively short serum half-life in the body. Indeed, the half-life in mice as measured by in vitro bioassay or by efficacy in the septic shock model system [see Smith et al., Cellular Immunology 173:207-214 (1996)] is about 2 to 6 hours.

Disclosed herein, in certain embodiments, is a modified IL-10 polypeptide which has an enhanced plasma half-life. In some embodiments, also described herein is a modified IL-10 polypeptide which upon dimerization enhances the exposure of a plurality of tumor cells to tumor infiltrating immune cells. In other embodiments, further described herein is a modified IL-10 polypeptide which forms a biologically active IL-10 dimer.

Additionally described include IL-10 polypeptide conjugates, pharmaceutical compositions comprising one or more of the modified IL-10 polypeptides, and methods of treating a disease or indication.

Modified IL-10 Polypeptides

In some embodiments, described herein are IL-10 polypeptide modified at an amino acid position. In some instances, the modification is to a natural amino acid. In some instances, the modification is to an unnatural amino acid. In some instances, described herein is an isolated and modified IL-10 polypeptide that comprises at least one unnatural amino acid. In some instances, the IL-10 polypeptide is an isolated and purified mammalian IL-10, for example, a rodent IL-10 protein, or a human IL-10 protein.

In some cases, the IL-10 polypeptide is a human IL-10 protein. In some cases, the IL-10 polypeptide comprises about 80%, 85%, 90%, 95%, 96%, 97%, 98%, or 99% sequence identity to SEQ ID NO: 1. In some cases, the IL-10 polypeptide comprises the sequence of SEQ ID NO: 1. In some cases, the IL-10 polypeptide consists of the sequence of SEQ ID NO: 1. In additional cases, the IL-10 polypeptide comprises about 80%, 85%, 90%, 95%, 96%, 97%, 98%, or 99% sequence identity to SEQ ID NO: 2. In additional cases, the IL-10 polypeptide comprises the sequence of SEQ ID NO: 2. In additional cases, the IL-10 polypeptide consists of the sequence of SEQ ID NO: 2.

In some instances, the IL-10 polypeptide is a truncated variant. In some instances, the truncation is an N-terminal deletion. In other instances, the truncation is a C-terminal deletion. In additional instances, the truncation comprises both N-terminal and C-terminal deletions. For example, the truncation can be a deletion of at least or about 1, 2, 3, 4, 5, 6, 7, 8, 9, 10, 11, 12, 13, 14, 15, 20, or more residues from either the N-terminus or the C-terminus, or both termini. In some cases, the IL-10 polypeptide comprises an N-terminal deletion of at least or about 1, 2, 3, 4, 5, 6, 7, 8, 9, 10, 11, 12, 13, 14, 15, 20, or more residues. In some cases, the IL-10 polypeptide comprises an N-terminal deletion of at least or about 1, 2, 3, 4, 5, 6, 7, 8, 9, or 10 residues. In some cases, the IL-10 polypeptide comprises an N-terminal deletion of at least or about 2 residues. In some cases, the IL-10 polypeptide comprises an N-terminal deletion of at least or about 3 residues. In some cases, the IL-10 polypeptide comprises an N-terminal deletion of at least or about 4 residues. In some cases, the IL-10 polypeptide comprises an N-terminal deletion of at least or about 5 residues. In some cases, the IL-10 polypeptide comprises an N-terminal deletion of at least or about 6 residues. In some cases, the IL-10 polypeptide comprises an N-terminal deletion of at least or about 7 residues. In some cases, the IL-10 polypeptide comprises an N-terminal deletion of at least or about 8 residues. In some cases, the IL-10 polypeptide comprises an N-terminal deletion of at least or about 9 residues. In some cases, the IL-10 polypeptide comprises an N-terminal deletion of at least or about 10 residues.

In some embodiments, the IL-10 polypeptide is a functionally active fragment. In some cases, the functionally active fragment comprises IL-10 region 5-160, 10-160, 15-160, 20-160, 1-155, 5-155, 10-155, 15-155, 20-155, 1-150, 5-150, 10-150, 15-150, or 20-150, wherein the residue positions are in reference to the positions in SEQ ID NO: 1. In some instances, the functionally active fragment comprises IL-10 region 5-160, wherein the residue positions are in reference to the positions in SEQ ID NO: 1. In some instances, the functionally active fragment comprises IL-10 region 10-160, wherein the residue positions are in reference to the positions in SEQ ID NO: 1. In some instances, the functionally active fragment comprises IL-10 region 15-160, wherein the residue positions are in reference to the positions in SEQ ID NO: 1. In some instances, the functionally active fragment comprises IL-10 region 20-160, wherein the residue positions are in reference to the positions in SEQ ID NO: 1. In some instances, the functionally active fragment comprises IL-10 region 1-155, wherein the residue positions are in reference to the positions in SEQ ID NO: 1. In some instances, the functionally active fragment comprises IL-10 region 5-155, wherein the residue positions are in reference to the positions in SEQ ID NO: 1. In some instances, the functionally active fragment comprises IL-10 region 10-155, wherein the residue positions are in reference to the positions in SEQ ID NO: 1. In some instances, the functionally active fragment comprises IL-10 region 15-155, wherein the residue positions are in reference to the positions in SEQ ID NO: 1. In some instances, the functionally active fragment comprises IL-10 region 20-155, wherein the residue positions are in reference to the positions in SEQ ID NO: 1. In some instances, the functionally active fragment comprises IL-10 region 1-150, wherein the residue positions are in reference to the positions in SEQ ID NO: 1. In some instances, the functionally active fragment comprises IL-10 region 5-150, wherein the residue positions are in reference to the positions in SEQ ID NO: 1. In some instances, the functionally active fragment comprises IL-10 region 10-150, wherein the residue positions are in reference to the positions in SEQ ID NO: 1. In some instances, the functionally active fragment comprises IL-10 region 15-150, wherein the residue positions are in reference to the positions in SEQ ID NO: 1. In some instances, the functionally active fragment comprises IL-10 region 20-150, wherein the residue positions are in reference to the positions in SEQ ID NO: 1.

In some embodiments, described herein is an IL-10 polypeptide which comprises at least one unnatural amino acid. In some instances, the at least one unnatural amino acid is located in helix C, D, or E. In some cases, helix C comprises residues L60-N82, in which the positions are in reference to the positions in SEQ ID NO: 1. In some cases, helix D comprises residues I87-C108, in which the positions are in reference to the positions in SEQ ID NO: 1. In some cases, helix E comprises residues S118-L131, in which the positions are in reference to the positions in SEQ ID NO: 1. In some cases, the at least one unnatural amino acid is located at a surface exposed location in helix C, D, or E.

In some embodiments, described herein is an IL-10 polypeptide which comprises at least one unnatural amino acid at a position selected from E67, Q70, E74, E75, Q79, N82, K88, K125, N126, N129, K130, or Q132, wherein the residue positions correspond to positions 67, 70, 74, 75, 79, 82, 88, 125, 126, 129, 130, and 132 as set forth in SEQ ID NO: 1. In some instances, the position of the at least one unnatural amino acid is selected from E67, Q70, E74, E75, Q79, or N82, wherein the residue positions correspond to positions 67, 70, 74, 75, 79, and 82 as set forth in SEQ ID NO: 1. In some instances, the position of the at least one unnatural amino acid is selected from K88, K125, N126, N129, K130, or Q132, wherein the residue positions correspond to positions 88, 125, 126, 129, 130, and 132 as set forth in SEQ ID NO: 1. In some instances, the position of the at least one unnatural amino acid is selected from K125, N126, N129, K130, or Q132, wherein the residue positions correspond to positions 125, 126, 129, 130, and 132 as set forth in SEQ ID NO: 1. In some instances, the position of the at least one unnatural amino acid is selected from Q70, E74, N82, K88, N126, K130, or Q132, wherein the residue positions correspond to positions 70, 74, 82, 88, 126, 130, and 132 as set forth in SEQ ID NO: 1. In some instances, the position of the at least one unnatural amino acid is selected from E67. In some instances, the position of the at least one unnatural amino acid is selected from Q70. In some instances, the position of the at least one unnatural amino acid is selected from E74. In some instances, the position of the at least one unnatural amino acid is selected from E75. In some instances, the position of the at least one unnatural amino acid is selected from Q79. In some instances, the position of the at least one unnatural amino acid is selected from N82. In some instances, the position of the at least one unnatural amino acid is selected from K88. In some instances, the position of the at least one unnatural amino acid is selected from K125. In some instances, the position of the at least one unnatural amino acid is selected from N126. In some instances, the position of the at least one unnatural amino acid is selected from N129. In some instances, the position of the at least one unnatural amino acid is selected from K130. In some instances, the position of the at least one unnatural amino acid is selected from Q132.

In some instances, the at least one unnatural amino acid is located proximal to the N-terminus. As used herein, proximal refers to a residue located at least 1 residue away from the N-terminal residue and up to about 50 residues away from the N-terminal residue. In some cases, the at least one unnatural amino acid is located within the first 10, 20, 30, 40, or 50 residues from the N-terminal residue. In some cases, the at least one unnatural amino acid is located within the first 10 residues from the N-terminal residue. In some cases, the at least one unnatural amino acid is located within the first 20 residues from the N-terminal residue. In some cases, the at least one unnatural amino acid is located within the first 30 residues from the N-terminal residue. In some cases, the at least one unnatural amino acid is located within the first 40 residues from the N-terminal residue. In some cases, the at least one unnatural amino acid is located within the first 50 residues from the N-terminal residue.

In some instances, the at least one unnatural amino acid is the N-terminal residue.

In some instances, the at least one unnatural amino acid is located proximal to the C-terminus. As used herein, proximal refers to a residue located at least 1 residue away from the C-terminal residue and up to about 50 residues away from the C-terminal residue. In some cases, the at least one unnatural amino acid is located within the first 10, 20, 30, 40, or 50 residues from the C-terminal residue. In some cases, the at least one unnatural amino acid is located within the first 10 residues from the C-terminal residue. In some cases, the at least one unnatural amino acid is located within the first 20 residues from the C-terminal residue. In some cases, the at least one unnatural amino acid is located within the first 30 residues from the C-terminal residue. In some cases, the at least one unnatural amino acid is located within the first 40 residues from the C-terminal residue. In some cases, the at least one unnatural amino acid is located within the first 50 residues from the C-terminal residue.

In some instances, the at least one unnatural amino acid is the C-terminal residue.

In some embodiments, the IL-10 polypeptide is a functionally active monomer that is capable of binding to the IL-10R and activates the signaling pathway. In some cases, the functionally active IL-10 monomer has an enhanced plasma half-life. In some cases, the enhanced plasma half-life is compared to a plasma half-life of a wild-type IL-10 dimer. In some cases, the enhanced plasma half-life of the IL-10 polypeptide is at least 90 minutes, 2 hours, 3 hours, 4 hours, 5 hours, 6 hours, 7 hours, 8 hours, 9 hours, 10 hours, 11 hours, 12 hours, 18 hours, 24 hours, 36 hours, 48 hours, 3 days, 4 days, 5 days, 6 days, 7 days, 10 days, 12 days, 14 days, 21 days, 28 days, 30 days, or longer than the plasma half-life of the wild-type IL-10 protein. In some cases, the enhanced plasma half-life of the IL-10 polypeptide is about 90 minutes, 2 hours, 3 hours, 4 hours, 5 hours, 6 hours, 7 hours, 8 hours, 9 hours, 10 hours, 11 hours, 12 hours, 18 hours, 24 hours, 36 hours, 48 hours, 3 days, 4 days, 5 days, 6 days, 7 days, 10 days, 12 days, 14 days, 21 days, 28 days, or 30 days compared to the plasma half-life of the wild-type IL-10 protein.

In some embodiments, the IL-10 polypeptide forms an IL-10 dimer, e.g., a biologically active dimer. In some cases, the IL-10 dimer (e.g., the biologically active IL-10 dimer) comprises at least one unnatural amino acid. In other cases, the IL-10 dimer (e.g., the biologically active IL-10 dimer) comprises at least two or more unnatural amino acids. In additional cases, the IL-10 dimer (e.g., the biologically active IL-10 dimer) comprises at least three, four, five, six, seven, eight, or more unnatural amino acids.

In some embodiments, the IL-10 dimer (e.g., the biologically active IL-10 dimer) comprises two unnatural amino acids. In some cases, both unnatural amino acids are located on the same IL-10 polypeptide. In other cases, each of the IL-10 polypeptide comprises one unnatural amino acid. In such instances, each of the unnatural amino acids is located at a different residue location in the IL-10 polypeptide (i.e., one of the unnatural amino acid is located at a first residue location in one of the IL-10 polypeptide and the second unnatural amino acid is located at a second residue location in the other IL-10 polypeptide and the second residue location is different than the first residue location). In additional instances, each of the unnatural amino acid is located at the same residue location in the respective IL-10 polypeptides.

In some embodiments, the IL-10 dimer (e.g., the biologically active IL-10 dimer) comprises one unnatural amino acid. In such cases, a modified IL-10 polypeptide dimerizes with an IL-10 polypeptide that does not comprise an unnatural amino acid. In some cases, the IL-10 polypeptide that does not comprise an unnatural amino acid comprises a mutation with a natural amino acid. In other cases, the IL-10 polypeptide that does not comprise an unnatural amino acid is an IL-10 variant, e.g., a truncated IL-10 protein. In some instances, the modified IL-10 polypeptide dimerizes with a wild-type IL-10 polypeptide.

In some instances, the location of the at least one unnatural amino acid does not substantially interfere with dimerization of the IL-10 polypeptide.

In some cases, the location of the at least one unnatural amino acid further does not significantly interfere with binding of the IL-10 dimer to IL-10R.

In some embodiments, the location of the at least one unnatural amino acid impairs signaling of the IL-10R by less than 90%, 80%, 70%, 60%, 50%, 40%, 30%, 20%, 10%, 5%, 4%, 3%, 2%, 1%, or less. In some instances, the location of the at least one unnatural amino acid impairs signaling of the IL-10R by less than 80%. In some instances, the location of the at least one unnatural amino acid impairs signaling of the IL-10R by less than 70%. In some instances, the location of the at least one unnatural amino acid impairs signaling of the IL-10R by less than 60%. In some instances, the location of the at least one unnatural amino acid impairs signaling of the IL-10R by less than 50%. In some instances, the location of the at least one unnatural amino acid impairs signaling of the IL-10R by less than 40%. In some instances, the location of the at least one unnatural amino acid impairs signaling of the IL-10R by less than 30%. In some instances, the location of the at least one unnatural amino acid impairs signaling of the IL-10R by less than 20%. In some instances, the location of the at least one unnatural amino acid impairs signaling of the IL-10R by less than 10%. In some instances, the location of the at least one unnatural amino acid impairs signaling of the IL-10R by less than 5%. In some instances, the location of the at least one unnatural amino acid impairs signaling of the IL-10R by less than 2%. In some instances, the location of the at least one unnatural amino acid impairs signaling of the IL-10R by less than 1%. In some cases, the location of the at least one unnatural amino acid does not significantly impair signaling of the IL-10R. In additional cases, the location of the at least one unnatural amino acid does not impair signaling of the IL-10R.

In some instances, the biologically active IL-10 dimer has an enhanced plasma half-life. In some cases, the enhanced plasma half-life is compared to a plasma half-life of a wild-type IL-10 dimer. In some cases, the enhanced plasma half-life of the IL-10 dimer is at least 90 minutes, 2 hours, 3 hours, 4 hours, 5 hours, 6 hours, 7 hours, 8 hours, 9 hours, 10 hours, 11 hours, 12 hours, 18 hours, 24 hours, 36 hours, 48 hours, 3 days, 4 days, 5 days, 6 days, 7 days, 10 days, 12 days, 14 days, 21 days, 28 days, 30 days, or longer than the plasma half-life of the wild-type IL-10 dimer. In some cases, the enhanced plasma half-life of the IL-10 dimer is at least 90 minutes or longer than the plasma half-life of the wild-type IL-10 dimer. In some cases, the enhanced plasma half-life of the IL-10 dimer is at least 2 hours or longer than the plasma half-life of the wild-type IL-10 dimer. In some cases, the enhanced plasma half-life of the IL-10 dimer is at least 3 hours or longer than the plasma half-life of the wild-type IL-10 dimer. In some cases, the enhanced plasma half-life of the IL-10 dimer is at least 4 hours or longer than the plasma half-life of the wild-type IL-10 dimer. In some cases, the enhanced plasma half-life of the IL-10 dimer is at least 5 hours or longer than the plasma half-life of the wild-type IL-10 dimer. In some cases, the enhanced plasma half-life of the IL-10 dimer is at least 6 hours or longer than the plasma half-life of the wild-type IL-10 dimer. In some cases, the enhanced plasma half-life of the IL-10 dimer is at least 10 hours or longer than the plasma half-life of the wild-type IL-10 dimer. In some cases, the enhanced plasma half-life of the IL-10 dimer is at least 12 hours or longer than the plasma half-life of the wild-type IL-10 dimer. In some cases, the enhanced plasma half-life of the IL-10 dimer is at least 18 hours or longer than the plasma half-life of the wild-type IL-10 dimer. In some cases, the enhanced plasma half-life of the IL-10 dimer is at least 24 hours or longer than the plasma half-life of the wild-type IL-10 dimer. In some cases, the enhanced plasma half-life of the IL-10 dimer is at least 36 hours or longer than the plasma half-life of the wild-type IL-10 dimer. In some cases, the enhanced plasma half-life of the IL-10 dimer is at least 48 hours or longer than the plasma half-life of the wild-type IL-10 dimer. In some cases, the enhanced plasma half-life of the IL-10 dimer is at least 3 days or longer than the plasma half-life of the wild-type IL-10 dimer. In some cases, the enhanced plasma half-life of the IL-10 dimer is at least 4 days or longer than the plasma half-life of the wild-type IL-10 dimer. In some cases, the enhanced plasma half-life of the IL-10 dimer is at least 5 days or longer than the plasma half-life of the wild-type IL-10 dimer. In some cases, the enhanced plasma half-life of the IL-10 dimer is at least 6 days or longer than the plasma half-life of the wild-type IL-10 dimer. In some cases, the enhanced plasma half-life of the IL-10 dimer is at least 7 days or longer than the plasma half-life of the wild-type IL-10 dimer. In some cases, the enhanced plasma half-life of the IL-10 dimer is at least 10 days or longer than the plasma half-life of the wild-type IL-10 dimer. In some cases, the enhanced plasma half-life of the IL-10 dimer is at least 12 days or longer than the plasma half-life of the wild-type IL-10 dimer. In some cases, the enhanced plasma half-life of the IL-10 dimer is at least 14 days or longer than the plasma half-life of the wild-type IL-10 dimer. In some cases, the enhanced plasma half-life of the IL-10 dimer is at least 21 days or longer than the plasma half-life of the wild-type IL-10 dimer. In some cases, the enhanced plasma half-life of the IL-10 dimer is at least 28 days or longer than the plasma half-life of the wild-type IL-10 dimer. In some cases, the enhanced plasma half-life of the IL-10 dimer is at least 30 days or longer than the plasma half-life of the wild-type IL-10 dimer.

In some instances, the biologically active IL-10 dimer has an enhanced plasma half-life of about 90 minutes, 2 hours, 3 hours, 4 hours, 5 hours, 6 hours, 7 hours, 8 hours, 9 hours, 10 hours, 11 hours, 12 hours, 18 hours, 24 hours, 36 hours, 48 hours, 3 days, 4 days, 5 days, 6 days, 7 days, 10 days, 12 days, 14 days, 21 days, 28 days, or 30 days. In some cases, the biologically active IL-10 dimer has an enhanced plasma half-life of about 90 minutes. In some cases, the biologically active IL-10 dimer has an enhanced plasma half-life of about 2 hours. In some cases, the biologically active IL-10 dimer has an enhanced plasma half-life of about 3 hours. In some cases, the biologically active IL-10 dimer has an enhanced plasma half-life of about 4 hours. In some cases, the biologically active IL-10 dimer has an enhanced plasma half-life of about 5 hours. In some cases, the biologically active IL-10 dimer has an enhanced plasma half-life of about 6 hours. In some cases, the biologically active IL-10 dimer has an enhanced plasma half-life of about 7 hours. In some cases, the biologically active IL-10 dimer has an enhanced plasma half-life of about 8 hours. In some cases, the biologically active IL-10 dimer has an enhanced plasma half-life of about 9 hours. In some cases, the biologically active IL-10 dimer has an enhanced plasma half-life of about 10 hours. In some cases, the biologically active IL-10 dimer has an enhanced plasma half-life of about 11 hours. In some cases, the biologically active IL-10 dimer has an enhanced plasma half-life of about 12 hours. In some cases, the biologically active IL-10 dimer has an enhanced plasma half-life of about 18 hours. In some cases, the biologically active IL-10 dimer has an enhanced plasma half-life of about 24 hours. In some cases, the biologically active IL-10 dimer has an enhanced plasma half-life of about 36 hours. In some cases, the biologically active IL-10 dimer has an enhanced plasma half-life of about 48 hours. In some cases, the biologically active IL-10 dimer has an enhanced plasma half-life of about 3 days. In some cases, the biologically active IL-10 dimer has an enhanced plasma half-life of about 4 days. In some cases, the biologically active IL-10 dimer has an enhanced plasma half-life of about 5 days. In some cases, the biologically active IL-10 dimer has an enhanced plasma half-life of about 6 days. In some cases, the biologically active IL-10 dimer has an enhanced plasma half-life of about 7 days. In some cases, the biologically active IL-10 dimer has an enhanced plasma half-life of about 10 days. In some cases, the biologically active IL-10 dimer has an enhanced plasma half-life of about 12 days. In some cases, the biologically active IL-10 dimer has an enhanced plasma half-life of about 14 days. In some cases, the biologically active IL-10 dimer has an enhanced plasma half-life of about 21 days. In some cases, the biologically active IL-10 dimer has an enhanced plasma half-life of about 28 days. In some cases, the biologically active IL-10 dimer has an enhanced plasma half-life of about 30 days.

IL-10 Conjugates

In certain embodiments, described herein is an IL-10 conjugate. In some embodiments, the IL-10 conjugate comprises an IL-10 polypeptide comprising at least one unnatural amino acid and a conjugating moiety bound to the at least one unnatural amino acid. In some instances, the conjugating moiety is directly bound to the at least one unnatural amino acid. In other instances, the conjugating moiety is indirectly bound to the at least one unnatural amino acid via a linker described infra.

As described supra, the at least one unnatural amino acid is optionally located in helix C, D, or E, e.g., a surface accessible residue. In some cases, the residues include E67, Q70, E74, E75, Q79, N82, K88, K125, N126, N129, K130, or Q132, wherein the residue positions correspond to positions 67, 70, 74, 75, 79, 82, 88, 125, 126, 129, 130, and 132 as set forth in SEQ ID NO: 1. In some cases, the residues include E67, Q70, E74, E75, Q79, or N82, wherein the residue positions correspond to positions 67, 70, 74, 75, 79, and 82 as set forth in SEQ ID NO: 1. In some cases, the residue include K88, K125, N126, N129, K130, or Q132, wherein the residue positions correspond to positions 88, 125, 126, 129, 130, and 132 as set forth in SEQ ID NO: 1. In some cases, the residue include K125, N126, N129, K130, or Q132, wherein the residue positions correspond to positions 125, 126, 129, 130, and 132 as set forth in SEQ ID NO: 1. In some cases, the residue include Q70, E74, N82, K88, N126, K130, or Q132, wherein the residue positions correspond to positions 70, 74, 82, 88, 126, 130, and 132 as set forth in SEQ ID NO: 1.

In some embodiments, the at least one unnatural amino acid is located proximal to the N-terminus (e.g., proximal to the N-terminal residue). For example, the at least one unnatural amino acid is located optionally within the first 10, 20, 30, 40, or 50 residues from the N-terminus. In some cases, the at least one unnatural amino acid is located at the N-terminus (i.e., the at least one unnatural amino acid is the N-terminal residue of the IL-10 polypeptide).

In other embodiments, the at least one unnatural amino acid is located proximal to the C-terminus (e.g., proximal to the C-terminal residue). For example, the at least one unnatural amino acid is located optionally within the first 10, 20, 30, 40, or 50 residues from the C-terminus. In some cases, the at least one unnatural amino acid is located at the C-terminus (i.e., the at least one unnatural amino acid is the C-terminal residue of the IL-10 polypeptide).

In some instances, the IL-10 conjugate comprises one conjugating moiety bound to an unnatural amino acid.

In some instances, the IL-10 conjugate comprises an IL-10 monomer that is capable of activating the IL-10R signaling pathway. In other instances, the IL-10 conjugate comprises an IL-10 dimer that is functionally active.

In some instances, the IL-10 conjugate comprises two or more conjugating moieties, in which each of the two or more conjugating moieties is bound to a different unnatural amino acid. In some cases, the two or more conjugating moieties are conjugated to the same IL-10 polypeptide (e.g., either in a functionally active IL-10 monomer or in a functionally active IL-10 dimer). In other cases, the two or more conjugating moieties are each conjugated to a different IL-10 polypeptide within the IL-10 dimer. In additional cases, the IL-10 conjugate comprises three, four, five, six, or more conjugating moieties, in which each of the conjugating moieties is bound to a different unnatural amino acid. In such instances, the two IL-10 polypeptides within the dimer has an unequal distribution of the conjugating moieties, e.g., one IL-10 polypeptide has one conjugating moiety while the other IL-10 polypeptide has two or more conjugating moieties.

In some instances, the IL-10 conjugate comprises two or more conjugating moieties. In some cases, each of the two or more conjugating moieties is bound to an unnatural amino acid at the same residue position within the respective IL-10 monomer. In other cases, each of the two or more conjugating moieties is bound to an unnatural amino acid located at a different residue position within the IL-10 dimer.

In some instances, the location of the conjugating moiety does not substantially interfere with dimerization of the IL-10 polypeptide.

In some cases, the location of the conjugating moiety further does not significantly interfere with binding of the IL-10 dimer to IL-10R.

In some embodiments, the location of the conjugating moiety impairs signaling of the IL-10R by less than 90%, 80%, 70%, 60%, 50%, 40%, 30%, 20%, 10%, 5%, 4%, 3%, 2%, 1%, or less. In some instances, the location of the conjugating moiety impairs signaling of the IL-10R by less than 80%. In some instances, the location of the conjugating moiety impairs signaling of the IL-10R by less than 70%. In some instances, the location of the conjugating moiety impairs signaling of the IL-10R by less than 60%. In some instances, the location of the conjugating moiety impairs signaling of the IL-10R by less than 50%. In some instances, the location of the conjugating moiety impairs signaling of the IL-10R by less than 40%. In some instances, the location of the conjugating moiety impairs signaling of the IL-10R by less than 30%. In some instances, the location of the conjugating moiety impairs signaling of the IL-10R by less than 20%. In some instances, the location of the conjugating moiety impairs signaling of the IL-10R by less than 10%. In some instances, the location of the conjugating moiety impairs signaling of the IL-10R by less than 5%. In some instances, the location of the conjugating moiety impairs signaling of the IL-10R by less than 2%. In some instances, the location of the conjugating moiety impairs signaling of the IL-10R by less than 1%. In some cases, the location of the conjugating moiety does not significantly impair signaling of the IL-10R. In additional cases, the location of the conjugating moiety does not impair signaling of the IL-10R.

In some instances, the IL-10 conjugate has an enhanced plasma half-life. In some cases, the enhanced plasma half-life is compared to a plasma half-life of a wild-type IL-10 conjugate. In some cases, the enhanced plasma half-life of the IL-10 conjugate is at least 90 minutes, 2 hours, 3 hours, 4 hours, 5 hours, 6 hours, 7 hours, 8 hours, 9 hours, 10 hours, 11 hours, 12 hours, 18 hours, 24 hours, 36 hours, 48 hours, 3 days, 4 days, 5 days, 6 days, 7 days, 10 days, 12 days, 14 days, 21 days, 28 days, 30 days, or longer than the plasma half-life of the wild-type IL-10 conjugate. In some cases, the enhanced plasma half-life of the IL-10 conjugate is at least 90 minutes or longer than the plasma half-life of the wild-type IL-10 conjugate. In some cases, the enhanced plasma half-life of the IL-10 conjugate is at least 2 hours or longer than the plasma half-life of the wild-type IL-10 conjugate. In some cases, the enhanced plasma half-life of the IL-10 conjugate is at least 3 hours or longer than the plasma half-life of the wild-type IL-10 conjugate. In some cases, the enhanced plasma half-life of the IL-10 conjugate is at least 4 hours or longer than the plasma half-life of the wild-type IL-10 conjugate. In some cases, the enhanced plasma half-life of the IL-10 conjugate is at least 5 hours or longer than the plasma half-life of the wild-type IL-10 conjugate. In some cases, the enhanced plasma half-life of the IL-10 conjugate is at least 6 hours or longer than the plasma half-life of the wild-type IL-10 conjugate. In some cases, the enhanced plasma half-life of the IL-10 conjugate is at least 10 hours or longer than the plasma half-life of the wild-type IL-10 conjugate. In some cases, the enhanced plasma half-life of the IL-10 conjugate is at least 12 hours or longer than the plasma half-life of the wild-type IL-10 conjugate. In some cases, the enhanced plasma half-life of the IL-10 conjugate is at least 18 hours or longer than the plasma half-life of the wild-type IL-10 conjugate. In some cases, the enhanced plasma half-life of the IL-10 conjugate is at least 24 hours or longer than the plasma half-life of the wild-type IL-10 conjugate. In some cases, the enhanced plasma half-life of the IL-10 conjugate is at least 36 hours or longer than the plasma half-life of the wild-type IL-10 conjugate. In some cases, the enhanced plasma half-life of the IL-10 conjugate is at least 48 hours or longer than the plasma half-life of the wild-type IL-10 conjugate. In some cases, the enhanced plasma half-life of the IL-10 conjugate is at least 3 days or longer than the plasma half-life of the wild-type IL-10 conjugate. In some cases, the enhanced plasma half-life of the IL-10 conjugate is at least 4 days or longer than the plasma half-life of the wild-type IL-10 conjugate. In some cases, the enhanced plasma half-life of the IL-10 conjugate is at least 5 days or longer than the plasma half-life of the wild-type IL-10 conjugate. In some cases, the enhanced plasma half-life of the IL-10 conjugate is at least 6 days or longer than the plasma half-life of the wild-type IL-10 conjugate. In some cases, the enhanced plasma half-life of the IL-10 conjugate is at least 7 days or longer than the plasma half-life of the wild-type IL-10 conjugate. In some cases, the enhanced plasma half-life of the IL-10 conjugate is at least 10 days or longer than the plasma half-life of the wild-type IL-10 conjugate. In some cases, the enhanced plasma half-life of the IL-10 conjugate is at least 12 days or longer than the plasma half-life of the wild-type IL-10 conjugate. In some cases, the enhanced plasma half-life of the IL-10 conjugate is at least 14 days or longer than the plasma half-life of the wild-type IL-10 conjugate. In some cases, the enhanced plasma half-life of the IL-10 conjugate is at least 21 days or longer than the plasma half-life of the wild-type IL-10 conjugate. In some cases, the enhanced plasma half-life of the IL-10 conjugate is at least 28 days or longer than the plasma half-life of the wild-type IL-10 conjugate. In some cases, the enhanced plasma half-life of the IL-10 conjugate is at least 30 days or longer than the plasma half-life of the wild-type IL-10 conjugate.

In some embodiments, also described herein is an IL-10/IL-10R complex comprising a modified IL-10 dimer comprising at least one unnatural amino acid and an IL-10R, wherein the modified IL-10 dimer has an enhanced plasma half-life compared to a plasma half-life of a wild-type IL-10 dimer. In some instances, the modified IL-10 dimer further comprises a conjugating moiety covalently attached to the at least one unnatural amino acid.

IL-10 Conjugate Precursors

Described herein are IL-10 conjugate precursors, comprising a modified IL-10 polypeptide, wherein one or more amino acids have been mutated from the wild type amino acid. Such precursors are often used with the methods described herein for the treatment of diseases or conditions. In some embodiments, an IL-10 precursor is not conjugated. Such mutations variously comprise additions, deletions, or substitutions.

Natural and Unnatural Amino Acids

In some embodiments, an amino acid residue described herein (e.g., within an IL-10 polypeptide) is mutated to lysine, cysteine, histidine, arginine, aspartic acid, glutamic acid, serine, threonine, or tyrosine prior to binding to (or reacting with) a conjugating moiety. For example, the side chain of lysine, cysteine, histidine, arginine, aspartic acid, glutamic acid, serine, threonine, or tyrosine may bind to a conjugating moiety described herein. In some instances, the amino acid residue is mutated to cysteine, lysine, or histidine. In some cases, the amino acid residue is mutated to cysteine. In some cases, the amino acid residue is mutated to lysine. In some cases, the amino acid residue is mutated to histidine. In some cases, the amino acid residue is mutated to tyrosine. In some cases, the amino acid residue is mutated to tryptophan. In some instances, the amino acid residue is located proximal to the N- or C-terminus, at the N- or C-terminus, or at an internal residue position. In some instances, the amino acid residue is the N- or C-terminal residue and the mutation is to cysteine or lysine. In some instances, the amino acid residue is located proximal to the N- or C-terminal residue (e.g., within 50, 40, 30, 20, or 10 residues from the N- or C-terminal residue) and the mutation is to cysteine or lysine.

In some instances, an amino acid residue is added to the N- or C-terminal residue, i.e., the IL-10 polypeptide comprises an additional amino acid residue at either the N- or C-terminus and the additional amino acid residue is cysteine or lysine. In some cases, the additional amino acid residue is cysteine. In some cases, the additional amino acid is conjugated to a conjugating moiety.

In some embodiments, an amino acid residue described herein (e.g., within an IL-10 polypeptide) is mutated to an unnatural amino acid. In some embodiments, the unnatural amino acid is not conjugated with a conjugating moiety. In some embodiments, an IL-10 polypeptide described herein comprises an unnatural amino acid, wherein the IL-10 is conjugated to the protein, wherein the point of attachment is not the unnatural amino acid.

In some embodiments, an amino acid residue described herein (e.g., within an IL-10 polypeptide) is mutated to an unnatural amino acid prior to binding to a conjugating moiety. In some cases, the mutation to an unnatural amino acid prevents or minimizes a self-antigen response of the immune system. As used herein, the term "unnatural amino acid" refers to an amino acid other than the 20 amino acids that occur naturally in protein. Non-limiting examples of unnatural amino acids include: p-acetyl-L-phenylalanine, p-iodo-L-phenylalanine, p-methoxyphenylalanine, O-methyl-L-tyrosine, p-propargyloxyphenylalanine, p-propargyl-phenylalanine, L-3-(2-naphthyl)alanine, 3-methyl-phenylalanine, O-4-allyl-L-tyrosine, 4-propyl-L-tyrosine, tri-O-acetyl-GlcNAcp-serine, L-Dopa, fluorinated phenylalanine, isopropyl-L-phenylalanine, p-azido-L-phenylalanine, p-acyl-L-phenylalanine, p-benzoyl-L-phenylalanine, p-Boronophenylalanine, O-propargyltyrosine, L-phosphoserine, phosphonoserine, phosphonotyrosine, p-bromophenylalanine, selenocysteine, p-amino-L-phenylalanine, isopropyl-L-phenylalanine, N6-((2-azidoethoxy)-carbonyl)-L-lysine (AzK), an unnatural analogue of a tyrosine amino acid; an unnatural analogue of a glutamine amino acid; an unnatural analogue of a phenylalanine amino acid; an unnatural analogue of a serine amino acid; an unnatural analogue of a threonine amino acid; an alkyl, aryl, acyl, azido, cyano, halo, hydrazine, hydrazide, hydroxyl, alkenyl, alkynyl, ether, thiol, sulfonyl, seleno, ester, thioacid, borate, boronate, phospho, phosphono, phosphine, heterocyclic, enone, imine, aldehyde, hydroxylamine, keto, or amino substituted amino acid, or a combination thereof, an amino acid with a photoactivatable cross-linker; a spin-labeled amino acid; a fluorescent amino acid; a metal binding amino acid; a metal-containing amino acid; a radioactive amino acid; a photocaged and/or photoisomerizable amino acid; a biotin or biotin-analogue containing amino acid; a keto containing amino acid; an amino acid comprising polyethylene glycol or polyether; a heavy atom substituted amino acid; a chemically cleavable or photocleavable amino acid; an amino acid with an elongated side chain; an amino acid containing a toxic group; a sugar substituted amino acid; a carbon-linked sugar-containing amino acid; a redox-active amino acid; an α-hydroxy containing acid; an amino thio acid; an α, α disubstituted amino acid; a β-amino acid; a cyclic amino acid other than proline or histidine, and an aromatic amino acid other than phenylalanine, tyrosine or tryptophan.

Other examples of unnatural amino acids include N6-((2-azidoethoxy)-carbonyl)-L-lysine (AzK), N6-(propargylethoxy)-L-lysine (PraK), N6-(((2-azidobenzyl)oxy)carbonyl)-L-lysine, N6-(((3-azidobenzyl)oxy)carbonyl)-L-lysine, and N6-(((4-azidobenzyl)oxy)carbonyl)-L-lysine.

In some embodiments, the unnatural amino acid comprises a selective reactive group, or a reactive group for site-selective labeling of a target polypeptide. In some instances, the chemistry is a biorthogonal reaction (e.g., biocompatible and selective reactions). In some cases, the chemistry is a Cu(I)-catalyzed or "copper-free" alkyne-azide triazole-forming reaction, the Staudinger ligation, inverse-electron-demand Diels-Alder (IEDDA) reaction, "photoclick" chemistry, or a metal-mediated process such as olefin metathesis and Suzuki-Miyaura or Sonogashira cross-coupling.

In some embodiments, the unnatural amino acid comprises a photoreactive group, which crosslinks, upon irradiation with, e.g., UV.

In some embodiments, the unnatural amino acid comprises a photo-caged amino acid.

In some instances, the unnatural amino acid is a para-substituted, meta-substituted, or an ortho-substituted amino acid derivative.

In some instances, the unnatural amino acid comprises p-acetyl-L-phenylalanine, p-azidomethyl-L-phenylalanine (pAMF), p-iodo-L-phenylalanine, O-methyl-L-tyrosine, p-methoxyphenylalanine, p-propargyloxyphenylalanine, p-propargyl-phenylalanine, L-3-(2-naphthyl)alanine, 3-methyl-phenylalanine, O-4-allyl-L-tyrosine, 4-propyl-L-tyrosine, tri-O-acetyl-GlcNAcp-serine, L-Dopa, fluorinated phenylalanine, isopropyl-L-phenylalanine, p-azido-L-phenylalanine, p-acyl-L-phenylalanine, p-benzoyl-L-phenylalanine, L-phosphoserine, phosphonoserine, phosphonotyrosine, p-bromophenylalanine, p-amino-L-phenylalanine, or isopropyl-L-phenylalanine.

In some cases, the unnatural amino acid is 3-aminotyrosine, 3-nitrotyrosine, 3,4-dihydroxy-phenylalanine, or 3-iodotyrosine.

In some cases, the unnatural amino acid is phenylselenocysteine.

In some instances, the unnatural amino acid is a benzophenone, ketone, iodide, methoxy, acetyl, benzoyl, or azide containing phenylalanine derivative.

In some instances, the unnatural amino acid is a benzophenone, ketone, iodide, methoxy, acetyl, benzoyl, or azide containing lysine derivative.

In some instances, the unnatural amino acid comprises an aromatic side chain.

In some instances, the unnatural amino acid does not comprise an aromatic side chain.

In some instances, the unnatural amino acid comprises an azido group.

In some embodiments, the at least one unnatural amino acid comprises N6-((2-azidoethoxy)-carbonyl)-L-lysine (AzK), N6-(propargylethoxy)-L-lysine (PraK), N6-(((2-azidobenzyl)oxy)carbonyl)-L-lysine, N6-(((3-azidobenzyl)oxy)carbonyl)-L-lysine, or N6-(((4-azidobenzyl)oxy)carbonyl)-L-lysine. In some embodiments, the at least one unnatural amino acid comprises N6-((2-azidoethoxy)-carbonyl)-L-lysine (AzK). In some embodiments, the at least one unnatural amino acid comprises N6-(propargylethoxy)-L- lysine (PraK). In some embodiments, the at least one unnatural amino acid comprises N6-(((2-azidobenzyl)oxy) carbonyl)-L-lysine. In some embodiments, the at least one unnatural amino acid comprises N6-(((3-azidobenzyl)oxy) carbonyl)-L-lysine. In some embodiments, the at least one unnatural amino acid comprises N6-(((4-azidobenzyl)oxy) carbonyl)-L-lysine.

In some instances, the unnatural amino acid comprises a Michael-acceptor group. In some instances, Michael-acceptor groups comprise an unsaturated moiety capable of forming a covalent bond through a 1,2-addition reaction. In some instances, Michael-acceptor groups comprise electron-deficient alkenes or alkynes. In some instances, Michael-acceptor groups include but are not limited to alpha,beta unsaturated: ketones, aldehydes, sulfoxides, sulfones, nitriles, imines, or aromatics.

In some instances, the unnatural amino acid is dehydroalanine.

In some instances, the unnatural amino acid comprises an aldehyde or ketone group.

In some instances, the unnatural amino acid is a lysine derivative comprising an aldehyde or ketone group.

In some instances, the unnatural amino acid is a lysine derivative comprising one or more O, N, Se, or S atoms at the beta, gamma, or delta position. In some instances, the unnatural amino acid is a lysine derivative comprising O, N, Se, or S atoms at the gamma position.

In some instances, the unnatural amino acid is a lysine derivative wherein the epsilon N atom is replaced with an oxygen atom.

In some instances, the unnatural amino acid is a lysine derivative that is not naturally-occurring post-translationally modified lysine.

In some instances, the unnatural amino acid is an amino acid comprising a side chain, wherein the sixth atom from the alpha position comprises a carbonyl group. In some instances, the unnatural amino acid is an amino acid comprising a side chain, wherein the sixth atom from the alpha position comprises a carbonyl group, and the fifth atom from the alpha position is a nitrogen. In some instances, the unnatural amino acid is an amino acid comprising a side chain, wherein the seventh atom from the alpha position is an oxygen atom.

In some instances, the unnatural amino acid is a serine derivative comprising selenium. In some instances, the unnatural amino acid is selenoserine (2-amino-3-hydroselenopropanoic acid). In some instances, the unnatural amino acid is 2-amino-3-((2-((3-(benzyloxy)-3-oxopropyl)amino) ethyl)selanyl)propanoic acid. In some instances, the unnatural amino acid is 2-amino-3-(phenylselanyl)propanoic acid. In some instances, the unnatural amino acid comprises selenium, wherein oxidation of the selenium results in the formation of an unnatural amino acid comprising an alkene.

In some instances, the unnatural amino acid comprises a cyclooctynyl group.

In some instances, the unnatural amino acid comprises a transcyclocteny1 group.

In some instances, the unnatural amino acid comprises a norbornenyl group.

In some instances, the unnatural amino acid comprises a cyclopropenyl group.

In some instances, the unnatural amino acid comprises a diazirine group.

In some instances, the unnatural amino acid comprises a tetrazine group.

In some instances, the unnatural amino acid is a lysine derivative, wherein the side-chain nitrogen is carbamylated.

In some instances, the unnatural amino acid is a lysine derivative, wherein the side-chain nitrogen is acylated. In some instances, the unnatural amino acid is 2-amino-6-{[(tert-butoxy)carbonyl]amino}hexanoic acid. In some instances, the unnatural amino acid is 2-amino-6-{[(tert-butoxy)carbonyl]amino}hexanoic acid. In some instances, the unnatural amino acid is N6-Boc-N6-methyllysine. In some instances, the unnatural amino acid is N6-acetyllysine. In some instances, the unnatural amino acid is pyrrolysine. In some instances, the unnatural amino acid is N6-trifluoroacetyllysine. In some instances, the unnatural amino acid is 2-amino-6-{[(benzyloxy)carbonyl]amino}hexanoic acid. In some instances, the unnatural amino acid is 2-amino-6-{[(p-iodobenzyloxy)carbonyl]amino}hexanoic acid. In some instances, the unnatural amino acid is 2-amino-6-{[(p-nitrobenzyloxy)carbonyl]amino}hexanoic acid. In some instances, the unnatural amino acid is N6-prolyllysine. In some instances, the unnatural amino acid is 2-amino-6-{[(cyclopentyloxy)carbonyl]amino}hexanoic acid. In some instances, the unnatural amino acid is N6-(cyclopentanecarbonyl)lysine. In some instances, the unnatural amino acid is N6-(tetrahydrofuran-2-carbonyl)lysine. In some instances, the unnatural amino acid is N6-(3-ethynyltetrahydrofuran-2-carbonyl)lysine. In some instances, the unnatural amino acid is N6-((prop-2-yn-1-yloxy)carbonyl)lysine. In some instances, the unnatural amino acid is 2-amino-6-{[(2-azidocyclopentyloxy)carbonyl]amino}hexanoic acid. In some instances, the unnatural amino acid is N6-((2-azidoethoxy)-carbonyl)-L-lysine. In some instances, the unnatural amino acid is 2-amino-6-{[(2-nitrobenzyloxy)carbonyl] amino}hexanoic acid. In some instances, the unnatural amino acid is 2-amino-6-{[(2-cyclooctynyloxy)carbonyl] amino}hexanoic acid. In some instances, the unnatural amino acid is N6-(2-aminobut-3-ynoyl)lysine. In some instances, the unnatural amino acid is 2-amino-6-((2-aminobut-3-ynoyl)oxy)hexanoic acid. In some instances, the unnatural amino acid is N6-(allyloxycarbonyl)lysine. In some instances, the unnatural amino acid is N6-(butenyl-4-oxycarbonyl)lysine. In some instances, the unnatural amino acid is N6-(pentenyl-5-oxycarbonyl)lysine. In some instances, the unnatural amino acid is N6-((but-3-yn-1-yloxy)carbonyl)-lysine. In some instances, the unnatural amino acid is N6-((pent-4-yn-1-yloxy)carbonyl)-lysine. In some instances, the unnatural amino acid is N6-(thiazolidine-4-carbonyl)lysine. In some instances, the unnatural amino acid is 2-amino-8-oxononanoic acid. In some instances, the unnatural amino acid is 2-amino-8-oxooctanoic acid. In some instances, the unnatural amino acid is N6-(2-oxoacetyl)lysine.

In some instances, the unnatural amino acid is N6-propionyllysine. In some instances, the unnatural amino acid is N6-butyryllysine. In some instances, the unnatural amino acid is N6-(but-2-enoyl)lysine. In some instances, the unnatural amino acid is N6-((bicyclo[2.2.1]hept-5-en-2-yloxy)carbonyl)lysine. In some instances, the unnatural amino acid is N6-((spiro[2.3]hex-1-en-5-ylmethoxy)carbonyl)lysine. In some instances, the unnatural amino acid is N6-(((4-(1-(trifluoromethyl)cycloprop-2-en-1-yl)benzyl) oxy)carbonyl)lysine. In some instances, the unnatural amino acid is N6-((bicyclo[2.2.1]hept-5-en-2-ylmethoxy)carbonyl) lysine. In some instances, the unnatural amino acid is cysteinyllysine. In some instances, the unnatural amino acid is N6-((1-(6-nitrobenzo[d][1,3]dioxol-5-yl)ethoxy)carbonyl)lysine. In some instances, the unnatural amino acid is N6-((2-(3-methyl-3H-diazirin-3-yl)ethoxy)carbonyl)lysine. In some instances, the unnatural amino acid is N6-((3-(3-methyl-3H-diazirin-3-yl)propoxy)carbonyl)lysine. In some instances, the unnatural amino acid is N6-((meta nitrobenyloxy)N6-methylcarbonyl)lysine. In some instances, the unnatural amino acid is N6-((bicyclo[6.1.0]non-4-yn-9-ylmethoxy)carbonyl)-lysine. In some instances, the unnatural amino acid is N6-((cyclohept-3-en-1-yloxy)carbonyl)-L-lysine.

In some instances, the unnatural amino acid is 2-amino-3-(((((benzyloxy)carbonyl)amino)methyl)selanyl)propanoic acid.

In some embodiments, the unnatural amino acid is incorporated into the IL-10 polypeptide by a repurposed amber, opal, or ochre stop codon.

In some embodiments, the unnatural amino acid is incorporated into the IL-10 polypeptide by a 4-base codon.

In some embodiments, the unnatural amino acid is incorporated into the IL-10 polypeptide by a repurposed rare sense codon.

In some embodiments, the unnatural amino acid is incorporated into the IL-10 polypeptide by a synthetic codon comprising an unnatural nucleic acid.

In some instances, the unnatural amino acid is incorporated into the IL-10 by an orthogonal, modified synthetase/tRNA pair. Such orthogonal pairs comprise an unnatural synthetase that is capable of charging the unnatural tRNA with the unnatural amino acid, while minimizing charging of a) other endogenous amino acids onto the unnatural tRNA and b) unnatural amino acids onto other endogenous tRNAs. Such orthogonal pairs comprise tRNAs that are capable of being charged by the unnatural synthetase, while avoiding being charged with other endogenous amino acids by endogenous synthetases. In some embodiments, such pairs are identified from various organisms, such as bacteria, yeast, Archaea, or human sources. In some embodiments, an orthogonal synthetase/tRNA pair comprises components from a single organism. In some embodiments, an orthogonal synthetase/tRNA pair comprises components from two different organisms. In some embodiments, an orthogonal synthetase/tRNA pair comprising components that prior to modification, promote translation of two different amino acids. In some embodiments, an orthogonal synthetase is a modified alanine synthetase. In some embodiments, an orthogonal synthetase is a modified arginine synthetase. In some embodiments, an orthogonal synthetase is a modified asparagine synthetase. In some embodiments, an orthogonal synthetase is a modified aspartic acid synthetase. In some embodiments, an orthogonal synthetase is a modified cysteine synthetase. In some embodiments, an orthogonal synthetase is a modified glutamine synthetase. In some embodiments, an orthogonal synthetase is a modified glutamic acid synthetase. In some embodiments, an orthogonal synthetase is a modified alanine glycine. In some embodiments, an orthogonal synthetase is a modified histidine synthetase. In some embodiments, an orthogonal synthetase is a modified leucine synthetase. In some embodiments, an orthogonal synthetase is a modified isoleucine synthetase. In some embodiments, an orthogonal synthetase is a modified lysine synthetase. In some embodiments, an orthogonal synthetase is a modified methionine synthetase. In some embodiments, an orthogonal synthetase is a modified phenylalanine synthetase. In some embodiments, an orthogonal synthetase is a modified proline synthetase. In some embodiments, an orthogonal synthetase is a modified serine synthetase. In some embodiments, an orthogonal synthetase is a modified threonine synthetase. In some embodiments, an orthogonal synthetase is a modified tryptophan synthetase. In some embodiments, an orthogonal synthetase is a modified tyrosine synthetase. In some embodiments, an orthogonal synthetase is a modified valine synthetase. In some embodiments, an orthogonal synthetase is a modified phosphoserine synthetase. In some embodiments, an orthogonal tRNA is a modified alanine tRNA. In some embodiments, an orthogonal tRNA is a modified arginine tRNA. In some embodiments, an orthogonal tRNA is a modified asparagine tRNA. In some embodiments, an orthogonal tRNA is a modified aspartic acid tRNA. In some embodiments, an orthogonal tRNA is a modified cysteine tRNA. In some embodiments, an orthogonal tRNA is a modified glutamine tRNA. In some embodiments, an orthogonal tRNA is a modified glutamic acid tRNA. In some embodiments, an orthogonal tRNA is a modified alanine glycine. In some embodiments, an orthogonal tRNA is a modified histidine tRNA. In some embodiments, an orthogonal tRNA is a modified leucine tRNA. In some embodiments, an orthogonal tRNA is a modified isoleucine tRNA. In some embodiments, an orthogonal tRNA is a modified lysine tRNA. In some embodiments, an orthogonal tRNA is a modified methionine tRNA. In some embodiments, an orthogonal tRNA is a modified phenylalanine tRNA. In some embodiments, an orthogonal tRNA is a modified proline tRNA. In some embodiments, an orthogonal tRNA is a modified serine tRNA. In some embodiments, an orthogonal tRNA is a modified threonine tRNA. In some embodiments, an orthogonal tRNA is a modified tryptophan tRNA. In some embodiments, an orthogonal tRNA is a modified tyrosine tRNA. In some embodiments, an orthogonal tRNA is a modified valine tRNA. In some embodiments, an orthogonal tRNA is a modified phosphoserine tRNA.

In some embodiments, the unnatural amino acid is incorporated into the IL-10 polypeptide by an aminoacyl (aaRS or RS)-tRNA synthetase-tRNA pair. Exemplary aaRS-tRNA pairs include, but are not limited to, *Methanococcus jannaschii* (Mj-Tyr) aaRS/tRNA pairs, *E. coli* TyrRS (Ec-Tyr)/*B. stearothermophilus* tRNA$_{CUA}$ pairs, *E. coli* LeuRS (Ec-Leu)/*B. stearothermophilus* tRNA$_{CUA}$ pairs, and pyrrolysyl-tRNA pairs. In some instances, the unnatural amino acid is incorporated into the cytokine (e.g., the IL polypeptide) by a Mj-TyrRS/tRNA pair. Exemplary UAAs that can be incorporated by a Mj-TyrRS/tRNA pair include, but are not limited to, para-substituted phenylalanine derivatives such asp-aminophenylalanine and p-methoxyphenylalanine; meta-substituted tyrosine derivatives such as 3-aminotyrosine, 3-nitrotyrosine, 3,4-dihydroxyphenylalanine, and 3-iodotyrosine; phenylselenocysteine; p-boronophenylalanine; and o-nitrobenzyltyrosine.

In some instances, the unnatural amino acid is incorporated into the IL-10 polypeptide by an Ec-Tyr/tRNA$_{CUA}$ or an Ec-Leu/tRNA$_{CUA}$ pair. Exemplary UAAs that can be incorporated by a Ec-Tyr/tRNA$_{CUA}$ or a Ec-Leu/tRNA$_{CUA}$ pair include, but are not limited to, phenylalanine derivatives containing benzophenone, ketone, iodide, or azide substituents; O-propargyltyrosine; α-aminocaprylic acid, O-methyl tyrosine, O-nitrobenzyl cysteine; and 3-(naphthalene-2-ylamino)-2-amino-propanoic acid.

In some instances, the unnatural amino acid is incorporated into the IL-10 polypeptide by a pyrrolysyl-tRNA pair. In some cases, the PylRS is obtained from an archaebacterial, e.g., from a methanogenic archaebacterial. In some cases, the PylRS is obtained from *Methanosarcina barkeri*, *Methanosarcina mazei*, or *Methanosarcina acetivorans*. Exemplary UAAs that can be incorporated by a pyrrolysyl-tRNA pair include, but are not limited to, amide and carbamate substituted lysines such as 2-amino-6-((R)-tetrahydrofuran-2-carboxamido)hexanoic acid, N-ε-$_D$-prolyl-$_L$-lysine, and N-ε-cyclopentyloxycarbonyl-$_L$-lysine; N-ε-Acryloyl-$_L$-lysine; N-ε-[(1-(6-nitrobenzo[d][1,3]dioxol-5- yl)ethoxy)carbonyl]-_L_-lysine; and N-ε-(1-methylcyclopro-2-enecarboxamido)lysine. In some embodiments, the IL-10 conjugates disclosed herein may be prepared by use of *M. mazei* tRNA which is selectively charged with a non-natural amino acid such as N6-((2-azidoethoxy)-carbonyl)-L-lysine (AzK) by the *M. barkeri* pyrrolysyl-tRNA synthetase (Mb PylRS). Other methods are known to those of ordinary skill in the art, such as those disclosed in Zhang et al., Nature 2017, 551(7682): 644-647. Other examples of non-natural amino acids that may be used include, but are not limited to, N6-(propargylethoxy)-L-lysine (PraK), N6-(((2-azidobenzyl)oxy)carbonyl)-L-lysine, N6-(((3-azidobenzyl)oxy)carbonyl)-L-lysine, or N6-(((4-azidobenzyl)oxy)carbonyl)-L-lysine.

In some instances, an unnatural amino acid is incorporated into an IL-10 polypeptide by a synthetase disclosed in U.S. Pat. Nos. 9,988,619 and 9,938,516. Exemplary UAAs that can be incorporated by such synthetases include para-methylazido-L-phenylalanine, aralkyl, heterocyclyl, heteroaralkyl unnatural amino acids, and others. In some embodiments, such UAAs comprise pyridyl, pyrazinyl, pyrazolyl, triazolyl, oxazolyl, thiazolyl, thiophenyl, or other heterocycle. Such amino acids in some embodiments comprise azides, tetrazines, or other chemical group capable of conjugation to a coupling partner, such as a water soluble moiety. In some embodiments, such synthetases are expressed and used to incorporate UAAs into cytokines in-vivo. In some embodiments, such synthetases are used to incorporate UAAs into cytokines using a cell-free translation system.

The host cell into which the constructs or vectors disclosed herein are introduced is cultured or maintained in a suitable medium such that the tRNA, the tRNA synthetase and the protein of interest are produced. The medium also comprises the unnatural amino acid(s) such that the protein of interest incorporates the unnatural amino acid(s). In some embodiments, a nucleoside triphosphate transporter (NTT) from bacteria, plant, or algae is also present in the host cell. In some embodiments, the IL-10 conjugates disclosed herein are prepared by use of a host cell that expresses a NTT. In some embodiments, the nucleotide nucleoside triphosphate transporter used in the host cell may be selected from TpNTT1, TpNTT2, TpNTT3, TpNTT4, TpNTT5, TpNTT6, TpNTT7, TpNTT8 (*T. pseudonana*), PtNTT1, PtNTT2, PtNTT3, PtNTT4, PtNTT5, PtNTT6 (*P. tricornutum*), GsNTT (*Galdieria sulphuraria*), AtNTT1, AtNTT2 (*Arabidopsis thaliana*), CtNTT1, CtNTT2 (*Chlamydia trachomatis*), PamNTT1, PamNTT2 (*Protochlamydia amoebophila*), CcNTT (*Caedibacter caryophilus*), RpNTT1 (*Rickettsia prowazekii*). In some embodiments, the NTT is selected from PtNTT1, PtNTT2, PtNTT3, PtNTT4, PtNTT5, and PtNTT6. In some embodiments, the NTT is PtNTT1. In some embodiments, the NTT is PtNTT2. In some embodiments, the NTT is PtNTT3. In some embodiments, the NTT is PtNTT4. In some embodiments, the NTT is PtNTT5. In some embodiments, the NTT is PtNTT6. Other NTTs that may be used are disclosed in Zhang et al., *Nature* 2017, 551(7682): 644-647; Malyshev et al. *Nature* 2014 (509 (7500), 385-388; and Zhang et al. Proc Natl Acad Sci USA, 2017, 114:1317-1322.

In some embodiments are provided methods of preparing the IL-10 conjugates disclosed herein in a cellular system that expresses a NTT and a tRNA synthetase. In some embodiments described herein, the NTT is selected from PtNTT1, PtNTT2, PtNTT3, PtNTT4, PtNTT5, and PtNTT6, and the tRNA synthetase is selected from *Methanococcus jannaschii, E. coli* TyrRS (Ec-Tyr)/*B. stearothermophilus*, and *M. mazei*. In some embodiments, the NTT is PtNTT1 and the tRNA synthetase is derived from *Methanococcus jannaschii, E. coli* TyrRS (Ec-Tyr)/*B. stearothermophilus*, or *M. mazei*. In some embodiments, the NTT is PtNTT2 and the tRNA synthetase is derived from *Methanococcus jannaschii, E. coli* TyrRS (Ec-Tyr)/*B. stearothermophilus*, or *M. mazei*. In some embodiments, the NTT is PtNTT3 and the tRNA synthetase is derived from *Methanococcus jannaschii, E. coli* TyrRS (Ec-Tyr)/*B. stearothermophilus*, or *M. mazei*. In some embodiments, the NTT is PtNTT3 and the tRNA synthetase is derived from *Methanococcus jannaschii, E. coli* TyrRS (Ec-Tyr)/*B. stearothermophilus*, or *M. mazei*. In some embodiments, the NTT is PtNTT4 and the tRNA synthetase is derived from *Methanococcus jannaschii, E. coli* TyrRS (Ec-Tyr)/*B. stearothermophilus*, or *M. mazei*. In some embodiments, the NTT is PtNTT5 and the tRNA synthetase is derived from *Methanococcus jannaschii, E. coli* TyrRS (Ec-Tyr)/*B. stearothermophilus*, or *M. mazei*. In some embodiments, the NTT is PtNTT6 and the tRNA synthetase is derived from *Methanococcus jannaschii, E. coli* TyrRS (Ec-Tyr)/*B. stearothermophilus*, or *M. mazei*.

In some embodiments, the IL-10 conjugates disclosed herein may be prepared in a cell, such as *E. coli*, comprising (a) nucleotide triphosphate transporter PtNTT2 (including a truncated variant in which the first 65 amino acid residues of the full-length protein are deleted), (b) a plasmid comprising a double-stranded oligonucleotide that encodes an IL-10 variant having a desired amino acid sequence and that contains a unnatural base pair comprising a first unnatural nucleotide and a second unnatural nucleotide to provide a codon at the desired position at which an unnatural amino acid, such as N6-((2-azidoethoxy)-carbonyl)-L-lysine (AzK), N6-(propargylethoxy)-L-lysine (PraK), N6-(((2-azidobenzyl)oxy)carbonyl)-L-lysine, N6-(((3-azidobenzyl) oxy)carbonyl)-L-lysine, or N6-(((4-azidobenzyl)oxy)carbonyl)-L-lysine, will be incorporated, (c) a plasmid encoding a tRNA derived from *M. mazei* and which comprises an unnatural nucleotide to provide a recognized anticodon (to the codon of the IL-10 variant) in place of its native sequence, and (d) a plasmid encoding a *M. barkeri* derived pyrrolysyl-tRNA synthetase (Mb PylRS), which may be the same plasmid that encodes the tRNA or a different plasmid. In some embodiments, the cell is further supplemented with deoxyribo triphosphates comprising one or more unnatural bases. In some embodiments, the cell is further supplemented with ribo triphosphates comprising one or more unnatural bases. In some embodiments, the cells is further supplemented with one or more unnatural amino acids, such as N6-((2-azidoethoxy)-carbonyl)-L-lysine (AzK) N6-(propargylethoxy)-L-lysine (PraK), N6-(((2-azidobenzyl) oxy)carbonyl)-L-lysine, N6-(((3-azidobenzyl)oxy)carbonyl)-L-lysine, or N6-(((4-azidobenzyl)oxy)carbonyl)-L-lysine. In some embodiments, the double-stranded oligonucleotide that encodes the amino acid sequence of the desired IL-10 variant contains a codon AXC at, for example, position 67, 70, 74, 75, 79, 82, 88, 125, 126, 129, 130, or 132 of the sequence that encodes the protein having SEQ ID NO: 1, wherein X is an unnatural nucleotide such those disclosed herein, such NaM. In some embodiments, the cell further comprises a plasmid, which may be the protein expression plasmid or another plasmid, that encodes an orthogonal tRNA gene from *M. mazei* that comprises an AXC-matching anticodon GYT in place of its native sequence, wherein Y is an unnatural nucleotide as disclosed herein, such as TPT3, that is complementary and may be the same or different as the unnatural nucleotide in the codon. In some embodiments, the unnatural nucleotide in the codon is different than and complimentary to the unnatural nucleotide in the anti-codon. In some embodiments, the unnatural nucleotide in the codon is the same as the unnatural nucleotide in the anti-codon. In some embodiments, the first and second unnatural nucleotides comprising the unnatural base pair in the double-stranded oligonucleotide may be derived from

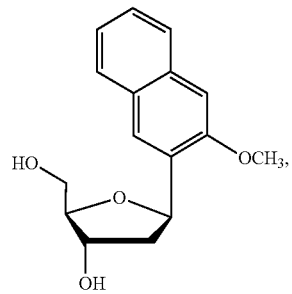

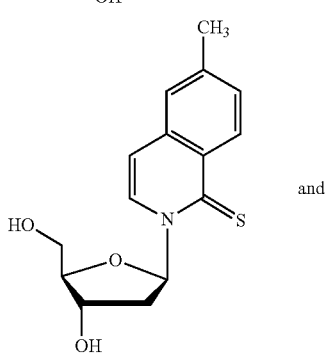

and

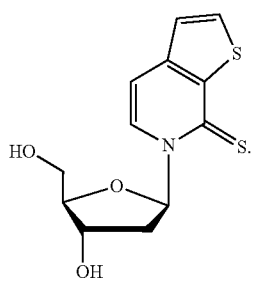

In some embodiments, the first and second unnatural nucleotides comprising the unnatural base pair in the double-stranded oligonucleotide may be derived from

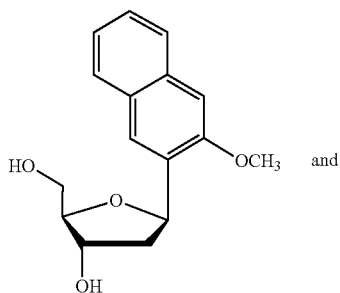

and

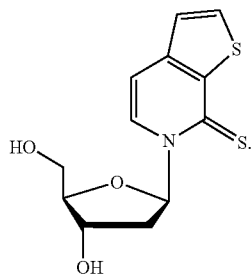

In some embodiments, the triphosphates of the first and second unnatural nucleotides include,

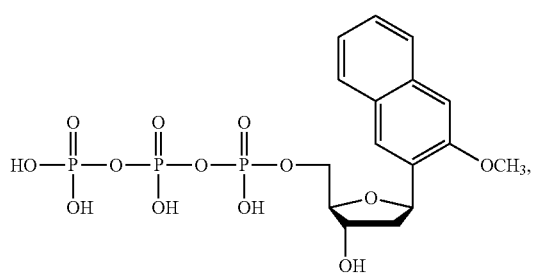

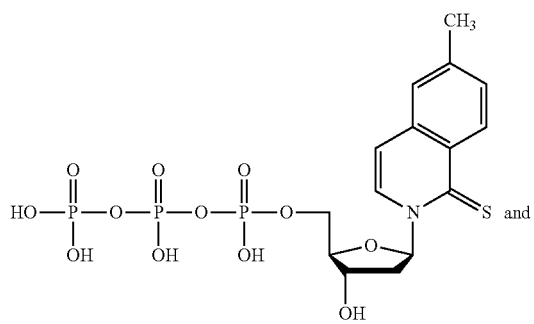

and

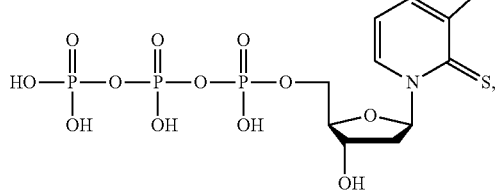

or salts thereof. In some embodiments, the triphosphates of the first and second unnatural nucleotides include,

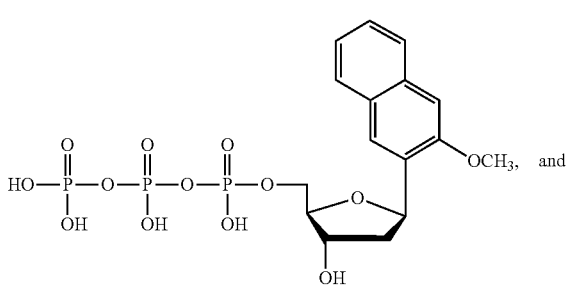

and

-continued

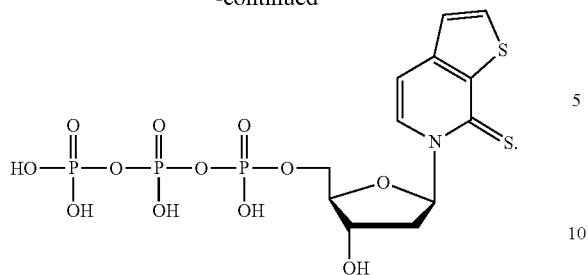

or salts thereof. In some embodiments, the mRNA derived the double-stranded oligonucleotide comprising a first unnatural nucleotide and a second unnatural nucleotide may comprise a codon comprising an unnatural nucleotide derived from

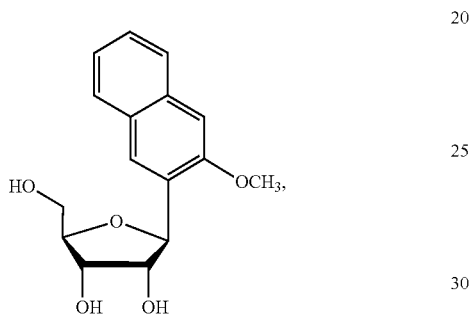

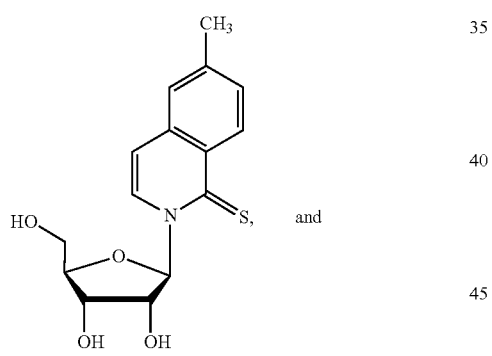

and

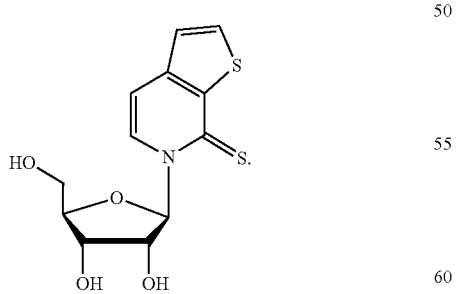

In some embodiments, the *M. mazei* tRNA may comprise an anti-codon comprising an unnatural nucleotide that recognizes the codon comprising the unnatural nucleotide of the mRNA. The anti-codon in the *M. mazei* tRNA may comprise an unnatural nucleotide derived from

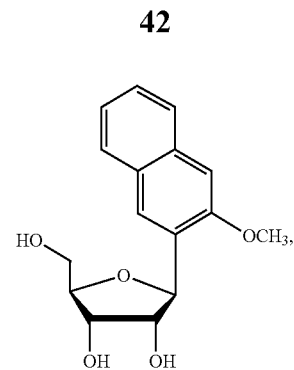

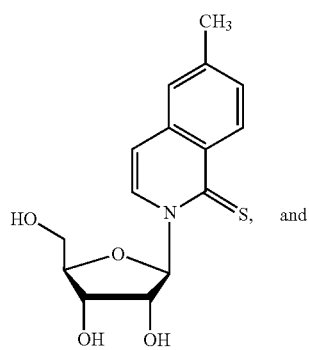

and

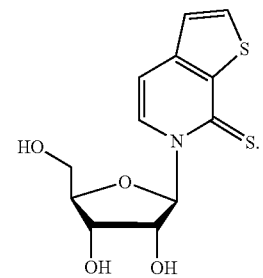

In some embodiments, the mRNA comprises an unnatural nucleotide derived from

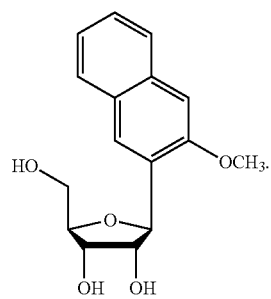

In some embodiments, the mRNA comprises an unnatural nucleotide derived from

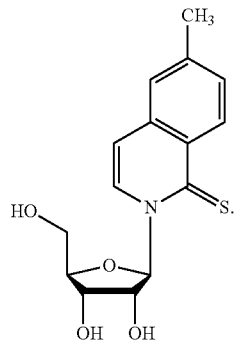

In some embodiments, the mRNA comprises an unnatural nucleotide derived from

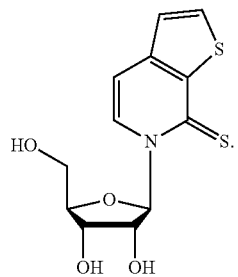

In some embodiments, the tRNA comprises an unnatural nucleotide derived from

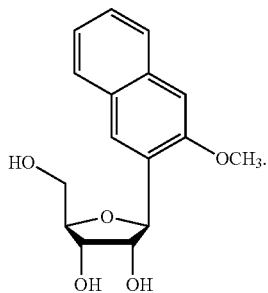

In some embodiments, the tRNA comprises an unnatural nucleotide derived from

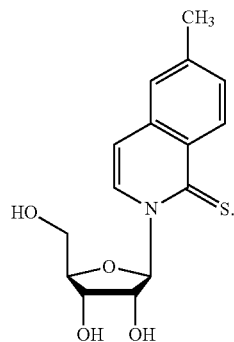

In some embodiments, the tRNA comprises an unnatural nucleotide derived from

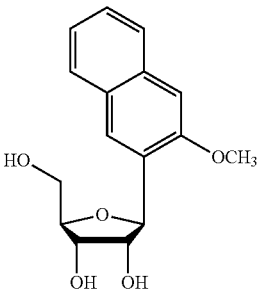

In some embodiments, the mRNA comprises an unnatural nucleotide derived from and the tRNA comprises an unnatural nucleotide derived from

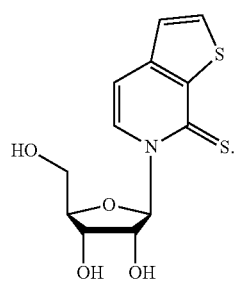

In some embodiments, the mRNA comprises an unnatural nucleotide derived from

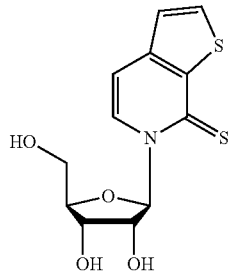

and the tRNA comprises an unnatural nucleotide derived from

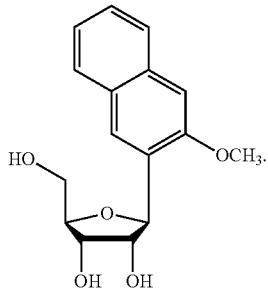

The host cell is cultured in a medium containing appropriate nutrients, and is supplemented with (a) the triphosphates of the deoxyribo nucleosides comprising one or more unnatural bases that are necessary for replication of the plasmid(s) encoding the cytokine gene harboring the codon, (b) the triphosphates of the ribo nucleosides comprising one or more unnatural bases necessary for transcription of (i) the mRNA corresponding to the coding sequence of the cytokine and containing the codon comprising one or more unnatural bases, and (ii) the tRNA containing the anticodon comprising one or more unnatural bases, and (c) the unnatural amino acid(s) to be incorporated in to the polypeptide sequence of the cytokine of interest. The host cells are then maintained under conditions which permit expression of the protein of interest.

The resulting protein comprising the one or more unnatural amino acids, AzK, N6-(propargylethoxy)-L-lysine (PraK), N6-(((2-azidobenzyl)oxy)carbonyl)-L-lysine, N6-(((3-azidobenzyl)oxy)carbonyl)-L-lysine, or N6-(((4-azidobenzyl)oxy)carbonyl)-L-lysine for example, that is expressed may be purified by methods known to those of ordinary skill in the art and may then be allowed to react with an alkyne, such as DBCO comprising a PEG chain having a desired average molecular weight as disclosed herein, under conditions known to those of ordinary skill in the art, to afford the IL-10 conjugates disclosed herein. Other methods are known to those of ordinary skill in the art, such as those disclosed in Zhang et al., Nature 2017, 551(7682): 644-647; WO 2015157555; WO 2015021432; WO 2016115168; WO 2017106767; WO 2017223528; WO 2019014262; WO 2019014267; WO 2019028419; and WO2019/028425.

Alternatively, a cytokine (e.g., IL-10) polypeptide comprising an unnatural amino acid(s) are prepared by introducing the nucleic acid constructs described herein comprising the tRNA and aminoacyl tRNA synthetase and comprising a nucleic acid sequence of interest with one or more in-frame orthogonal (stop) codons into a host cell. The host cell is cultured in a medium containing appropriate nutrients, is supplemented with (a) the triphosphates of the deoxyribo nucleosides comprising one or more unnatural bases required for replication of the plasmid(s) encoding the cytokine gene harboring the new codon and anticodon, (b) the triphosphates of the ribo nucleosides required for transcription of the mRNA corresponding to (i) the cytokine sequence containing the codon, and (ii) the orthogonal tRNA containing the anticodon, and (c) the unnatural amino acid(s). The host cells are then maintained under conditions which permit expression of the protein of interest. The unnatural amino acid(s) is incorporated into the polypeptide chain in response to the unnatural codon. For example, one or more unnatural amino acids are incorporated into the cytokine (e.g., IL-10) polypeptide. Alternatively, two or more unnatural amino acids may be incorporated into the cytokine (e.g., IL-10) polypeptide at two or more sites in the protein.

Once the cytokine (e.g., IL-10) polypeptide incorporating the unnatural amino acid(s) has been produced in the host cell it can be extracted therefrom by a variety of techniques known in the art, including enzymatic, chemical and/or osmotic lysis and physical disruption. The cytokine (e.g., IL-10) polypeptide can be purified by standard techniques known in the art such as preparative ion exchange chromatography, hydrophobic chromatography, affinity chromatography, or any other suitable technique known to those of ordinary skill in the art.

In some instances, an unnatural amino acid is incorporated into an IL-10 polypeptide by a naturally occurring synthetase. In some embodiments, an unnatural amino acid is incorporated into a cytokine by an organism that is auxotrophic for one or more amino acids. In some embodiments, synthetases corresponding to the auxotrophic amino acid are capable of charging the corresponding tRNA with an unnatural amino acid. In some embodiments, the unnatural amino acid is selenocysteine, or a derivative thereof. In some embodiments, the unnatural amino acid is selenomethionine, or a derivative thereof. In some embodiments, the unnatural amino acid is an aromatic amino acid, wherein the aromatic amino acid comprises an aryl halide, such as an iodide. In embodiments, the unnatural amino acid is structurally similar to the auxotrophic amino acid.

In some instances, the unnatural amino acid comprises an unnatural amino acid illustrated in FIG. 1.

Figure 2A:
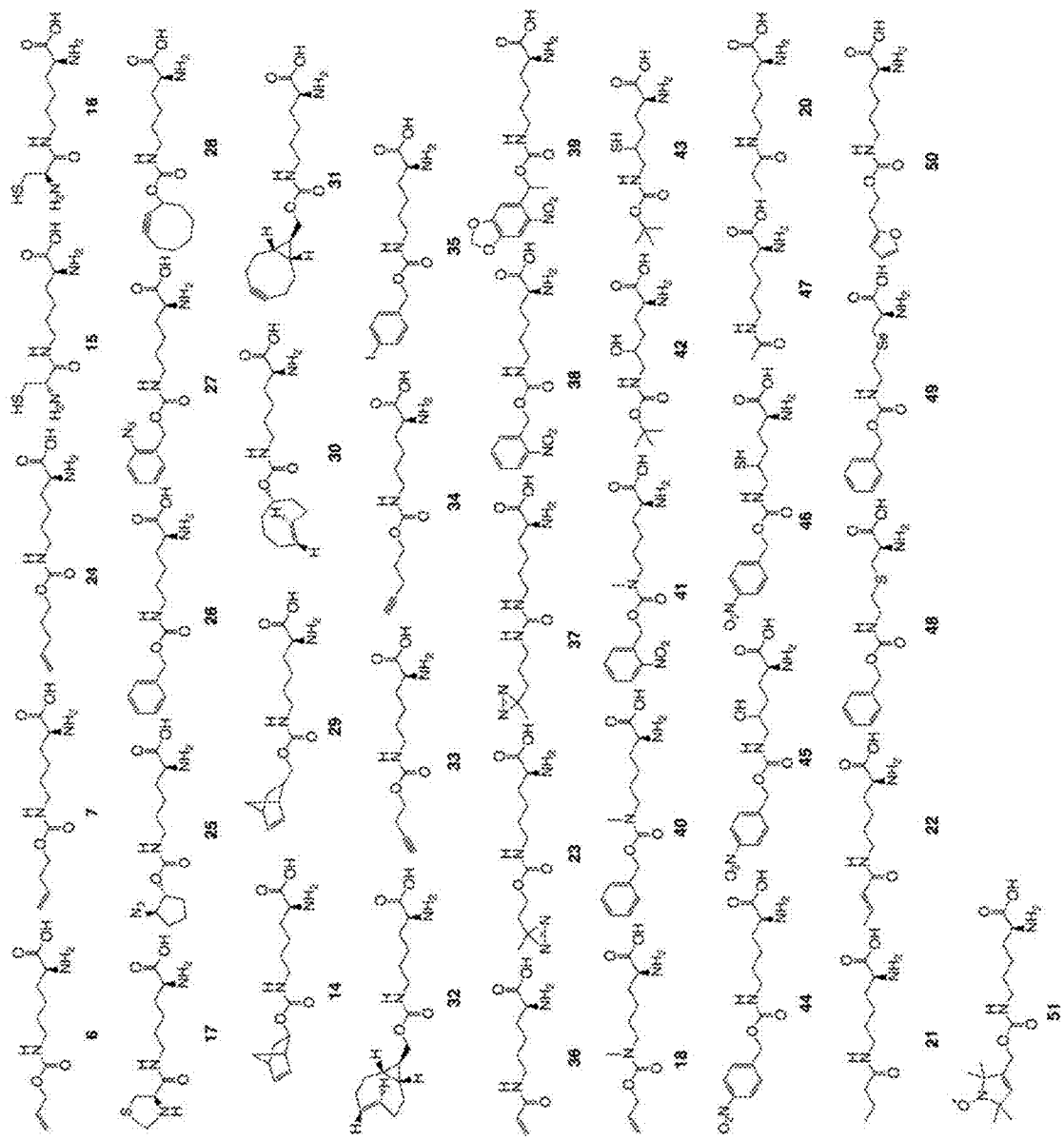
FIG. 2A-FIG. 2B illustrate exemplary unnatural amino acids.
Figure 2B:
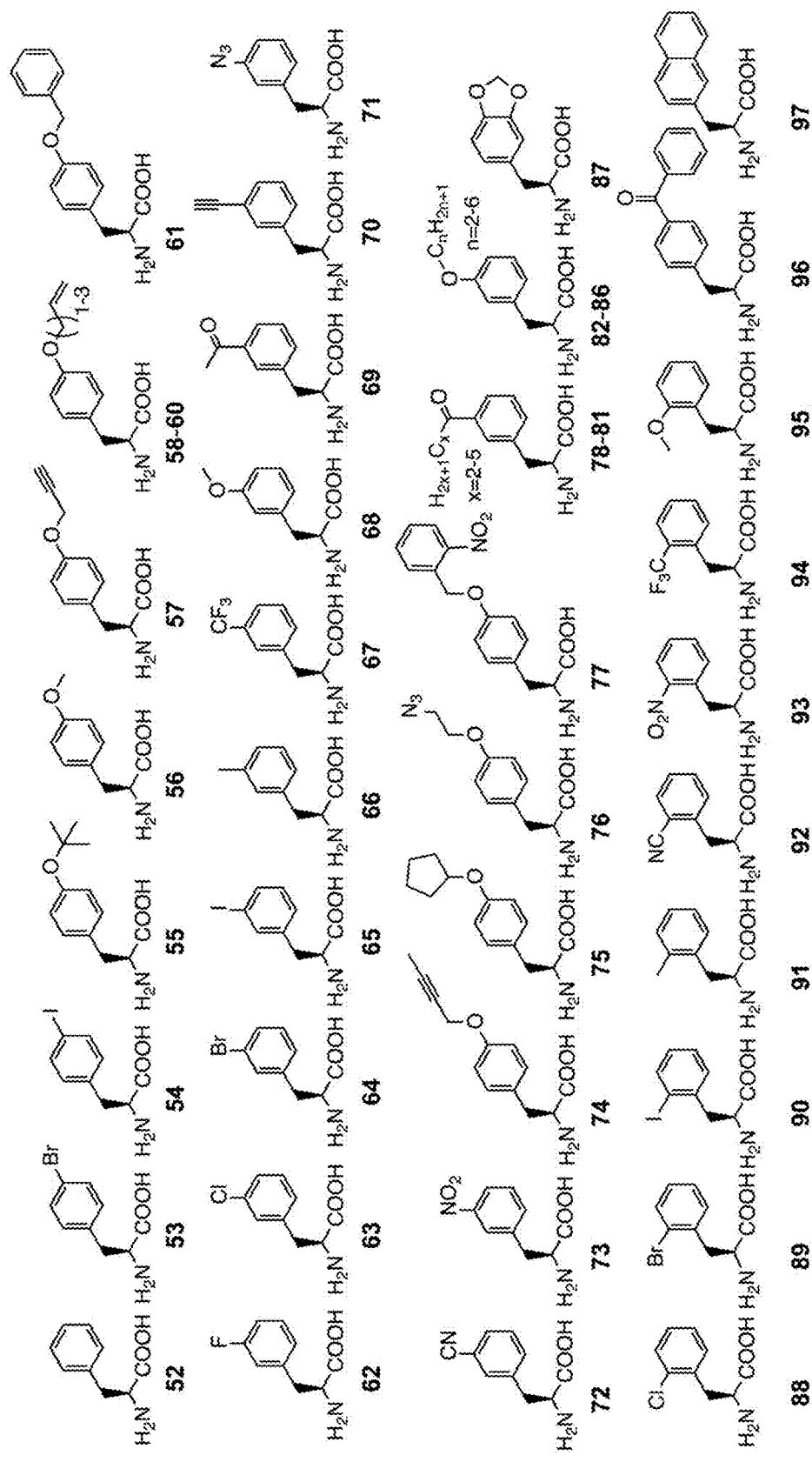
Figure 3A:
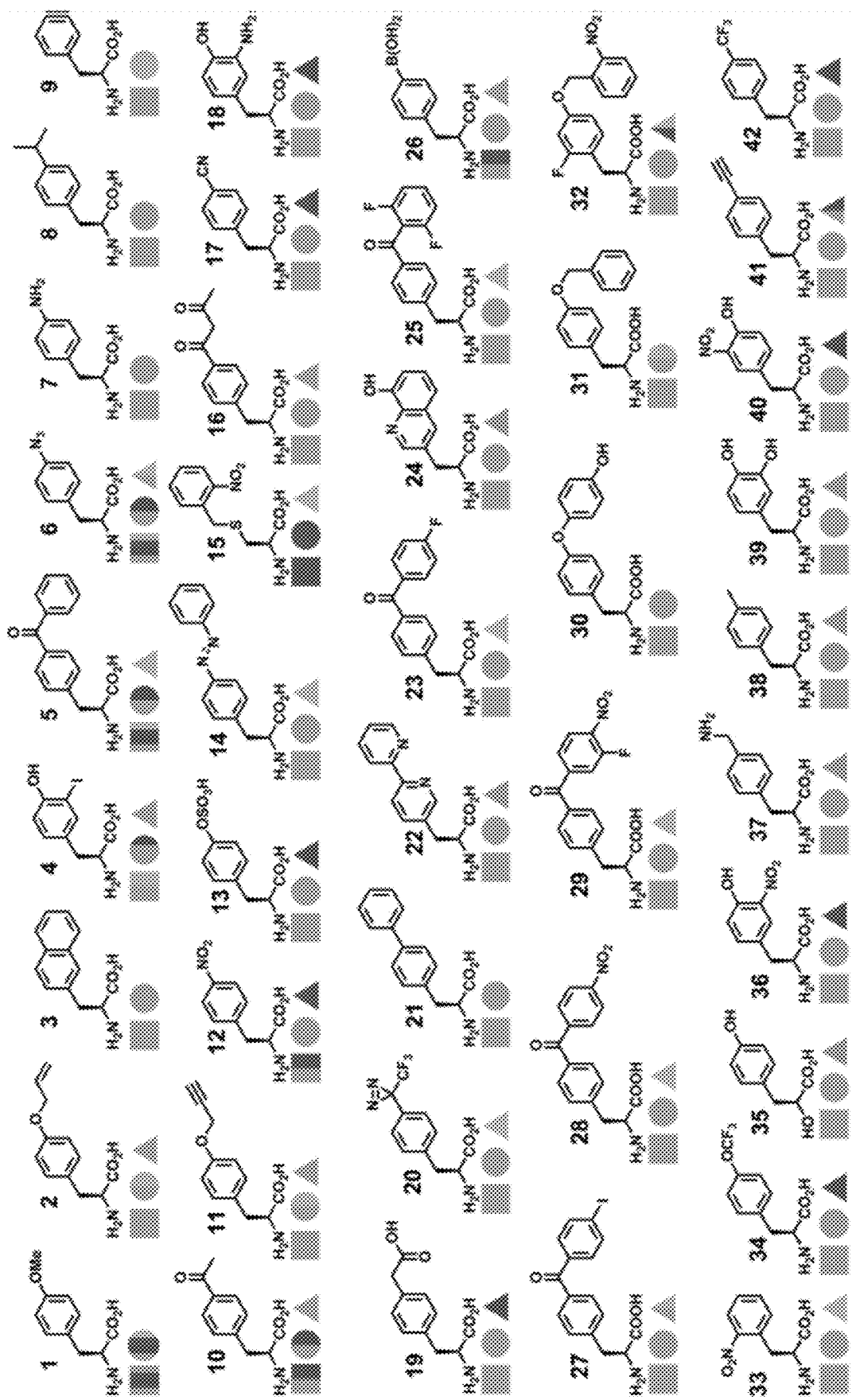
FIG. 3A-FIG. 3D illustrate exemplary unnatural amino acids. These unnatural amino acids (UAAs) have been genetically encoded in proteins (FIG. 3A—UAA #1-42.
Figure 3B:
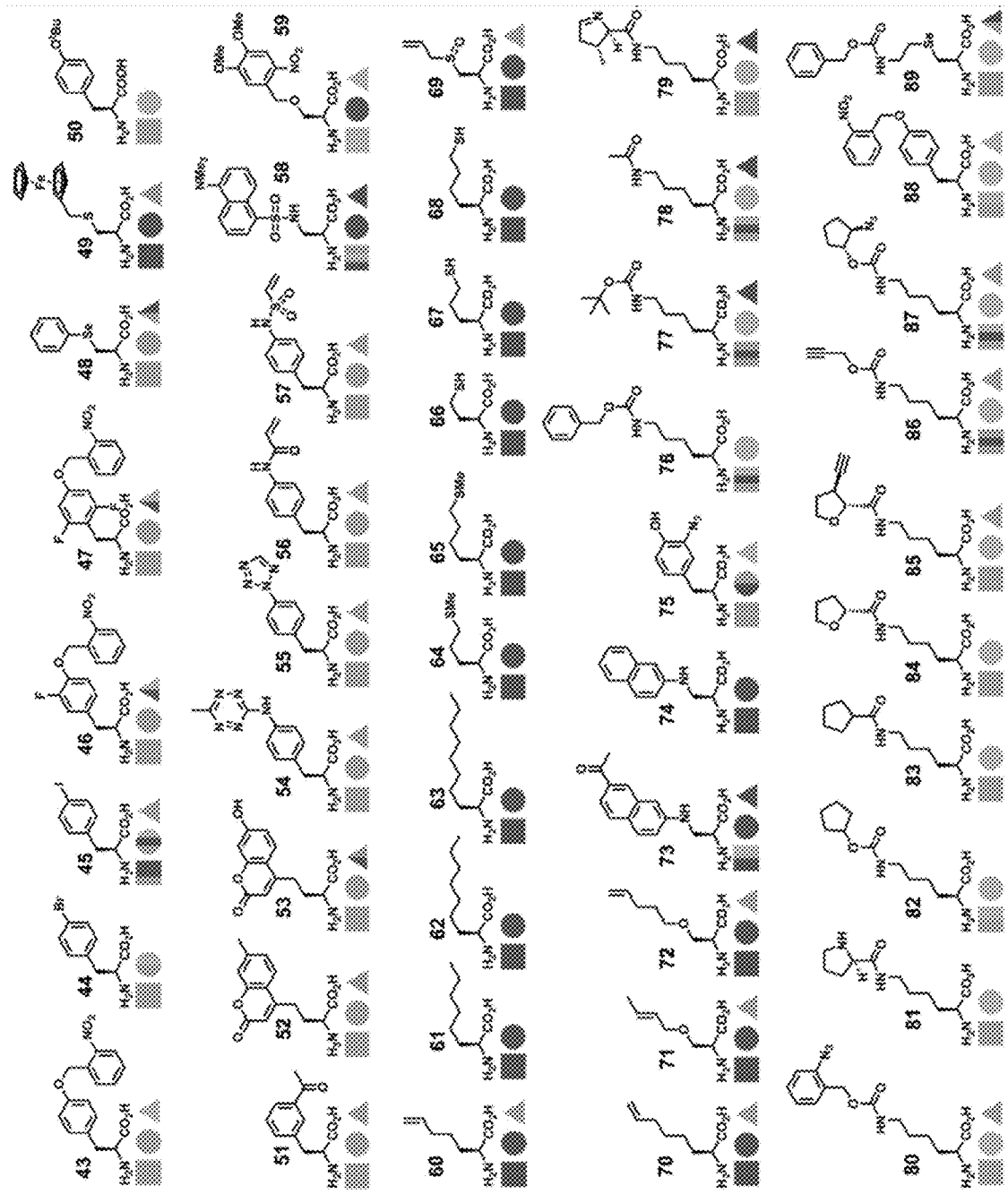
Figure 3C:
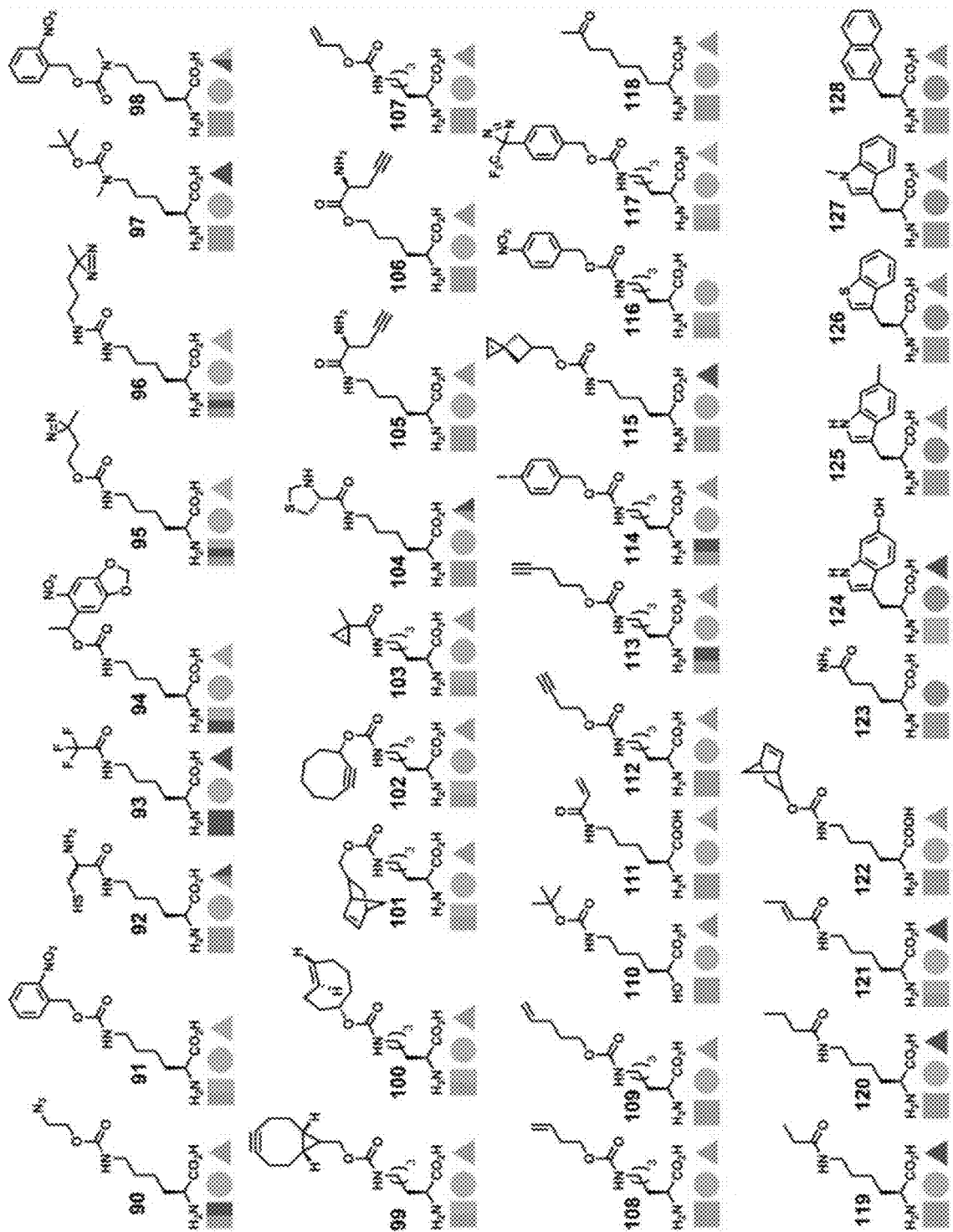
Figure 3D:
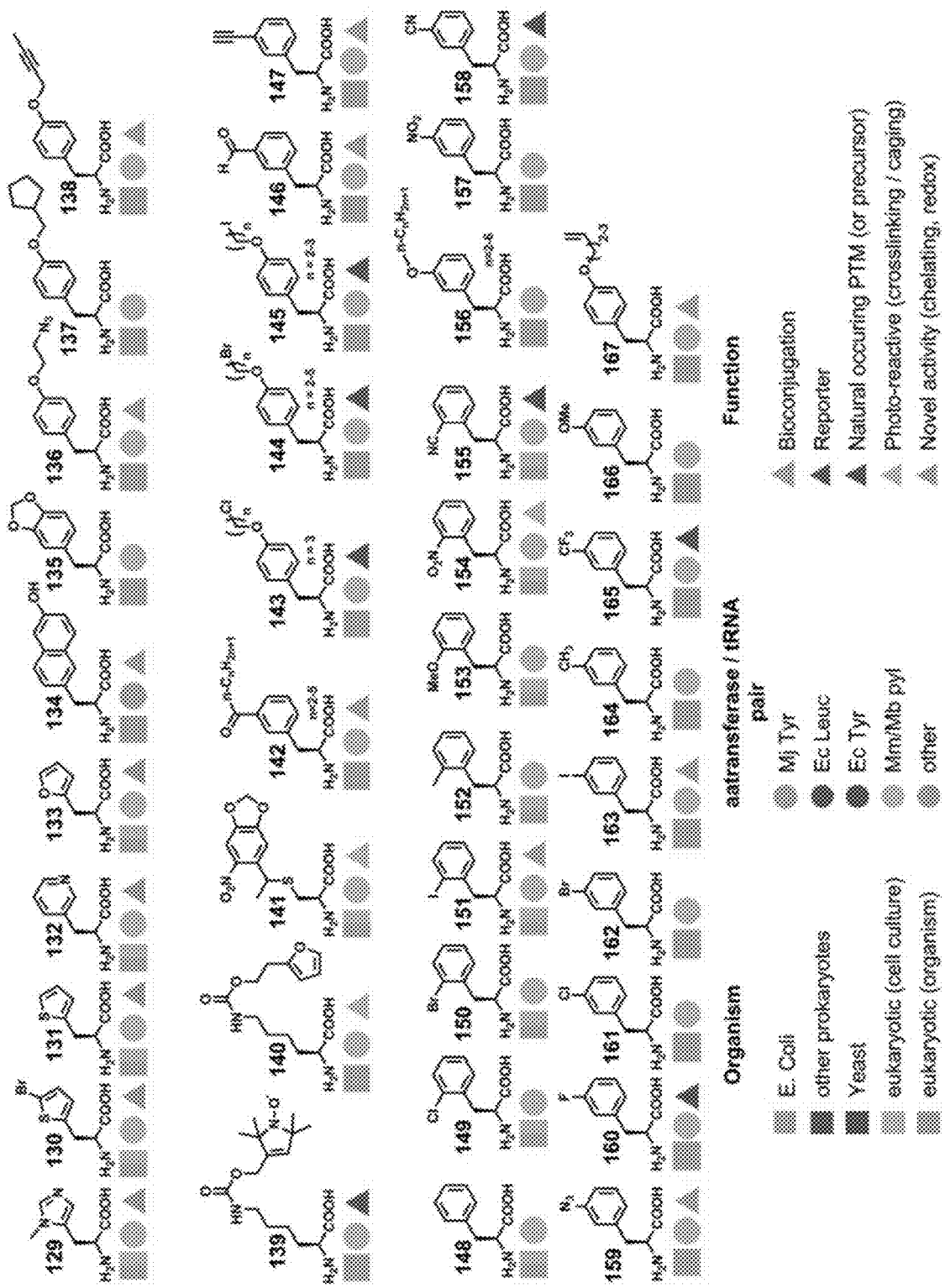

In some instances, the unnatural amino acid comprises a lysine or phenylalanine derivative or analogue. In some instances, the unnatural amino acid comprises a lysine derivative or a lysine analogue. In some instances, the unnatural amino acid comprises a pyrrolysine (Pyl). In some instances, the unnatural amino acid comprises a phenylalanine derivative or a phenylalanine analogue. In some instances, the unnatural amino acid is an unnatural amino acid described in Wan, et al., "Pyrrolysyl-tRNA synthetase: an ordinary enzyme but an outstanding genetic code expansion tool," Biochim Biophys Acta 1844(6): 1059-4070 (2014). In some instances, the unnatural amino acid comprises an unnatural amino acid illustrated in FIG. 2 (e.g., FIG. 2A and FIG. 2B).

In some embodiments, the unnatural amino acid comprises an unnatural amino acid illustrated in FIG. 3A-FIG. 3D (adopted from Table 1 of Dumas et al., *Chemical Science* 2015, 6, 50-69).

In some embodiments, an unnatural amino acid incorporated into an IL-10 polypeptide is disclosed in U.S. Pat. Nos. 9,840,493; 9,682,934; US 2017/0260137; U.S. Pat. No. 9,938,516; or US 2018/0086734. Exemplary UAAs that can be incorporated by such synthetases include para-methyl-azido-L-phenylalanine, aralkyl, heterocyclyl, and heteroaralkyl, and lysine derivative unnatural amino acids. In some embodiments, such UAAs comprise pyridyl, pyrazinyl, pyrazolyl, triazolyl, oxazolyl, thiazolyl, thiophenyl, or other heterocycle. Such amino acids in some embodiments comprise azides, tetrazines, or other chemical group capable of conjugation to a coupling partner, such as a water soluble moiety. In some embodiments, a UAA comprises an azide attached to an aromatic moiety via an alkyl linker. In some embodiments, an alkyl linker is a $C_1$-$C_{10}$ linker. In some embodiments, a UAA comprises a tetrazine attached to an aromatic moiety via an alkyl linker. In some embodiments, a UAA comprises a tetrazine attached to an aromatic moiety via an amino group. In some embodiments, a UAA comprises a tetrazine attached to an aromatic moiety via an alkylamino group. In some embodiments, a UAA comprises an azide attached to the terminal nitrogen (e.g., N6 of a lysine derivative, or N5, N4, or N3 of a derivative comprising a shorter alkyl side chain) of an amino acid side chain via an alkyl chain. In some embodiments, a UAA comprises a tetrazine attached to the terminal nitrogen of an amino acid side chain via an alkyl chain. In some embodiments, a UAA comprises an azide or tetrazine attached to an amide via an alkyl linker. In some embodiments, the UAA is an azide or tetrazine-containing carbamate or amide of 3-aminoalanine, serine, lysine, or derivative thereof. In some embodiments, such UAAs are incorporated into cytokines in-vivo. In some embodiments, such UAAs are incorporated into cytokines in a cell-free system.

Conjugating Moieties

In certain embodiments, disclosed herein are conjugating moieties that are bound to an IL-10 polypeptide described supra. In some instances, the conjugating moiety is a molecule that perturbs the interaction of the IL-10 with its receptor. In some instances, the conjugating moiety is any molecule that when bond to the IL-10, enables the IL-10 conjugate to modulate an immune response. In some instances, the conjugating moiety is bound to the IL-10 through a covalent bond. In some instances, an IL-10 described herein is attached to a conjugating moiety with a triazole group. In some instances, an IL-10 described herein is attached to a conjugating moiety with a dihydropyridazine or pyridazine group. In some instances, the conjugating moiety comprises a water-soluble polymer. In other instances, the conjugating moiety comprises a protein or a binding fragment thereof. In additional instances, the conjugating moiety comprises a peptide. In additional instances, the conjugating moiety comprises a nucleic acid. In additional instances, the conjugating moiety comprises a small molecule. In additional instances, the conjugating moiety comprises a bioconjugate (e.g., a TLR agonist such as a TLR1, TLR2, TLR3, TLR4, TLR5, TLR6, TLR7, TLR8, or TLR9 agonist; or a synthetic ligand such as Pam3Cys, CFA, MALP2, Pam2Cys, FSL-1, Hib-OMPC, Poly I:C, poly A:U, AGP, MPL A, RC-529, MDF2β, CFA, or Flagellin). In some cases, the conjugating moiety increases serum half-life, and/or improves stability. In some cases, the conjugating moiety reduces cytokine interaction with one or more cytokine receptor domains or subunits. In additional cases, the conjugating moiety blocks IL-10 interaction with one or more IL-10 domains or subunits with its cognate receptor(s). In some embodiments, IL-10 conjugates described herein comprise multiple conjugating moieties. In some embodiments, a conjugating moiety is attached to an unnatural or natural amino acid in the IL-10 polypeptide. In some embodiments, an IL-10 conjugate comprises a conjugating moiety attached to a natural amino acid. In some embodiments, an IL-10 conjugate is attached to an unnatural amino acid in the cytokine peptide. In some embodiments, a conjugating moiety is attached to the N or C terminal amino acid of the IL-10 polypeptide. Various combinations sites are disclosed herein, for example, a first conjugating moiety is attached to an unnatural or natural amino acid in the IL-10 polypeptide, and a second conjugating moiety is attached to the N or C terminal amino acid of the IL-10 polypeptide. In some embodiments, a single conjugating moiety is attached to multiple residues of the IL-10 polypeptide (e.g. a staple). In some embodiments, a conjugating moiety is attached to both the N and C terminal amino acids of the IL-10 polypeptide.

Water-Soluble Polymers

In some embodiments, a conjugating moiety descried herein is a water-soluble polymer. In some instances, the water-soluble polymer is a nonpeptidic, nontoxic, and biocompatible. As used herein, a substance is considered biocompatible if the beneficial effects associated with use of the substance alone or with another substance (e.g., an active agent such as an IL-10 moiety) in connection with living tissues (e.g., administration to a patient) outweighs any deleterious effects as evaluated by a clinician, e.g., a physician, a toxicologist, or a clinical development specialist. In some instances, a water-soluble polymer is further non-immunogenic. In some instances, a substance is considered non-immunogenic if the intended use of the substance in vivo does not produce an undesired immune response (e.g., the formation of antibodies) or, if an immune response is produced, that such a response is not deemed clinically significant or important as evaluated by a clinician, e.g., a physician, a toxicologist, or a clinical development specialist.

In some instances, the water-soluble polymer is characterized as having from about 2 to about 300 termini. Exemplary water soluble polymers include, but are not limited to, poly(alkylene glycols) such as polyethylene glycol ("PEG"), poly(propylene glycol) ("PPG"), copolymers of ethylene glycol and propylene glycol and the like, poly(oxyethylated polyol), poly(olefinic alcohol), poly(vinylpyrrolidone), poly(hydroxyalkylmethacrylamide), poly(hydroxyalkylmethacrylate), poly(saccharides), poly(α-hydroxy acid), poly(vinyl alcohol) (PVA), polyacrylamide (PAAm), poly(N-(2-hydroxypropyl) methacrylamide) (PHPMA), polydimethylacrylamide (PDAAm), polyphosphazene, polyoxazolines ("POZ") (which are described in WO 2008/106186), poly(N-acryloylmorpholine), and combinations of any of the foregoing.

In some cases, the water-soluble polymer is not limited to a particular structure. In some cases, the water-soluble polymer is linear (e.g., an end capped, e.g., alkoxy PEG or a bifunctional PEG), branched or multi-armed (e.g., forked PEG or PEG attached to a polyol core), a dendritic (or star) architecture, each with or without one or more degradable linkages. Moreover, the internal structure of the water-soluble polymer can be organized in any number of different repeat patterns and can be selected from the group consisting of homopolymer, alternating copolymer, random copolymer, block copolymer, alternating tripolymer, random tripolymer, and block tripolymer.

In some embodiments, the weight-average molecular weight of the water-soluble polymer in the IL-10 conjugate is from about 100 Daltons to about 150,000 Daltons. Exemplary ranges include, for example, weight-average molecular weights in the range of greater than 5,000 Daltons to about 100,000 Daltons, in the range of from about 6,000 Daltons to about 90,000 Daltons, in the range of from about 10,000 Daltons to about 85,000 Daltons, in the range of greater than 10,000 Daltons to about 85,000 Daltons, in the range of from about 20,000 Daltons to about 85,000 Daltons, in the range of from about 53,000 Daltons to about 85,000 Daltons, in the range of from about 25,000 Daltons to about 120,000 Daltons, in the range of from about 29,000 Daltons to about 120,000 Daltons, in the range of from about 35,000 Daltons to about 120,000 Daltons, and in the range of from about 40,000 Daltons to about 120,000 Daltons.

Exemplary weight-average molecular weights for the water-soluble polymer include about 100 Daltons, about 200 Daltons, about 300 Daltons, about 400 Daltons, about 500 Daltons, about 600 Daltons, about 700 Daltons, about 750 Daltons, about 800 Daltons, about 900 Daltons, about 1,000 Daltons, about 1,500 Daltons, about 2,000 Daltons, about 2,200 Daltons, about 2,500 Daltons, about 3,000 Daltons, about 4,000 Daltons, about 4,400 Daltons, about 4,500 Daltons, about 5,000 Daltons, about 5,500 Daltons, about 6,000 Daltons, about 7,000 Daltons, about 7,500 Daltons, about 8,000 Daltons, about 9,000 Daltons, about 10,000 Daltons, about 11,000 Daltons, about 12,000 Daltons, about 13,000 Daltons, about 14,000 Daltons, about 15,000 Daltons, about 20,000 Daltons, about 22,500 Daltons, about 25,000 Daltons, about 30,000 Daltons, about 35,000 Daltons, about 40,000 Daltons, about 45,000 Daltons, about 50,000 Daltons, about 55,000 Daltons, about 60,000 Daltons, about 65,000 Daltons, about 70,000 Daltons, and about 75,000 Daltons. Branched versions of the water-soluble polymer (e.g., a branched 40,000 Dalton water-soluble polymer comprised of two 20,000 Dalton polymers) having a total molecular weight of any of the foregoing can also be used. In one or more embodiments, the conjugate will not have any PEG moieties attached, either directly or indirectly, with a PEG having a weight average molecular weight of less than about 6,000 Daltons.

PEGs will typically comprise a number of ($OCH_2CH_2$) monomers [or ($CH_2CH_2O$) monomers, depending on how the PEG is defined]. As used herein, the number of repeating units is identified by the subscript "n" in "($OCH_2CH_2$)$_n$." Thus, the value of (n) typically falls within one or more of the following ranges: from 2 to about 3400, from about 100 to about 2300, from about 100 to about 2270, from about 136 to about 2050, from about 225 to about 1930, from about 450 to about 1930, from about 1200 to about 1930, from about 568 to about 2727, from about 660 to about 2730, from about 795 to about 2730, from about 795 to about 2730, from about 909 to about 2730, and from about 1,200 to about 1,900. For any given polymer in which the molecular weight is known, it is possible to determine the number of repeating units (i.e., "n") by dividing the total weight-average molecular weight of the polymer by the molecular weight of the repeating monomer.

In some instances, the water-soluble polymer is an end-capped polymer, that is, a polymer having at least one terminus capped with a relatively inert group, such as a lower $C_{1-6}$ alkoxy group, or a hydroxyl group. When the polymer is PEG, for example, a methoxy-PEG (commonly referred to as mPEG) may be used, which is a linear form of PEG wherein one terminus of the polymer is a methoxy (—$OCH_3$) group, while the other terminus is a hydroxyl or other functional group that can be optionally chemically modified.

In some embodiments, exemplary water-soluble polymers include, but are not limited to, linear or branched discrete PEG (dPEG) from Quanta Biodesign, Ltd; linear, branched, or forked PEGs from Nektar Therapeutics; linear, branched, or Y-shaped PEG derivatives from JenKem Technology.

In some embodiments, an IL-10 polypeptide described herein is conjugated to a water-soluble polymer selected from poly(alkylene glycols) such as polyethylene glycol ("PEG"), poly(propylene glycol) ("PPG"), copolymers of ethylene glycol and propylene glycol and the like, poly (oxyethylated polyol), poly(olefinic alcohol), poly(vinylpyrrolidone), poly(hydroxyalkylmethacrylamide), poly(hydroxyalkylmethacrylate), poly(saccharides), poly(α-hydroxy acid), poly(vinyl alcohol) (PVA), polyacrylamide (PAAm), polydimethylacrylamide (PDAAm), poly(N-(2-hydroxypropyl) methacrylamide) (PHPMA), polyphosphazene, polyoxazolines ("POZ"), poly(N-acryloylmorpholine), and a combination thereof. In some instances, the IL-10 polypeptide is conjugated to PEG (e.g., PEGylated). In some instances, the IL-10 polypeptide is conjugated to PPG. In some instances, the IL-10 polypeptide is conjugated to POZ. In some instances, the IL-10 polypeptide is conjugated to PVP.

In some instances, a water-soluble polymer comprises a polyglycerol (PG). In some cases, the polyglycerol is a hyperbranched PG (HPG) (e.g., as described by Imran, et al. "Influence of architecture of high molecular weight linear and branched polyglycerols on their biocompatibility and biodistribution," *Biomaterials* 33:9135-9147 (2012)). In other cases, the polyglycerol is a linear PG (LPG). In additional cases, the polyglycerol is a midfunctional PG, a linear-block-hyperbranched PG (e.g., as described by Wurm et. Al., "Squaric acid mediated synthesis and biological activity of a library of linear and hyperbranched poly (glycerol)-protein conjugates," *Biomacromolecules* 13:1161-1171 (2012)), or a side-chain functional PG (e.g., as described by Li, et. al., "Synthesis of linear polyether polyol derivatives as new materials for bioconjugation," *Bioconjugate Chem.* 20:780-789 (2009).

In some instances, an IL-10 polypeptide described herein is conjugated to a PG, e.g., a HPG, a LPG, a midfunctional PG, a linear-block-hyperbranched PG, or a side-chain functional PG.

In some embodiments, a water-soluble polymer is a degradable synthetic PEG alternative. Exemplary degradable synthetic PEG alternatives include, but are not limited to, poly[oligo(ethylene glycol)methyl methacrylate] (POEGMA); backbone modified PEG derivatives generated by polymerization of telechelic, or di-end-functionalized PEG-based macromonomers; PEG derivatives comprising comonomers comprising degradable linkage such as poly [(ethylene oxide)-co-(methylene ethylene oxide)][P(EO-co-MEO)], cyclic ketene acetals such as 5,6-benzo-2-methylene-1,3-dioxepane (BMDO), 2-methylene-1,3-dioxepane (MDO), and 2-methylene-4-phenyl-1,3-dioxolane (MPDL) copolymerized with OEGMA; or poly-(ε-caprolactone)-graft-poly(ethylene oxide) (PCL-g-PEO).

In some instances, an IL-10 polypeptide described herein is conjugated to a degradable synthetic PEG alternative, such as for example, POEGM; backbone modified PEG derivatives generated by polymerization of telechelic, or di-end-functionalized PEG-based macromonomers; P(EO-co-MEO); cyclic ketene acetals such as BMDO, MDO, and MPDL copolymerized with OEGMA; or PCL-g-PEO.

In some embodiments, a water-soluble polymer comprises a poly(zwitterions). Exemplary poly(zwitterions) include, but are not limited to, poly(sulfobetaine methacrylate) (PSBMA), poly(carboxybetaine methacrylate) (PCBMA), and poly(2-methyacryloyloxyethyl phosphorylcholine) (PMPC). In some instances, an IL-10 polypeptide is conjugated to a poly(zwitterion) such as PSBMA, PCBMA, or PMPC.

In some embodiments, a water-soluble polymer comprises a polycarbonate. Exemplary polycarbonates include, but are not limited to, pentafluorophenyl 5-methyl-2-oxo-1,3-dioxane-5-carboxylate (MTC-OC$_6$F$_5$). In some instances, an IL-10 polypeptide described herein is conjugated to a polycarbonate such as MTC-OC$_6$F$_5$.

In some embodiments, a water-soluble polymer comprises a polymer hybrid, such as for example, a polycarbonate/PEG polymer hybrid, a peptide/protein-polymer conjugate, or a hydroxyl containing and/or zwitterionic derivatized polymer (e.g., a hydroxyl containing and/or zwitterionic derivatized PEG polymer). In some instances, an IL-10 polypeptide described herein is conjugated to a polymer hybrid such as a polycarbonate/PEG polymer hybrid, a peptide/protein-polymer conjugate, or a hydroxyl containing and/or zwitterionic derivatized polymer (e.g., a hydroxyl containing and/or zwitterionic derivatized PEG polymer).

In some instances, a water-soluble polymer comprises a polysaccharide. Exemplary polysaccharides include, but are not limited to, dextran, polysialic acid (PSA), hyaluronic acid (HA), amylose, heparin, heparan sulfate (HS), dextrin, or hydroxyethyl-starch (HES). In some cases, an IL-10 polypeptide is conjugated to a polysaccharide. In some cases, an IL-10 polypeptide is conjugated to dextran. In some cases, an IL-10 polypeptide is conjugated to PSA. In some cases, an IL-10 polypeptide is conjugated to HA. In some cases, an IL-10 polypeptide is conjugated to amylose. In some cases, an IL-10 polypeptide is conjugated to heparin. In some cases, an IL-10 polypeptide is conjugated to HS. In some cases, an IL-10 polypeptide is conjugated to dextrin. In some cases, an IL-10 polypeptide is conjugated to HES.

In some cases, a water-soluble polymer comprises a glycan. Exemplary classes of glycans include N-linked glycans, O-linked glycans, glycolipids, O-GlcNAc, and glycosaminoglycans. In some cases, an IL-10 polypeptide is conjugated to a glycan. In some cases, an IL-10 polypeptide is conjugated to N-linked glycans. In some cases, an IL-10 polypeptide is conjugated to O-linked glycans. In some cases, an IL-10 polypeptide is conjugated to glycolipids. In some cases, an IL-10 polypeptide is conjugated to O-GlcNAc. In some cases, an IL-10 polypeptide is conjugated to glycosaminoglycans.

In some embodiments, a water-soluble polymer comprises a polyoxazoline polymer. A polyoxazoline polymer is a linear synthetic polymer, and similar to PEG, comprises a low polydispersity. In some instances, a polyoxazoline polymer is a polydispersed polyoxazoline polymer, characterized with an average molecule weight. In some cases, the average molecule weight of a polyoxazoline polymer includes, for example, 1000, 1500, 2000, 2500, 3000, 3500, 4000, 4500, 5000, 5500, 6000, 6500, 7000, 7500, 8000, 10,000, 12,000, 20,000, 35,000, 40,000, 50,000, 60,000, 100,000, 200,000, 300,000, 400,000, or 500,000 Da. In some instances, a polyoxazoline polymer comprises poly(2-methyl 2-oxazoline) (PMOZ), poly(2-ethyl 2-oxazoline) (PEOZ), or poly(2-propyl 2-oxazoline) (PPOZ). In some cases, an IL-10 polypeptide is conjugated to a polyoxazoline polymer. In some cases, an IL-10 polypeptide is conjugated to PMOZ. In some cases, an IL-10 polypeptide is conjugated to PEOZ. In some cases, an IL-10 polypeptide is conjugated to PPOZ.

In some instances, a water-soluble polymer comprises a polyacrylic acid polymer. In some cases, an IL-10 polypeptide is conjugated to a polyacrylic acid polymer.

In some instances, a water-soluble polymer comprises polyamine. Polyamine is an organic polymer comprising two or more primary amino groups. In some embodiments, a polyamine includes a branched polyamine, a linear polyamine, or cyclic polyamine. In some cases, a polyamine is a low-molecular-weight linear polyamine. Exemplary polyamines include putrescine, cadaverine, spermidine, spermine, ethylene diamine, 1,3-diaminopropane, hexamethylenediamine, tetraethylmethylenediamine, and piperazine. In some cases, an IL-10 polypeptide is conjugated to a polyamine. In some cases, an IL-10 polypeptide is conjugated to putrescine, cadaverine, spermidine, spermine, ethylene diamine, 1,3-diaminopropane, hexamethylenediamine, tetraethylmethylenediamine, or piperazine.

In some instances, a water-soluble polymer is described in U.S. Pat. Nos. 7,744,861, 8,273,833, and 7,803,777. In some instances, an IL-10 polypeptide is conjugated to a linker described in U.S. Pat. Nos. 7,744,861, 8,273,833, or 7,803,777.

Lipids

In some embodiments, a conjugating moiety descried herein is a lipid. In some instances, the lipid is a fatty acid. In some cases, the fatty acid is a saturated fatty acid. In other cases, the fatty acid is an unsaturated fatty acid. Exemplary fatty acids include, but are not limited to, fatty acids comprising from about 6 to about 26 carbon atoms, from about 6 to about 24 carbon atoms, from about 6 to about 22 carbon atoms, from about 6 to about 20 carbon atoms, from about 6 to about 18 carbon atoms, from about 20 to about 26 carbon atoms, from about 12 to about 26 carbon atoms, from about 12 to about 24 carbon atoms, from about 12 to about 22 carbon atoms, from about 12 to about 20 carbon atoms, or from about 12 to about 18 carbon atoms. In some cases, the lipid binds to one or more serum proteins, thereby increasing serum stability and/or serum half-life.

In some embodiments, the lipid is conjugated to an IL-10 polypeptide described herein. In some instances, the lipid is a fatty acid, e.g., a saturated fatty acid or an unsaturated fatty acid. In some cases, the fatty acid is from about 6 to about 26 carbon atoms, from about 6 to about 24 carbon atoms, from about 6 to about 22 carbon atoms, from about 6 to about 20 carbon atoms, from about 6 to about 18 carbon atoms, from about 20 to about 26 carbon atoms, from about 12 to about 26 carbon atoms, from about 12 to about 24 carbon atoms, from about 12 to about 22 carbon atoms, from about 12 to about 20 carbon atoms, or from about 12 to about 18 carbon atoms. In some cases, the fatty acid comprises about 6, 7, 8, 9, 10, 11, 12, 13, 14, 15, 16, 17, 18, 19, 20, 21, 22, 23, 24, 25, or 26 carbon atoms in length. In some cases, the fatty acid comprises caproic acid (hexanoic acid), enanthic acid (heptanoic acid), caprylic acid (octanoic acid), pelargonic acid (nonanoic acid), capric acid (decanoic acid), undecylic acid (undecanoic acid), lauric acid (dodecanoic acid), tridecylic acid (tridecanoic acid), myristic acid (tetradecanoic acid), pentadecylic acid (pentadecanoic acid), palmitic acid (hexadecanoic acid), margaric acid (heptadecanoic acid), stearic acid (octadecanoic acid), nonadecylic acid (nonadecanoic acid), arachidic acid (eicosanoic acid), heneicosylic acid (heneicosanoic acid), behenic acid (docosanoic acid), tricosylic acid (tricosanoic acid), lignoceric acid (tetracosanoic acid), pentacosylic acid (pentacosanoic acid), or cerotic acid (hexacosanoic acid).

In some embodiments, the IL-10 lipid conjugate enhances serum stability and/or serum half-life.

Proteins

In some embodiments, a conjugating moiety descried herein is a protein or a binding fragment thereof. Exemplary proteins include albumin, transferrin, or transthyretin. In some instances, the protein or a binding fragment thereof comprises an antibody, or its binding fragments thereof. In some cases, an IL-10 conjugate comprises a protein or a binding fragment thereof. In some cases, an IL-10 conjugate comprising a protein or a binding fragment thereof has an increased serum half-life, and/or stability. In some cases, an IL-10 conjugate comprising a protein or a binding fragment thereof has a reduced IL-10 interaction with one or more IL-10R subunits. In additional cases, the protein or a binding fragment thereof blocks IL-10 interaction with one or more IL-10R subunits.

In some embodiments, the conjugating moiety is albumin. Albumin is a family of water-soluble globular proteins. It is commonly found in blood plasma, comprising about 55-60% of all plasma proteins. Human serum albumin (HSA) is a 585 amino acid polypeptide in which the tertiary structure is divided into three domains, domain I (amino acid residues 1-195), domain II (amino acid residues 196-383), and domain III (amino acid residues 384-585). Each domain further comprises a binding site, which can interact either reversibly or irreversibly with endogenous ligands such as long- and medium-chain fatty acids, bilirubin, or hemin, or exogenous compounds such as heterocyclic or aromatic compounds.

In some cases, an IL-10 polypeptide is conjugated to albumin. In some cases, the IL-10 polypeptide is conjugated to human serum albumin (HSA). In additional cases, the IL-10 polypeptide is conjugated to a functional fragment of albumin.

In some embodiments, the conjugating moiety is transferrin. Transferrin is a 679 amino acid polypeptide that is about 80 kDa in size and comprises two $Fe^{3+}$ binding sites with one at the N-terminal domain and the other at the C-terminal domain. In some instances, human transferrin has a half-life of about 7-12 days.

In some instances, an IL-10 polypeptide is conjugated to transferrin. In some cases, the IL-10 polypeptide is conjugated to human transferrin. In additional cases, the IL-10 polypeptide is conjugated to a functional fragment of transferrin.

In some embodiments, the conjugating moiety is transthyretin (TTR). Transthyretin is a transport protein located in the serum and cerebrospinal fluid which transports the thyroid hormone thyroxine ($T_4$) and retinol-binding protein bound to retinol.

In some instances, an IL-10 polypeptide is conjugated to transthyretin (via one of its termini or via an internal hinge region). In some cases, the IL-10 polypeptide is conjugated to a functional fragment of transthyretin.

In some embodiments, the conjugating moiety is an antibody, or its binding fragments thereof. In some instances, an antibody or its binding fragments thereof comprise a humanized antibody or binding fragment thereof, murine antibody or binding fragment thereof, chimeric antibody or binding fragment thereof, monoclonal antibody or binding fragment thereof, monovalent Fab', divalent $Fab_2$, F(ab)'$_3$ fragments, single-chain variable fragment (scFv), bis-scFv, $(scFv)_2$, diabody, minibody, nanobody, triabody, tetrabody, humabody, disulfide stabilized Fv protein (dsFv), single-domain antibody (sdAb), Ig NAR, camelid antibody or binding fragment thereof, bispecific antibody or biding fragment thereof, or a chemically modified derivative thereof.

In some instances, the conjugating moiety comprises a scFv, bis-scFv, $(scFv)_2$, dsFv, or sdAb. In some cases, the conjugating moiety comprises a scFv. In some cases, the conjugating moiety comprises a bis-scFv. In some cases, the conjugating moiety comprises a $(scFv)_2$. In some cases, the conjugating moiety comprises a dsFv. In some cases, the conjugating moiety comprises a sdAb.

In some instances, the conjugating moiety comprises an Fc portion of an antibody, e.g., of IgG, IgA, IgM, IgE, or IgD. In some instances, the moiety comprises an Fc portion of IgG (e.g., $IgG_1$, $IgG_3$, or $IgG_4$).

In some cases, an IL-10 polypeptide is conjugated to an antibody, or its binding fragments thereof. In some cases, the IL-10 polypeptide is conjugated to a humanized antibody or binding fragment thereof, murine antibody or binding fragment thereof, chimeric antibody or binding fragment thereof, monoclonal antibody or binding fragment thereof, monovalent Fab', divalent $Fab_2$, F(ab)'$_3$ fragments, single-chain variable fragment (scFv), bis-scFv, $(scFv)_2$, diabody, minibody, nanobody, triabody, tetrabody, humabody, disulfide stabilized Fv protein (dsFv), single-domain antibody (sdAb), Ig NAR, camelid antibody or binding fragment thereof, bispecific antibody or biding fragment thereof, or a chemically modified derivative thereof. In additional cases, the IL-10 polypeptide is conjugated to an Fc portion of an antibody. In additional cases, the IL-10 polypeptide is conjugated to an Fc portion of IgG (e.g., $IgG_1$, $IgG_3$, or $IgG_4$).

In some embodiments, an IL-10 polypeptide is conjugated to a water-soluble polymer (e.g., PEG) and an antibody or binding fragment thereof. In some cases, the antibody or binding fragments thereof comprises a humanized antibody or binding fragment thereof, murine antibody or binding fragment thereof, chimeric antibody or binding fragment thereof, monoclonal antibody or binding fragment thereof, monovalent Fab', divalent $Fab_2$, F(ab)'$_3$ fragments, single-chain variable fragment (scFv), bis-scFv, $(scFv)_2$, diabody, minibody, nanobody, triabody, tetrabody, humabody, disulfide stabilized Fv protein (dsFv), single-domain antibody (sdAb), Ig NAR, camelid antibody or binding fragment thereof, bispecific antibody or biding fragment thereof, or a chemically modified derivative thereof. In some cases, the antibody or binding fragments thereof comprises a scFv, bis-scFv, $(scFv)_2$, dsFv, or sdAb. In some cases, the antibody or binding fragments thereof comprises a scFv. In some cases, the antibody or binding fragment thereof guides the IL-10 conjugate to a target cell of interest and the water-soluble polymer enhances stability and/or serum half-life.

In some instances, one or more IL-10 polypeptide-water-soluble polymer (e.g., PEG) conjugates are further bound to an antibody or binding fragments thereof. In some instances, the ratio of the IL-10 conjugate to the antibody is about 1:1, 2:1, 3:1, 4:1, 5:1, 6:1, 7:1, 8:1, 9:1, 10:1, 11:1, or 12:1. In some cases, the ratio of the IL-10 conjugate to the antibody is about 1:1. In other cases, the ratio of the IL-10 conjugate to the antibody is about 2:1, 3:1, or 4:1. In additional cases, the ratio of the IL-10 conjugate to the antibody is about 6:1 or higher.

In some embodiments, the one or more IL-10 polypeptide-water-soluble polymer (e.g., PEG) conjugates are directly bound to the antibody or binding fragments thereof. In other instances, the IL-10 conjugate is indirectly bound to the antibody or binding fragments thereof with a linker. Exemplary linkers include homobifunctional linkers, heterobifunctional linkers, maleimide-based linkers, zero-trace linkers, self-immolative linkers, spacers, and the like.

In some embodiments, the antibody or binding fragments thereof is bound either directly or indirectly to the IL-10 polypeptide portion of the IL-10 polypeptide-water-soluble polymer (e.g., PEG) conjugate. In such cases, the conjugation site of the antibody to the IL-10 polypeptide is at a site that will not impede binding of the IL-10 polypeptide with the IL-10R. In additional cases, the conjugation site of the antibody to the IL-10 polypeptide is at a site that partially blocks binding of the IL-10 polypeptide with the IL-10R. In other embodiments, the antibody or binding fragments thereof is bound either directly or indirectly to the water-soluble polymer portion of the IL-10 polypeptide-water-soluble polymer (e.g., PEG) conjugate.

Peptides

In some embodiments, a conjugating moiety descried herein is a peptide. In some instances, the peptide is a non-structured peptide. In some cases, an IL-10 polypeptide is conjugated to a peptide. In some cases, the IL-10 conjugate comprising a peptide has an increased serum half-life, and/or stability. In some cases, the IL-10 conjugate comprising a peptide has a reduced IL-10 interaction with one or more IL-10R subunits. In additional cases, the peptide blocks IL-10 interaction with one or more IL-10R subunits.

In some instances, the conjugating moiety is a XTEN™ peptide (Amunix Operating Inc.) and the modification is referred to as XTENylation. XTENylation is the genetic fusion of a nucleic acid encoding a polypeptide of interest with a nucleic acid encoding a XTEN™ peptide (Amunix Operating Inc.), a long unstructured hydrophilic peptide comprising different percentage of six amino acids: Ala, Glu, Gly, Ser, and Thr. In some instances, a XTEN™ peptide is selected based on properties such as expression, genetic stability, solubility, aggregation resistance, enhanced half-life, increased potency, and/or increased in vitro activity in combination with a polypeptide of interest. In some cases, an IL-10 polypeptide is conjugated to a XTEN peptide.

In some instances, the conjugating moiety is a glycine-rich homoamino acid polymer (HAP) and the modification is referred to as HAPylation. HAPylation is the genetic fusion of a nucleic acid encoding a polypeptide of interest with a nucleic acid encoding a glycine-rich homoamino acid polymer (HAP). In some instances, the HAP polymer comprises a (Gly$_4$Ser)$_n$ repeat motif (SEQ ID NO: 3) and sometimes are about 50, 100, 150, 200, 250, 300, or more residues in length. In some cases, an IL-10 polypeptide is conjugated to HAP.

In some embodiments, the conjugating moiety is a PAS polypeptide and the modification is referred to as PASylation. PASylation is the genetic fusion of a nucleic acid encoding a polypeptide of interest with a nucleic acid encoding a PAS polypeptide. A PAS polypeptide is a hydrophilic uncharged polypeptide consisting of Pro, Ala and Ser residues. In some instances, the length of a PAS polypeptide is at least about 100, 200, 300, 400, 500, or 600 amino acids. In some cases, an IL-10 polypeptide is conjugated to a PAS polypeptide.

In some embodiments, the conjugating moiety is an elastin-like polypeptide (ELP) and the modification is referred to as ELPylation. ELPylation is the genetic fusion of a nucleic acid encoding a polypeptide of interest with a nucleic acid encoding an elastin-like polypeptide (ELPs). An ELP comprises a VPGxG repeat motif (SEQ ID NO: 4) in which x is any amino acid except proline. In some cases, an IL-10 polypeptide is conjugated to ELP.

In some embodiments, the conjugating moiety is a CTP peptide. A CTP peptide comprises a 31 amino acid residue peptide FQSSSS*KAPPPS*LPSPS*RLPGPS*DTPTLPQ (SEQ ID NO: 5) in which the S* denotes O-glycosylation sites (OPKO). In some instances, a CTP peptide is genetically fused to an IL-10 polypeptide). In some cases, an IL-10 polypeptide is conjugated to a CTP peptide.

In some embodiments, an IL-10 polypeptide is modified by glutamylation. Glutamylation (or polyglutamylation) is a reversible posttranslational modification of glutamate, in which the γ-carboxy group of glutamate forms a peptide-like bond with the amino group of a free glutamate in which the α-carboxy group extends into a polyglutamate chain.

In some embodiments, an IL-10 polypeptide is modified by a gelatin-like protein (GLK) polymer. In some instances, the GLK polymer comprises multiple repeats of Gly-Xaa-Yaa wherein Xaa and Yaa primarily comprise proline and 4-hydroxyproline, respectively. In some cases, the GLK polymer further comprises amino acid residues Pro, Gly, Glu, Gln, Asn, Ser, and Lys. In some cases, the length of the GLK polymer is about 20, 30, 40, 50, 60, 70, 80, 90, 100, 110, 120, 150 residues or longer.

Additional Conjugating Moieties

In some instances, the conjugating moiety comprises an extracellular biomarker. In some instances, the extracellular biomarker is a tumor antigen. In some instances, exemplary extracellular biomarker comprises CD19, PSMA, B7-H3, B7-H6, CD70, CEA, CSPG4, EGFRvIII, EphA3, EpCAM, EGFR, ErbB2 (HER2), FAP, FRa, GD2, GD3, Lewis-Y, mesothelin, Muc1, Muc 16, ROR1, TAG72, VEGFR2, CD11, Gr-1, CD204, CD16, CD49b, CD3, CD4, CD8, and B220. In some instances, the conjugating moiety is bond or conjugated to the IL-10. In some cases, the conjugating moiety is genetically fused, for example, at the N-terminus or the C-terminus, of the IL-10.

In some instances, the conjugating moiety comprises a molecule from a post-translational modification. In some instances, examples of post-translational modification include myristoylation, palmitoylation, isoprenylation (or prenylation) (e.g., farnesylation or geranylgeranylation), glypiation, acylation (e.g., O-acylation, N-acylation, S-acylation), alkylation (e.g., additional of alkyl groups such as methyl or ethyl groups), amidation, glycosylation, hydroxylation, iodination, nucleotide addition, oxidation, phosphorylation, succinylation, sulfation, glycation, carbamylation, glutamylation, or deamidation. In some instances, the IL-10 is modified by a post-translational modification such as myristoylation, palmitoylation, isoprenylation (or prenylation) (e.g., farnesylation or geranylgeranylation), glypiation, acylation (e.g., O-acylation, N-acylation, S-acylation), alkylation (e.g., additional of alkyl groups such as methyl or ethyl groups), amidation, glycosylation, hydroxylation, iodination, nucleotide addition, oxidation, phosphorylation, succinylation, sulfation, glycation, carbamylation, glutamylation, or deamidation.

Conjugation

Linkers

In some embodiments, useful functional reactive groups for conjugating or binding a conjugating moiety to an IL-10 polypeptide described herein include, for example, zero or higher-order linkers. In some instances, an unnatural amino acid incorporated into an interleukin described herein comprises a functional reactive group. In some instances, a linker comprises a functional reactive group that reacts with an unnatural amino acid incorporated into an interleukin described herein. In some instances, a conjugating moiety comprises a functional reactive group that reacts with an unnatural amino acid incorporated into an interleukin described herein. In some instances, a conjugating moiety comprises a functional reactive group that reacts with a linker (optionally pre-attached to a cytokine peptide) described herein. In some embodiments, a linker comprises a reactive group that reacts with a natural amino acid in an IL-10 polypeptide described herein. In some cases, higher-order linkers comprise bifunctional linkers, such as homo-bifunctional linkers or heterobifunctional linkers. Exemplary homobifuctional linkers include, but are not limited to, Lomant's reagent dithiobis (succinimidylpropionate) DSP, 3'3'-dithiobis(sulfosuccinimidyl proprionate) (DTSSP), disuccinimidyl suberate (DSS), bis(sulfosuccinimidyl)suberate (BS), disuccinimidyl tartrate (DST), disulfosuccinimidyl tartrate (sulfo DST), ethylene glycobis(succinimidylsuccinate) (EGS), disuccinimidyl glutarate (DSG), N,N'-disuccinimidyl carbonate (DSC), dimethyl adipimidate (DMA), dimethyl pimelimidate (DMP), dimethyl suberimidate (DMS), dimethyl-3,3'-dithiobispropionimidate (DTBP), 1,4-di-3'-(2'-pyridyldithio)propionamido)butane (DPDPB), bis-maleimidohexane (BMH), aryl halide-containing compound (DFDNB), such as e.g. 1,5-difluoro-2,4-dinitrobenzene or 1,3-difluoro-4,6-dinitrobenzene, 4,4'-difluoro-3,3'-dinitrophenylsulfone (DFDNPS), bis-[β-(4-azidosalicylamido) ethyl]disulfide (BASED), formaldehyde, glutaraldehyde, 1,4-butanediol diglycidyl ether, adipic acid dihydrazide, carbohydrazide, o-toluidine, 3,3'-dimethylbenzidine, benzidine, α,α'-p-diaminodiphenyl, diiodo-p-xylene sulfonic acid, N,N'-ethylene-bis(iodoacetamide), or N,N'-hexamethylene-bis(iodoacetamide).

In some embodiments, the bifunctional linker comprises a heterobifunctional linker. Exemplary heterobifunctional linker include, but are not limited to, amine-reactive and sulfhydryl cross-linkers such as N-succinimidyl 3-(2-pyridyldithio)propionate (sPDP), long-chain N-succinimidyl 3-(2-pyridyldithio)propionate (LC-sPDP), water-soluble-long-chain N-succinimidyl 3-(2-pyridyldithio) propionate (sulfo-LC-sPDP), succinimidyloxycarbonyl-α-methyl-α-(2-pyridyldithio)toluene (sMPT), sulfosuccinimidyl-6-[α-methyl-α-(2-pyridyldithio)toluamido]hexanoate (sulfo-LC-sMPT), succinimidyl-4-(N-maleimidomethyl)cyclohexane-1-carboxylate (sMCC), sulfosuccinimidyl-4-(N-maleimidomethyl)cyclohexane-1-carboxylate (sulfo-sMCC), m-maleimidobenzoyl-N-hydroxysuccinimide ester (MBs), m-maleimidobenzoyl-N-hydroxysulfosuccinimide ester (sulfo-MBs), N-succinimidyl(4-iodoacteyl)aminobenzoate (sIAB), sulfosuccinimidyl(4-iodoacteyl)aminobenzoate (sulfo-sIAB), succinimidyl-4-(p-maleimidophenyl)butyrate (sMPB), sulfosuccinimidyl-4-(p-maleimidophenyl)butyrate (sulfo-sMPB), N-(γ-maleimidobutyryloxy) succinimide ester (GMBs), N-(γ-maleimidobutyryloxy) sulfosuccinimide ester (sulfo-GMBs), succinimidyl 6-((iodoacetyl)amino)hexanoate (sIAX), succinimidyl 6-[6-(((iodoacetyl)amino)hexanoyl)amino]hexanoate (sIAXX), succinimidyl 4-(((iodoacetyl)amino)methyl)cyclohexane-1-carboxylate (sIAC), succinimidyl 6-((((4-iodoacetyl)amino) methyl)cyclohexane-1-carbonyl)amino) hexanoate (sI-ACX), p-nitrophenyl iodoacetate (NPIA), carbonyl-reactive and sulfhydryl-reactive cross-linkers such as 4-(4-N-maleimidophenyl)butyric acid hydrazide (MPBH), 4-(N-maleimidomethyl)cyclohexane-1-carboxyl-hydrazide-8 (M$_2$C$_2$H), 3-(2-pyridyldithio)propionyl hydrazide (PDPH), amine-reactive and photoreactive cross-linkers such as N-hydroxysuccinimidyl-4-azidosalicylic acid (NHs-AsA), N-hydroxysulfosuccinimidyl-4-azidosalicylic acid (sulfo-NHs-AsA), sulfosuccinimidyl-(4-azidosalicylamido)hexanoate (sulfo-NHs-LC-AsA), sulfosuccinimidyl-2-(ρ-azidosalicylamido) ethyl-1,3'-dithiopropionate (sAsD), N-hydroxysuccinimidyl-4-azidobenzoate (HsAB), N-hydroxysulfosuccinimidyl-4-azidobenzoate (sulfo-HsAB), N-succinimidyl-6-(4'-azido-2'-nitrophenylamino) hexanoate (sANPAH), sulfosuccinimidyl-6-(4'-azido-2'-nitrophenylamino)hexanoate (sulfo-sANPAH), N-5-azido-2-nitrobenzoyloxysuccinimide (ANB-NOs), sulfosuccinimidyl-2-(m-azido-o-nitrobenzamido)-ethyl-1,3'-dithiopropionate (sAND), N-succinimidyl-4(4-azidophenyl)1,3'-dithiopropionate (sADP), N-sulfosuccinimidyl(4-azidophenyl)-1,3'-dithiopropionate (sulfo-sADP), sulfosuccinimidyl 4-(ρ-azidophenyl)butyrate (sulfo-sAPB), sulfosuccinimidyl 2-(7-azido-4-methylcoumarin-3-acetamide)ethyl-1,3'-dithiopropionate (sAED), sulfosuccinimidyl 7-azido-4-methylcoumain-3-acetate (sulfo-sAMCA), ρ-nitrophenyl diazopyruvate (ρNPDP), ρ-nitrophenyl-2-diazo-3,3,3-trifluoropropionate (PNP-DTP), sulfhydryl-reactive and photoreactive cross-linkers such as 1-(ρ-Azidosalicylamido)-4-(iodoacetamido)butane (AsIB), N-[4-(ρ-azidosalicylamido)butyl]-3'-(2'-pyridyldithio)propionamide (APDP), benzophenone-4-iodoacetamide, benzophenone-4-maleimide carbonyl-reactive and photoreactive cross-linkers such as ρ-azidobenzoyl hydrazide (ABH), carboxylate-reactive and photoreactive cross-linkers such as 4-(ρ-azidosalicylamido)butylamine (AsBA), and arginine-reactive and photoreactive cross-linkers such as ρ-azidophenyl glyoxal (APG).

In some instances, the reactive functional group comprises a nucleophilic group that is reactive to an electrophilic group present on a binding moiety (e.g., on a conjugating moiety or on IL-10). Exemplary electrophilic groups include carbonyl groups—such as aldehyde, ketone, carboxylic acid, ester, amide, enone, acyl halide or acid anhydride. In some embodiments, the reactive functional group is aldehyde. Exemplary nucleophilic groups include hydrazide, oxime, amino, hydrazine, thiosemicarbazone, hydrazine carboxylate, and arylhydrazide. In some embodiments, an unnatural amino acid incorporated into an interleukin described herein comprises an electrophilic group.

In some embodiments, the linker is a cleavable linker. In some embodiments, the cleavable linker is a dipeptide linker. In some embodiments, the dipeptide linker is valine-citrulline (Val-Cit), phenylalanine-lysine (Phe-Lys), valine-alanine (Val-Ala) and valine-lysine (Val-Lys). In some embodiments, the dipeptide linker is valine-citrulline.

In some embodiments, the linker is a peptide linker comprising, e.g., at least 2, 3, 4, 5, 6, 7, 8, 9, 10, 11, 12, 15, 20, 25, 30, 35, 40, 45, 50, or more amino acids. In some instances, the peptide linker comprises at most 2, 3, 4, 5, 6, 7, 8, 9, 10, 11, 12, 15, 20, 25, 30, 35, 40, 45, 50, or less amino acids. In additional cases, the peptide linker comprises about 2, 3, 4, 5, 6, 7, 8, 9, 10, 11, 12, 15, 20, 25, 30, 35, 40, 45, or 50 amino acids.

In some embodiments, the linker comprises a self-immolative linker moiety. In some embodiments, the self-immolative linker moiety comprises p-aminobenzyl alcohol (PAB), p-aminobenzyoxycarbonyl (PABC), or derivatives or analogs thereof. In some embodiments, the linker comprises a dipeptide linker moiety and a self-immolative linker moiety. In some embodiments, the self-immolative linker moiety is such as described in U.S. Pat. No. 9,089,614 and WIPO Application No. WO2015038426.

In some embodiments, the cleavable linker is glucuronide. In some embodiments, the cleavable linker is an acid-cleavable linker. In some embodiments, the acid-cleavable linker is hydrazine. In some embodiments, the cleavable linker is a reducible linker.

In some embodiments, the linker comprises a maleimide group. In some instances, the maleimide group is also referred to as a maleimide spacer. In some instances, the maleimide group further comprises a caproic acid, forming maleimidocaproyl (mc). In some cases, the linker comprises maleimidocaproyl (mc). In some cases, linker is maleimidocaproyl (mc). In other instances, the maleimide group comprises a maleimidomethyl group, such as succinimidyl-4-(N-maleimidomethyl)cyclohexane-1-carboxylate (sMCC) or sulfosuccinimidyl-4-(N-maleimidomethyl)cyclohexane-1-carboxylate (sulfo-sMCC) described above.

In some embodiments, the maleimide group is a self-stabilizing maleimide. In some instances, the self-stabilizing maleimide utilizes diaminopropionic acid (DPR) to incorporate a basic amino group adjacent to the maleimide to provide intramolecular catalysis of thiosuccinimide ring hydrolysis, thereby eliminating maleimide from undergoing an elimination reaction through a retro-Michael reaction. In some instances, the self-stabilizing maleimide is a maleimide group described in Lyon, et al., "Self-hydrolyzing maleimides improve the stability and pharmacological properties of antibody-drug conjugates," *Nat. Biotechnol.* 32(10): 1059-1062 (2014). In some instances, the linker comprises a self-stabilizing maleimide. In some instances, the linker is a self-stabilizing maleimide.

Conjugation Chemistry

Various conjugation reactions are used to conjugate linkers, conjugation moieties, and unnatural amino acids incorporated into IL-10 polypeptides described herein. Such conjugation reactions are often compatible with aqueous conditions, such as "bioorthogonal" reactions. In some embodiments, conjugation reactions are mediated by chemical reagents such as catalysts, light, or reactive chemical groups found on linkers, conjugation moieties, or unnatural amino acids. In some embodiments, conjugation reactions are mediated by enzymes. In some embodiments, a conjugation reaction used herein is described in Gong, Y., Pan, L. Tett. Lett. 2015, 56, 2123. In some embodiments, a conjugation reaction used herein is described in Chen, X.; Wu. Y-W. Org. Biomol. Chem. 2016, 14, 5417.

In some embodiments described herein, a conjugation reaction comprises reaction of a ketone or aldehyde with a nucleophile. In some embodiments, a conjugation reaction comprises reaction of a ketone with an aminoxy group to form an oxime. In some embodiments, a conjugation reaction comprises reaction of a ketone with an aryl or heteroaryl amine group to form an imine. In some embodiments, a conjugation reaction comprises reaction of an aldehyde with an aryl or heteroaryl amine group to form an imine. In some embodiments, a conjugation reaction described herein results in an IL-10 polypeptide comprising a linker or conjugation moiety attached via an oxime. In some embodiments, a conjugation reaction comprises a Pictet-Spengler reaction of an aldehyde or ketone with a tryptamine nucleophile. In some embodiments, a conjugation reaction comprises a hydrazino-Pictet-Spengler reaction. In some embodiments, a conjugation reaction comprises a Pictet-Spengler ligation.

In some embodiments described herein, a conjugation reaction described herein comprises reaction of an azide and a phosphine (Staudinger ligation). In some embodiments, the phosphine is an aryl phosphine. In some embodiments, the aryl phosphine comprises an ortho ester group. In some embodiments, the phosphine comprises the structure methyl 2-(diphenylphosphaneyl)benzoate. In some embodiments, a conjugation reaction described herein results in IL-10 polypeptide comprising a linker or conjugation moiety attached via an arylamide. In some embodiments, a conjugation reaction described herein results in an IL-10 polypeptide comprising a linker or conjugation moiety attached via an amide.

In some embodiments described herein, a conjugation reaction described herein comprises a 1,3-dipolar cycloaddition reaction. In some embodiments, the 1,3-dipolar cycloaddition reaction comprises reaction of an azide and a phosphine ("Click" reaction). In some embodiments, the conjugation reaction is catalyzed by copper. In some embodiments, a conjugation reaction described herein results in an IL-10 polypeptide comprising a linker or conjugation moiety attached via a triazole. In some embodiments, a conjugation reaction described herein comprises reaction of an azide with a strained olefin. In some embodiments, a conjugation reaction described herein comprises reaction of an azide with a strained alkyne. In some embodiments, a conjugation reaction described herein comprises reaction of an azide with a cycloalkyne, for example, OCT, DIFO, DIFBO, DIBO, BARAC, TMTH, or other strained cycloalkyne, the structures of which are shown in Gong, Y., Pan, L. Tett. Lett. 2015, 56, 2123. In some embodiments, a 1,3-dipolar cycloaddition reaction is catalyzed by light ("photoclick"). In some embodiments, a conjugation reaction described herein comprises reaction of a terminal allyl group with a tetrazole and light. In some embodiments, a conjugation reaction described herein comprises reaction of a terminal alkynyl group with a tetrazole and light. In some embodiments, a conjugation reaction described herein comprises reaction of an O-allyl amino acid with a tetrazine and light. In some embodiments, a conjugation reaction described herein comprises reaction of O-allyl tyrosine with a tetrazine and light.

In some embodiments, a conjugation reaction described herein comprises reaction of an azide with a cycloalkyne, for example DBCO. In some embodiments described herein, a conjugation reaction described herein comprises:

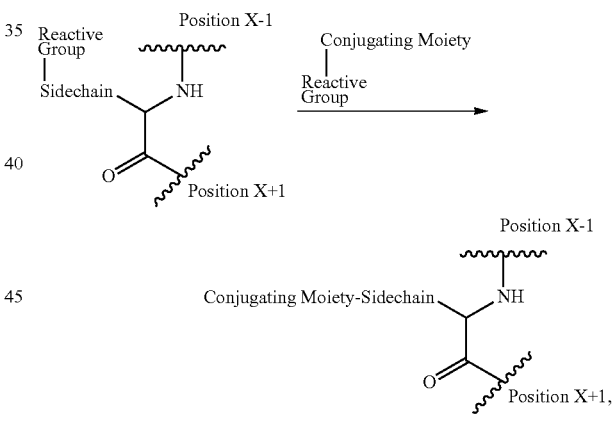

wherein X is the position in the IL-10 conjugate comprising an unnatural amino acid. In some embodiments, the conjugating moiety comprises water soluble polymer. In some embodiments, a reactive group comprises an alkyne or azide. In some embodiments described herein, a conjugation reaction described herein comprises:

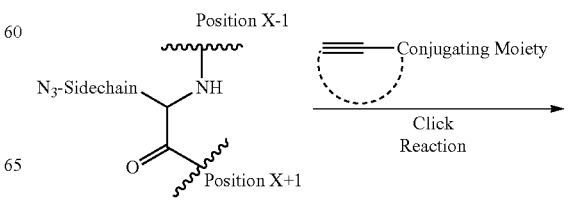

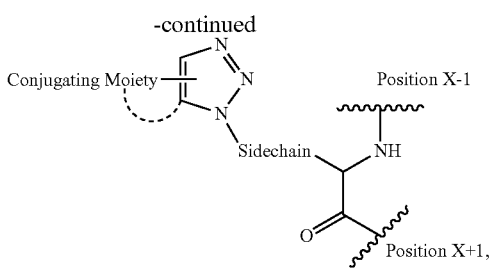

wherein X is the position in the IL-10 conjugate comprising an unnatural amino acid. In some embodiments described herein, a conjugation reaction described herein comprises:

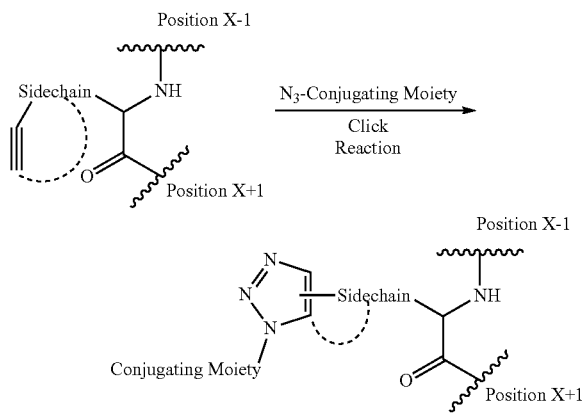

wherein X is the position in the IL-10 conjugate comprising an unnatural amino acid.

Conjugation reactions such as a click reaction described herein may generate a single regioisomer, or a mixture of regioisomers. In some instances the ratio of regioisomers is about 1:1. In some instances the ratio of regioisomers is about 2:1. In some instances the ratio of regioisomers is about 1.5:1. In some instances the ratio of regioisomers is about 1.2:1. In some instances the ratio of regioisomers is about 1.1:1. In some instances the ratio of regioisomers is greater than 1:1.

In some embodiments described herein, a conjugation reaction described herein comprises an inverse-electron demand cycloaddition reaction comprising a diene and a dienophile. In some embodiments, the diene comprises a tetrazine. In some embodiments, the dienophile comprises an alkene. In some embodiments, the dienophile comprises an alkyne. In some embodiments, the alkyne is a strained alkyne. In some embodiments, the alkene is a strained diene. In some embodiments, the alkyne is a trans-cyclooctyne. In some embodiments, the alkyne is a cyclooctene. In some embodiments, the alkene is a cyclopropene. In some embodiments, the alkene is a fluorocyclopropene. In some embodiments, a conjugation reaction described herein results in the formation of an IL-10 polypeptide attached to a linker or conjugation moiety via a 6-membered ring heterocycle comprising two nitrogen atoms in the ring.

In some embodiments described herein, a conjugation reaction described herein comprises an olefin metathesis reaction. In some embodiments, a conjugation reaction described herein comprises reaction of an alkene and an alkyne with a ruthenium catalyst. In some embodiments, a conjugation reaction described herein comprises reaction of two alkenes with a ruthenium catalyst. In some embodiments, a conjugation reaction described herein comprises reaction of two alkynes with a ruthenium catalyst. In some embodiments, a conjugation reaction described herein comprises reaction of an alkene or alkyne with a ruthenium catalyst and an amino acid comprising an allyl group. In some embodiments, a conjugation reaction described herein comprises reaction of an alkene or alkyne with a ruthenium catalyst and an amino acid comprising an allyl sulfide or selenide. In some embodiments, a ruthenium catalyst is Hoveda-Grubbs $2^{nd}$ generation catalyst. In some embodiments, an olefin metathesis reaction comprises reaction of one or more strained alkenes or alkynes.

In some embodiments described herein, a conjugation reaction described herein comprises a cross-coupling reaction. In some embodiments, cross-coupling reactions comprise transition metal catalysts, such as iridium, gold, ruthenium, rhodium, palladium, nickel, platinum, or other transition metal catalyst and one or more ligands. In some embodiments, transition metal catalysts are water-soluble. In some embodiments described herein, a conjugation reaction described herein comprises a Suzuki-Miyaura cross-coupling reaction. In some embodiments described herein, a conjugation reaction described herein comprises reaction of an aryl halide (or triflate, or tosylate), an aryl or alkenyl boronic acid, and a palladium catalyst. In some embodiments described herein, a conjugation reaction described herein comprises a Sonogashira cross-coupling reaction. In some embodiments described herein, a conjugation reaction described herein comprises reaction of an aryl halide (or triflate, or tosylate), an alkyne, and a palladium catalyst. In some embodiments, cross-coupling reactions result in attachment of a linker or conjugating moiety to an IL-10 polypeptide via a carbon-carbon bond.

In some embodiments described herein, a conjugation reaction described herein comprises a deprotection or "uncaging" reaction of a reactive group prior to conjugation. In some embodiments, a conjugation reaction described herein comprises uncaging of a reactive group with light, followed by a conjugation reaction. In some embodiments, a reactive group is protected with an aralkyl moiety comprising one or more nitro groups. In some embodiments, uncaging of a reactive group results in a free amine, sulfide, or other reactive group. In some embodiments, a conjugation reaction described herein comprises uncaging of a reactive group with a transition metal catalyst, followed by a conjugation reaction. In some embodiments, the transition metal catalyst comprises palladium and one or more ligands. In some embodiments, a reactive group is protected with an allyl moiety. In some embodiments, a reactive group is protected with an allylic carbamate. In some embodiments, a reactive group is protected with a propargylic moiety. In some embodiments, a reactive group is protected with a propargyl carbamate. In some embodiments, a reactive group is protected with a dienophile, wherein exposure to a diene (such as a tetrazine) results in deprotection of the reactive group.

In some embodiments described herein, a conjugation reaction described herein comprises a ligand-directed reaction, wherein a ligand (optionally) attached to a reactive group) facilitates the site of conjugation between the reactive group and the IL-10 polypeptide. In some embodiments, the ligand is cleaved during or after reaction of the IL-10 polypeptide with the reactive group. In some embodiments, the conjugation site of the IL-10 polypeptide is a natural amino acid. In some embodiments, the conjugation site of the IL-10 polypeptide is a lysine, cysteine, or serine. In some embodiments, the conjugation site of the IL-10 polypeptide is an unnatural amino acid described herein. In some embodiments the reactive group comprises a leaving group, such as an electron-poor aryl or heteroaryl group. In some embodiments the reactive group comprises a leaving group, such as an electron-poor alkyl group that is displaced by the IL-10 polypeptide. In some embodiments, a conjugation reaction described herein comprises reaction of a radical trapping agent with a radical species. In some embodiments, a conjugation reaction described herein comprises an oxidative radical addition reaction. In some embodiments, a radical trapping agent is an arylamine. In some embodiments, a radical species is a tyrosyl radical. In some embodiments, radical species are generated by a ruthenium catalyst (such as [Ru(bpy)$_3$]) and light.

Enzymatic reactions are optionally used for conjugation reactions described herein. Exemplary enzymatic conjugations include SortA-mediated conjugation, a TGs-mediated conjugation, or an FGE-mediated conjugation. In some embodiments, a conjugation reaction described herein comprises native protein ligation (NPL) of a terminal 1-amino-2-thio group with a thioester to form an amide bond.

Various conjugation reactions are described herein for reacting a linker or conjugating moiety with an IL-10 polypeptide, wherein the reaction occurs with a natural ("canonical") amino acid in the IL-10 polypeptide. In some embodiments, the natural amino acid is found at a conjugation position is found in a wild type sequence, or alternatively the position has been mutated. In some embodiments, a conjugation reaction comprises formation of a disulfide bond at an IL-10 residue. In some embodiments, a conjugation reaction comprises a 1,4 Michael addition reaction of a cysteine or lysine. In some embodiments, a conjugation reaction comprises a cyanobenzothiazole ligation of an IL-10. In some embodiments, a conjugation reaction comprises crosslinking with an acetone moiety, such as 1,3-dichloro-2-propionone. In some embodiments, a conjugation reaction comprises a 1,4 Michael addition to a dehydroalanine, formed by reaction of cysteine with O-mesitylenesulfonylhydroxylamine. In some embodiments a conjugation reaction comprises reaction of a tyrosine with a triazolinedione (TAD), or TAD derivative. In some embodiments a conjugation reaction comprises reaction of a tryptophan with a rhodium carbenoid.

Methods of Use
Proliferative Diseases or Conditions

In some embodiments, described herein is a method of treating a proliferative disease or condition in a subject in need thereof, which comprises administering to the subject a therapeutically effective amount of an IL-10 conjugate described herein. In some embodiments, the proliferative disease or condition is a cancer. In some cases, the cancer is a solid tumor. Exemplary solid tumors include, but are not limited to, bladder cancer, bone cancer, brain cancer, breast cancer, colorectal cancer, esophageal cancer, eye cancer, head and neck cancer, kidney cancer, lung cancer, melanoma, ovarian cancer, pancreatic cancer, or prostate cancer. In some cases, the solid tumor is a metastatic cancer. In some cases, the solid tumor is a relapsed or refractory cancer from a prior treatment.

In some instances, an IL-10 conjugate described herein is administered to a subject in need thereof, for treating a solid tumor. In such cases, the subject has a bladder cancer, a bone cancer, a brain cancer, a breast cancer, a colorectal cancer, an esophageal cancer, an eye cancer, a head and neck cancer, a kidney cancer (or renal cell carcinoma), a lung cancer, a melanoma, an ovarian cancer, a pancreatic cancer, or a prostate cancer. In some cases, the IL-10 conjugate is administered to a subject for the treatment of a bladder cancer. In some cases, the IL-10 conjugate is administered to a subject for the treatment of a breast cancer. In some cases, the IL-10 conjugate is administered to a subject for the treatment of a colorectal cancer. In some cases, the IL-10 conjugate is administered to a subject for the treatment of an esophageal cancer. In some cases, the IL-10 conjugate is administered to a subject for the treatment of a head and neck cancer. In some cases, the IL-10 conjugate is administered to a subject for the treatment of a kidney cancer (or renal cell carcinoma or RCC). In some cases, the IL-10 conjugate is administered to a subject for the treatment of a lung cancer. In some cases, the IL-10 conjugate is administered to a subject for the treatment of a melanoma. In some cases, the IL-10 conjugate is administered to a subject for the treatment of an ovarian cancer. In some cases, the IL-10 conjugate is administered to a subject for the treatment of a pancreatic cancer. In some cases, the IL-10 conjugate is administered to a subject for the treatment of a prostate cancer. In some instances, the cancer is a metastatic cancer. In other instances, the cancer is a relapsed cancer. In additional cases, the cancer is a refractory cancer.

In some embodiments, the cancer is a treatment-naïve cancer. In such cases, the treatment-naïve cancer is a cancer that has not been treated by a therapy. In some cases, the treatment-naïve cancer is a solid tumor, such as bladder cancer, a bone cancer, a brain cancer, a breast cancer, a colorectal cancer, an esophageal cancer, an eye cancer, a head and neck cancer, a kidney cancer (or RCC), a lung cancer, a melanoma, an ovarian cancer, a pancreatic cancer, or a prostate cancer. In some embodiments, described herein is a method of treating a treatment-naïve solid tumor in a subject in need thereof which comprises administering to the subject an IL-10 conjugate described herein.

In some embodiments, the cancer is a hematologic malignancy. In some instances, an IL-10 conjugate described herein is administered to a subject in need thereof, for treating a hematologic malignancy. In some instances, the hematologic malignancy comprises a leukemia, a lymphoma, or a myeloma. In some cases, the hematologic malignancy is a T-cell malignancy. In other cases, the hematological malignancy is a B-cell malignancy. In some instances, the hematologic malignancy is a metastatic hematologic malignancy. In other instances, the hematologic malignancy is a relapsed hematologic malignancy. In additional cases, the hematologic malignancy is a refractory hematologic malignancy. In some cases, the subject has a T-cell malignancy. In some cases, the subject has a B-cell malignancy. In some cases, the subject has chronic lymphocytic leukemia (CLL), small lymphocytic lymphoma (SLL), follicular lymphoma (FL), diffuse large B-cell lymphoma (DLBCL), mantle cell lymphoma (MCL), Waldenstrom's macroglobulinemia, multiple myeloma, extranodal marginal zone B cell lymphoma, nodal marginal zone B cell lymphoma, Burkitt's lymphoma, non-Burkitt high grade B cell lymphoma, primary mediastinal B-cell lymphoma (PMBL), immunoblastic large cell lymphoma, precursor B-lymphoblastic lymphoma, B cell prolymphocytic leukemia, lymphoplasmacytic lymphoma, splenic marginal zone lymphoma, plasma cell myeloma, plasmacytoma, mediastinal (thymic) large B cell lymphoma, intravascular large B cell lymphoma, primary effusion lymphoma, or lymphomatoid granulomatosis. In some cases, the IL-10 conjugate is administered to a subject for the treatment of CLL. In some cases, the IL-10 conjugate is administered to a subject for the treatment of SLL. In some cases, the IL-10 conjugate is administered to a subject for the treatment of FL. In some cases, the IL-10 conjugate is administered to a subject for the treatment of DLBCL. In some cases, the IL-10 conjugate is administered to a subject for the treatment of MCL. In some cases, the IL-10 conjugate is administered to a subject for the treatment of Waldenstrom's macroglobulinemia. In some cases, the IL-10 conjugate is administered to a subject for the treatment of multiple myeloma. In some cases, the IL-10 conjugate is administered to a subject for the treatment of Burkitt's lymphoma.

Additional Therapeutic Agents

In some embodiments, an additional therapeutic agent is further administered to the subject. In some cases, the additional therapeutic agent is administered simultaneously with an IL-10 conjugate and/or is co-formulated. In other cases, the additional therapeutic agent and the IL-10 conjugate are administered sequentially, e.g., the IL-10 conjugate is administered prior to the additional therapeutic agent or that the IL-10 conjugate is administered after administration of the additional therapeutic agent.

In some cases, the additional therapeutic agent comprises a chemotherapeutic agent, an immunotherapeutic agent, a targeted therapy, radiation therapy, or a combination thereof. Illustrative additional therapeutic agents include, but are not limited to, alkylating agents such as altretamine, busulfan, carboplatin, carmustine, chlorambucil, cisplatin, cyclophosphamide, dacarbazine, lomustine, melphalan, oxalaplatin, temozolomide, or thiotepa; antimetabolites such as 5-fluorouracil (5-FU), 6-mercaptopurine (6-MP), capecitabine, cytarabine, floxuridine, fludarabine, gemcitabine, hydroxyurea, methotrexate, or pemetrexed; anthracyclines such as daunorubicin, doxorubicin, epirubicin, or idarubicin; topoisomerase I inhibitors such as topotecan or irinotecan (CPT-11); topoisomerase II inhibitors such as etoposide (VP-16), teniposide, or mitoxantrone; mitotic inhibitors such as docetaxel, estramustine, ixabepilone, paclitaxel, vinblastine, vincristine, or vinorelbine; or corticosteroids such as prednisone, methylprednisolone, or dexamethasone.

In some cases, the additional therapeutic agent comprises a first-line therapy. As used herein, "first-line therapy" comprises a primary treatment for a subject with a cancer. In some instances, the cancer is a primary or local cancer. In other instances, the cancer is a metastatic or recurrent cancer. In some cases, the first-line therapy comprises chemotherapy. In other cases, the first-line treatment comprises immunotherapy, targeted therapy, or radiation therapy. A skilled artisan would readily understand that different first-line treatments may be applicable to different type of cancers.

In some cases, an IL-10 conjugate is administered with an additional therapeutic agent selected from an alkylating agent such as altretamine, busulfan, carboplatin, carmustine, chlorambucil, cisplatin, cyclophosphamide, dacarbazine, lomustine, melphalan, oxalaplatin, temozolomide, or thiotepa; an antimetabolite such as 5-fluorouracil (5-FU), 6-mercaptopurine (6-MP), capecitabine, cytarabine, floxuridine, fludarabine, gemcitabine, hydroxyurea, methotrexate, or pemetrexed; an anthracycline such as daunorubicin, doxorubicin, epirubicin, or idarubicin; a topoisomerase I inhibitor such as topotecan or irinotecan (CPT-11); a topoisomerase II inhibitor such as etoposide (VP-16), teniposide, or mitoxantrone; a mitotic inhibitor such as docetaxel, estramustine, ixabepilone, paclitaxel, vinblastine, vincristine, or vinorelbine; or a corticosteroid such as prednisone, methylprednisolone, or dexamethasone.

In some instances, an IL-10 conjugate described herein is administered with an inhibitor of the enzyme poly ADP ribose polymerase (PARP). Exemplary PARP inhibitors include, but are not limited to, olaparib (AZD-2281, Lynparza®, from Astra Zeneca), rucaparib (PF-01367338, Rubraca®, from Clovis Oncology), niraparib (MK-4827, Zejula®, from Tesaro), talazoparib (BMN-673, from BioMarin Pharmaceutical Inc.), veliparib (ABT-888, from AbbVie), CK-102 (formerly CEP 9722, from Teva Pharmaceutical Industries Ltd.), E7016 (from Eisai), iniparib (BSI 201, from Sanofi), and pamiparib (BGB-290, from BeiGene). In some cases, the IL-10 conjugate is administered in combination with a PARP inhibitor such as olaparib, rucaparib, niraparib, talazoparib, veliparib, CK-102, E7016, iniparib, or pamiparib.

In some embodiments, an IL-10 conjugate described herein is administered with a tyrosine kinase inhibitor (TKI). Exemplary TKIs include, but are not limited to, afatinib, alectinib, axitinib, bosutinib, cabozantinib, ceritinib, cobimetinib, crizotinib, dabrafenib, dasatinib, erlotinib, gefitinib, ibrutinib, imatinib, lapatinib, lenvatinib, nilotinib, nintedanib, osimertinib, pazopanib, ponatinib, regorafenib, ruxolitinib, sorafenib, sunitinib, tofacitinib, and vandetanib.

In some instances, an IL-10 conjugate described herein is administered with an immune checkpoint inhibitor. Exemplary checkpoint inhibitors include:

PD-L1 inhibitors such as durvalumab (Imfinzi) from AstraZeneca, atezolizumab (MPDL3280A) from Genentech, avelumab from EMD Serono/Pfizer, CX-072 from CytomX Therapeutics, FAZ053 from Novartis Pharmaceuticals, KN035 from 3D Medicine/Alphamab, LY3300054 from Eli Lilly, or M7824 (anti-PD-L1/TGFbeta trap) from EMD Serono;

PD-L2 inhibitors such as GlaxoSmithKline's AMP-224 (Amplimmune), and rHIgM12B7;

PD-1 inhibitors such as nivolumab (Opdivo) from Bristol-Myers Squibb, pembrolizumab (Keytruda) from Merck, AGEN 2034 from Agenus, BGB-A317 from BeiGene, B1-754091 from Boehringer-Ingelheim Pharmaceuticals, CBT-501 (genolimzumab) from CBT Pharmaceuticals, INCSHR1210 from Incyte, JNJ-63723283 from Janssen Research & Development, MEDI0680 from MedImmune, MGA 012 from MacroGenics, PDR001 from Novartis Pharmaceuticals, PF-06801591 from Pfizer, REGN2810 (SAR439684) from Regeneron Pharmaceuticals/Sanofi, or TSR-042 from TESARO;

CTLA-4 inhibitors such as ipilimumab (also known as Yervoy®, MDX-010, BMS-734016 and MDX-101) from Bristol Meyers Squibb, tremelimumab (CP-675,206, ticilimumab) from Pfizer, or AGEN 1884 from Agenus;

LAG3 inhibitors such as BMS-986016 from Bristol-Myers Squibb, IMP701 from Novartis Pharmaceuticals, LAG525 from Novartis Pharmaceuticals, or REGN3767 from Regeneron Pharmaceuticals;

B7-H3 inhibitors such as enoblituzumab (MGA271) from MacroGenics;

KIR inhibitors such as Lirilumab (IPH2101; BMS-986015) from Innate Pharma;

CD137 inhibitors such as urelumab (BMS-663513, Bristol-Myers Squibb), PF-05082566 (anti-4-1BB, PF-2566, Pfizer), or XmAb-5592 (Xencor);

PS inhibitors such as Bavituximab;

and inhibitors such as an antibody or fragments (e.g., a monoclonal antibody, a human, humanized, or chimeric antibody) thereof, RNAi molecules, or small molecules to TIM3, CD52, CD30, CD20, CD33, CD27, OX40, GITR, ICOS, BTLA (CD272), CD160, 2B4, LAIR1, TIGHT, LIGHT, DR3, CD226, CD2, or SLAM.

In some instances, the IL-10 conjugate is administered in combination with pembrolizumab, nivolumab, tremelimumab, or ipilimumab.

In some instances, an IL-10 conjugate described herein is administered with an antibody such as alemtuzumab, trastuzumab, ibritumomab tiuxetan, brentuximab vedotin, ado-trastuzumab emtansine, or blinatumomab.

In some instances, an IL-10 conjugate is administered with an additional therapeutic agent selected from an additional cytokine. In some instances, the additional cytokine enhances and/or synergizes T effector cell expansion and/or proliferation. In some cases, the additional cytokine comprises IL-1β, IL-2, IL-6, IL-7, IL-12, IL-15, IL-18, IL-21, or TNFα. In some cases, the additional cytokine is IL-7. In some cases, the additional cytokine is IL-15. In some cases, the additional cytokine is IL-21. In some cases, the additional cytokine is TNFα.

In some instances, an IL-10 conjugate is administered with an additional therapeutic agent selected from a receptor agonist. In some instances, the receptor agonist comprises a Toll-like receptor (TLR) ligand. In some cases, the TLR ligand comprises TLR1, TLR2, TLR3, TLR4, TLR5, TLR6, TLR7, TLR8, or TLR9. In some cases, the TLR ligand comprises a synthetic ligand such as, for example, Pam3Cys, CFA, MALP2, Pam2Cys, FSL-1, Hib-OMPC, Poly I:C, poly A:U, AGP, MPL A, RC-529, MDF2β, CFA, or Flagellin. In some cases, the IL-10 conjugate is administered with one or more TLR agonists selected from TLR1, TLR2, TLR3, TLR4, TLR5, TLR6, TLR7, TLR8, and TLR9. In some cases, the IL-10 conjugate is administered with one or more TLR agonists selected from Pam3Cys, CFA, MALP2, Pam2Cys, FSL-1, Hib-OMPC, Poly I:C, poly A:U, AGP, MPL A, RC-529, MDF2β, CFA, and Flagellin.

In some embodiments, an IL-10 conjugate is used in conjunction with an adoptive T cell transfer (ACT) therapy. In one embodiment, ACT involves identification of autologous T lymphocytes in a subject with, e.g., anti-tumor activity, expansion of the autologous T lymphocytes in vitro, and subsequent reinfusion of the expanded T lymphocytes into the subject. In another embodiment, ACT comprises use of allogeneic T lymphocytes with, e.g., anti-tumor activity, expansion of the T lymphocytes in vitro, and subsequent infusion of the expanded allogeneic T lymphocytes into a subject in need thereof. In some instances, an IL-10 conjugate described herein is used in conjunction with an autologous T lymphocytes as part of an ACT therapy. In other instances, an IL-10 conjugate described herein is used in conjunction with an allogeneic T lymphocytes as part of an ACT therapy. In some cases, the IL-10 conjugate is administered simultaneously with the ACT therapy to a subject in need thereof. In other cases, the IL-10 conjugate is administered sequentially with the ACT therapy to a subject in need thereof.

In some embodiments, an IL-10 conjugate is used for an ex vivo activation and/or expansion of an autologous and/or allogenic T cell transfer. In such cases, the IL-10 conjugate is used to activate and/or expand a sample comprising autologous and/or allogenic T cells and the IL-10 conjugate is optionally removed from the sample prior to administering the sample to a subject in need thereof.

In some embodiments, an IL-10 conjugate is administered with a vaccine. In some instances, an IL-10 conjugate is utilized in combination with an oncolytic virus. In such cases, the IL-10 conjugate acts as a stimulatory agent to modulate the immune response. In some instances, the IL-10 conjugate is used with an oncolytic virus as part of an adjuvant therapy. Exemplary oncolytic viruses include T-Vec (Amgen), G47Δ (Todo et al.), JX-594 (Sillajen), CG0070 (Cold Genesys), and Reolysin (Oncolytics Biotech). In some cases, the IL-10 conjugate is used in combination with an oncolytic virus such as T-Vec, G47Δ, JX-594, CG0070, or Reolysin.

In some embodiments, an IL-10 conjugate is administered in combination with a radiation therapy.

IL-10 Polypeptide Production

In some instances, the IL-10 polypeptides described herein, either containing a natural amino acid mutation or an unnatural amino acid mutation, are generated recombinantly or are synthesized chemically. In some instances, the IL-10 polypeptides described herein are generated recombinantly, for example, either by a host cell system, or in a cell-free system.

In some instances, the IL-10 polypeptides are generated recombinantly through a host cell system. In some cases, the host cell is a eukaryotic cell (e.g., mammalian cell, insect cells, yeast cells or plant cell), a prokaryotic cell (e.g., gram-positive bacterium or a gram-negative bacterium), or an archaeal cell. In some cases, a eukaryotic host cell is a mammalian host cell. In some cases, a mammalian host cell is a stable cell line, or a cell line that has incorporated a genetic material of interest into its own genome and has the capability to express the product of the genetic material after many generations of cell division. In other cases, a mammalian host cell is a transient cell line, or a cell line that has not incorporated a genetic material of interest into its own genome and does not have the capability to express the product of the genetic material after many generations of cell division.

Exemplary mammalian host cells include 293T cell line, 293A cell line, 293FT cell line, 293F cells, 293 H cells, A549 cells, MDCK cells, CHO DG44 cells, CHO-S cells, CHO-K1 cells, Expi293F™ cells, Flp-In™ T-REx™ 293 cell line, Flp-In™-293 cell line, Flp-In™-3T3 cell line, Flp-In™-BHK cell line, Flp-In™-CHO cell line, Flp-In™-CV-1 cell line, Flp-In™-Jurkat cell line, FreeStyle™ 293-F cells, FreeStyle™ CHO-S cells, GripTite™ 293 MSR cell line, GS-CHO cell line, HepaRG™ cells, T-REx™ Jurkat cell line, Per.C6 cells, T-REx™-293 cell line, T-REx™-CHO cell line, and T-REx™-HeLa cell line.

In some embodiments, a eukaryotic host cell is an insect host cell. Exemplary insect host cell include *Drosophila* S2 cells, Sf9 cells, Sf21 cells, High Five™ cells, and expresSF+® cells.

In some embodiments, a eukaryotic host cell is a yeast host cell. Exemplary yeast host cells include *Pichia pastoris* yeast strains such as GS 115, KM71H, SMD1168, SMD1168H, and X-33, and *Saccharomyces cerevisiae* yeast strain such as INVSc1.

In some embodiments, a eukaryotic host cell is a plant host cell. In some instances, the plant cells comprise a cell from algae. Exemplary plant cell lines include strains from *Chlamydomonas reinhardtii* 137c, or *Synechococcus elongatus* PPC 7942.

In some embodiments, a host cell is a prokaryotic host cell. Exemplary prokaryotic host cells include BL21, Mach1™, DH10B™, TOP10, DH5α, DH10Bac™, OmniMax™, MegaX™, DH12S™, INV110, TOP10F', INVαF, TOP10/P3, ccdB Survival, PIR1, PIR2, Stbl2™, Stbl3™, or Stbl4™.

In some instances, suitable polynucleic acid molecules or vectors for the production of an IL-10 polypeptide described herein include any suitable vectors derived from either a eukaryotic or prokaryotic source. Exemplary polynucleic acid molecules or vectors include vectors from bacteria (e.g., *E. coli*), insects, yeast (e.g., *Pichia pastoris*), algae, or mammalian source. Bacterial vectors include, for example, pACYC177, pASK75, pBAD vector series, pBADM vector series, pET vector series, pETM vector series, pGEX vector series, pHAT, pHAT2, pMal-c2, pMal-p2, pQE vector series, pRSET A, pRSET B, pRSET C, pTrcHis2 series, pZA31-Luc, pZE21-MCS-1, pFLAG ATS, pFLAG CTS, pFLAG MAC, pFLAG Shift-12c, pTAC-MAT-1, pFLAG CTC, or pTAC-MAT-2.

Insect vectors include, for example, pFastBac1, pFastBac DUAL, pFastBac ET, pFastBac HTa, pFastBac HTb, pFastBac HTc, pFastBac M30a, pFastBact M30b, pFastBac, M30c, pVL1392, pVL1393, pVL1393 M10, pVL1393 M11, pVL1393 M12, FLAG vectors such as pPolh-FLAG1 or pPolh-MAT 2, or MAT vectors such as pPolh-MAT1, or pPolh-MAT2.

Yeast vectors include, for example, Gateway® pDEST™ 14 vector, Gateway® pDEST™ 15 vector, Gateway® pDEST™ 17 vector, Gateway® pDEST™ 24 vector, Gateway® pYES-DEST52 vector, pBAD-DEST49 Gateway® destination vector, pAO815 *Pichia* vector, pFLD1 *Pichi pastoris* vector, pGAPZA, B, & C *Pichia pastoris* vector, pPIC3.5K *Pichia* vector, pPIC6 A, B, & C *Pichia* vector, pPIC9K *Pichia* vector, pTEF1/Zeo, pYES2 yeast vector, pYES2/CT yeast vector, pYES2/NT A, B, & C yeast vector, or pYES3/CT yeast vector.

Algae vectors include, for example, pChlamy-4 vector or MCS vector.

Mammalian vectors include, for example, transient expression vectors or stable expression vectors. Exemplary mammalian transient expression vectors include p3×FLAG-CMV 8, pFLAG-Myc-CMV 19, pFLAG-Myc-CMV 23, pFLAG-CMV 2, pFLAG-CMV 6a,b,c, pFLAG-CMV 5.1, pFLAG-CMV 5a,b,c, p3×FLAG-CMV 7.1, pFLAG-CMV 20, p3×FLAG-Myc-CMV 24, pCMV-FLAG-MAT1, pCMV-FLAG-MAT2, pBICEP-CMV 3, or pBICEP-CMV 4. Exemplary mammalian stable expression vectors include pFLAG-CMV 3, p3×FLAG-CMV 9, p3×FLAG-CMV 13, pFLAG-Myc-CMV 21, p3×FLAG-Myc-CMV 25, pFLAG-CMV 4, p3×FLAG-CMV 10, p3×FLAG-CMV 14, pFLAG-Myc-CMV 22, p3×FLAG-Myc-CMV 26, pBICEP-CMV 1, or pBICEP-CMV 2.

In some embodiments, a cell-free system is used for the production of an IL-10 polypeptide described herein. In some cases, a cell-free system comprises a mixture of cytoplasmic and/or nuclear components from a cell (e.g., composed of fully purified recombinant components or partially purified components) and is suitable for in vitro nucleic acid synthesis. In some instances, a cell-free system utilizes prokaryotic cell components. In other instances, a cell-free system utilizes eukaryotic cell components. Nucleic acid synthesis is obtained in a cell-free system based on, for example, *Drosophila* cell, *Xenopus* egg, Archaea, or HeLa cells. Exemplary cell-free systems include *E. coli* S30 Extract system, *E. coli* T7 S30 system, or PURExpress®, XpressCF, and XpressCF+.

Cell-free translation systems variously comprise components such as plasmids, mRNA, DNA, tRNAs, synthetases, release factors, ribosomes, chaperone proteins, translation initiation and elongation factors, natural and/or unnatural amino acids, and/or other components used for protein expression. Such components are optionally modified to improve yields, increase synthesis rate, increase protein product fidelity, or incorporate unnatural amino acids. In some embodiments, cytokines described herein are synthesized using cell-free translation systems described in U.S. Pat. No. 8,778,631; US 2017/0283469; US 2018/0051065; US 2014/0315245; or U.S. Pat. No. 8,778,631. In some embodiments, cell-free translation systems comprise modified release factors, or even removal of one or more release factors from the system. In some embodiments, cell-free translation systems comprise a reduced protease concentration. In some embodiments, cell-free translation systems comprise modified tRNAs with re-assigned codons used to code for unnatural amino acids. In some embodiments, the synthetases described herein for the incorporation of unnatural amino acids are used in cell-free translation systems. In some embodiments, tRNAs are pre-loaded with unnatural amino acids using enzymatic or chemical methods before being added to a cell-free translation system. In some embodiments, components for a cell-free translation system are obtained from modified organisms, such as modified bacteria, yeast, or other organism.

In some embodiments, an IL-10 polypeptide is generated as a circularly permuted form, either via an expression host system or through a cell-free system.

Production of IL-10 Polypeptide Comprising an Unnatural Amino Acid

An orthogonal or expanded genetic code can be used in the present disclosure, in which one or more specific codons present in the nucleic acid sequence of an IL-10 polypeptide are allocated to encode the unnatural amino acid so that it can be genetically incorporated into the IL-10 by using an orthogonal tRNA synthetase/tRNA pair. The orthogonal tRNA synthetase/tRNA pair is capable of charging a tRNA with an unnatural amino acid and is capable of incorporating that unnatural amino acid into the polypeptide chain in response to the codon.

In some instances, the codon is the codon amber, ochre, opal or a quadruplet codon. In some cases, the codon corresponds to the orthogonal tRNA which will be used to carry the unnatural amino acid. In some cases, the codon is amber. In other cases, the codon is an orthogonal codon.

In some instances, the codon is a quadruplet codon, which can be decoded by an orthogonal ribosome ribo-Q1. In some cases, the quadruplet codon is as illustrated in Neumann, et al., "Encoding multiple unnatural amino acids via evolution of a quadruplet-decoding ribosome," *Nature,* 464(7287): 441-444 (2010).

In some instances, a codon used in the present disclosure is a recoded codon, e.g., a synonymous codon or a rare codon that is replaced with alternative codon. In some cases, the recoded codon is as described in Napolitano, et al., "Emergent rules for codon choice elucidated by editing rare arginine codons in *Escherichia coli*," *PNAS,* 113(38): E5588-5597 (2016). In some cases, the recoded codon is as described in Ostrov et al., "Design, synthesis, and testing toward a 57-codon genome," *Science* 353(6301): 819-822 (2016).

In some instances, unnatural nucleic acids are utilized leading to incorporation of one or more unnatural amino acids into the IL-10. Exemplary unnatural nucleic acids include, but are not limited to, uracil-5-yl, hypoxanthin-9-yl (I), 2-aminoadenin-9-yl, 5-methylcytosine (5-me-C), 5-hydroxymethyl cytosine, xanthine, hypoxanthine, 2-aminoadenine, 6-methyl and other alkyl derivatives of adenine and guanine, 2-propyl and other alkyl derivatives of adenine and guanine, 2-thiouracil, 2-thiothymine and 2-thiocytosine, 5-halouracil and cytosine, 5-propynyl uracil and cytosine, 6-azo uracil, cytosine and thymine, 5-uracil (pseudouracil), 4-thiouracil, 8-halo, 8-amino, 8-thiol, 8-thioalkyl, 8-hydroxyl and other 8-substituted adenines and guanines, 5-halo particularly 5-bromo, 5-trifluoromethyl and other 5-substituted uracils and cytosines, 7-methylguanine and 7-methyladenine, 8-azaguanine and 8-azaadenine, 7-deazaguanine and 7-deazaadenine and 3-deazaguanine and 3-deazaadenine. Certain unnatural nucleic acids, such as 5-substituted pyrimidines, 6-azapyrimidines and N-2 substituted purines, N-6 substituted purines, O-6 substituted purines, 2-aminopropyladenine, 5-propynyluracil, 5-propynylcytosine, 5-methylcytosine, those that increase the stability of duplex formation, universal nucleic acids, hydrophobic nucleic acids, promiscuous nucleic acids, size-expanded nucleic acids, fluorinated nucleic acids, 5-substituted pyrimidines, 6-azapyrimidines and N-2, N-6 and 0-6 substituted purines, including 2-aminopropyladenine, 5-propynyluracil and 5-propynylcytosine. 5-methylcytosine (5-me-C), 5-hydroxymethyl cytosine, xanthine, hypoxanthine, 2-aminoadenine, 6-methyl, other alkyl derivatives of adenine and guanine, 2-propyl and other alkyl derivatives of adenine and guanine, 2-thiouracil, 2-thiothymine and 2-thiocytosine, 5-halouracil, 5-halocytosine, 5-propynyl (—C≡C—CH$_3$) uracil, 5-propynyl cytosine, other alkynyl derivatives of pyrimidine nucleic acids, 6-azo uracil, 6-azo cytosine, 6-azo thymine, 5-uracil (pseudouracil), 4-thiouracil, 8-halo, 8-amino, 8-thiol, 8-thioalkyl, 8-hydroxyl and other 8-substituted adenines and guanines, 5-halo particularly 5-bromo, 5-trifluoromethyl, other 5-substituted uracils and cytosines, 7-methylguanine, 7-methyladenine, 2-ε-adenine, 2-aminoadenine, 8-azaguanine, 8-azaadenine, 7-deazaguanine, 7-deazaadenine, 3-deazaguanine, 3-deazaadenine, tricyclic pyrimidines, phenoxazine cytidine([5,4-b][1,4]benzoxazin-2(3H)-one), phenothiazine cytidine (1H-pyrimido[5,4-b][1,4]benzothiazin-2(3H)-one), G-clamps, phenoxazine cytidine (e.g. 9-(2-aminoethoxy)-H-pyrimido[5,4-b][1,4]benzoxazin-2(3H)-one), carbazole cytidine (2H-pyrimido[4,5-b]indol-2-one), pyridoindole cytidine (H-pyrido[3',2':4,5]pyrrolo[2,3-d]pyrimidin-2-one), those in which the purine or pyrimidine base is replaced with other heterocycles, 7-deaza-adenine, 7-deazaguanosine, 2-aminopyridine, 2-pyridone, azacytosine, 5-bromocytosine, bromouracil, 5-chlorocytosine, chlorinated cytosine, cyclocytosine, cytosine arabinoside, 5-fluorocytosine, fluoropyrimidine, fluorouracil, 5,6-dihydrocytosine, 5-iodocytosine, hydroxyurea, iodouracil, 5-nitrocytosine, 5-bromouracil, 5-chlorouracil, 5-fluorouracil, and 5-iodouracil, 2-amino-adenine, 6-thioguanine, 2-thio-thymine, 4-thio-thymine, 5-propynyl-uracil, 4-thio-uracil, N4-ethylcytosine, 7-deazaguanine, 7-deaza-8-azaguanine, 5-hydroxycytosine, 2'-deoxyuridine, 2-amino-2'-deoxyadenosine, and those described in U.S. Pat. Nos. 3,687,808; 4,845,205; 4,910,300; 4,948,882; 5,093,232; 5,130,302; 5,134,066; 5,175,273; 5,367,066; 5,432,272; 5,457,187; 5,459,255; 5,484,908; 5,502,177; 5,525,711; 5,552,540; 5,587,469; 5,594,121; 5,596,091; 5,614,617; 5,645,985; 5,681,941; 5,750,692; 5,763,588; 5,830,653 and 6,005,096; WO 99/62923; Kandimalla et al., (2001) Bioorg. Med. Chem. 9:807-813; The Concise Encyclopedia of Polymer Science and Engineering, Kroschwitz, J. I., Ed., John Wiley & Sons, 1990, 858-859; Englisch et al., Angewandte Chemie, International Edition, 1991, 30, 613; and Sanghvi, Chapter 15, Antisense Research and Applications, Crooke and Lebleu Eds., CRC Press, 1993, 273-288. Additional base modifications can be found, for example, in U.S. Pat. No. 3,687,808; Englisch et al., Angewandte Chemie, International Edition, 1991, 30, 613; and Sanghvi, Chapter 15, Antisense Research and Applications, pages 289-302, Crooke and Lebleu ed., CRC Press, 1993.

Unnatural nucleic acids comprising various heterocyclic bases and various sugar moieties (and sugar analogs) are available in the art, and the nucleic acids in some cases include one or several heterocyclic bases other than the principal five base components of naturally-occurring nucleic acids. For example, the heterocyclic base includes, in some cases, uracil-5-yl, cytosin-5-yl, adenin-7-yl, adenin-8-yl, guanin-7-yl, guanin-8-yl, 4-aminopyrrolo [2.3-d]pyrimidin-5-yl, 2-amino-4-oxopyrolo [2, 3-d] pyrimidin-5-yl, 2-amino-4-oxopyrrolo [2.3-d]pyrimidin-3-yl groups, where the purines are attached to the sugar moiety of the nucleic acid via the 9-position, the pyrimidines via the 1-position, the pyrrolopyrimidines via the 7-position and the pyrazolopyrimidines via the 1-position.

In some embodiments, nucleotide analogs are also modified at the phosphate moiety. Modified phosphate moieties include, but are not limited to, those with modification at the linkage between two nucleotides and contains, for example, a phosphorothioate, chiral phosphorothioate, phosphorodithioate, phosphotriester, aminoalkylphosphotriester, methyl and other alkyl phosphonates including 3'-alkylene phosphonate and chiral phosphonates, phosphinates, phosphoramidates including 3'-amino phosphoramidate and aminoalkylphosphoramidates, thionophosphoramidates, thionoalkylphosphonates, thionoalkylphosphotriesters, and boranophosphates. It is understood that these phosphate or modified phosphate linkage between two nucleotides are through a 3'-5' linkage or a 2'-5' linkage, and the linkage contains inverted polarity such as 3'-5' to 5'-3' or 2'-5' to 5'-2'. Various salts, mixed salts and free acid forms are also included. Numerous United States patents teach how to make and use nucleotides containing modified phosphates and include but are not limited to, U.S. Pat. Nos. 3,687,808; 4,469,863; 4,476,301; 5,023,243; 5,177,196; 5,188,897; 5,264,423; 5,276,019; 5,278,302; 5,286,717; 5,321,131; 5,399,676; 5,405,939; 5,453,496; 5,455,233; 5,466,677; 5,476,925; 5,519,126; 5,536,821; 5,541,306; 5,550,111; 5,563,253; 5,571,799; 5,587,361; and 5,625,050.

In some embodiments, unnatural nucleic acids include 2',3'-dideoxy-2',3'-didehydro-nucleosides (PCT/US2002/006460), 5'-substituted DNA and RNA derivatives (PCT/US2011/033961; Saha et al., J. Org Chem., 1995, 60, 788-789; Wang et al., Bioorganic & Medicinal Chemistry Letters, 1999, 9, 885-890; and Mikhailov et al., Nucleosides & Nucleotides, 1991, 10(1-3), 339-343; Leonid et al., 1995, 14(3-5), 901-905; and Eppacher et al., Helvetica Chimica Acta, 2004, 87, 3004-3020; PCT/JP2000/004720; PCT/JP2003/002342; PCT/JP2004/013216; PCT/JP2005/020435; PCT/JP2006/315479; PCT/JP2006/324484; PCT/JP2009/056718; PCT/JP2010/067560), or 5'-substituted monomers made as the monophosphate with modified bases (Wang et al., Nucleosides Nucleotides & Nucleic Acids, 2004, 23 (1 & 2), 317-337).

In some embodiments, unnatural nucleic acids include modifications at the 5'-position and the 2'-position of the sugar ring (PCT/US94/02993), such as 5'-CH$_2$-substituted 2'-O-protected nucleosides (Wu et al., Helvetica Chimica Acta, 2000, 83, 1127-1143 and Wu et al., Bioconjugate Chem. 1999, 10, 921-924). In some cases, unnatural nucleic acids include amide linked nucleoside dimers have been prepared for incorporation into oligonucleotides wherein the 3' linked nucleoside in the dimer (5' to 3') comprises a 2'-OCH$_3$ and a 5'-(S)—CH$_3$ (Mesmaeker et al., Synlett, 1997, 1287-1290). Unnatural nucleic acids can include 2'-substituted 5'-CH$_2$ (or O) modified nucleosides (PCT/US92/01020). Unnatural nucleic acids can include 5'-methylenephosphonate DNA and RNA monomers, and dimers (Bohringer et al., Tet. Lett., 1993, 34, 2723-2726; Collingwood et al., Synlett, 1995, 7, 703-705; and Hutter et al., Helvetica Chimica Acta, 2002, 85, 2777-2806). Unnatural nucleic acids can include 5'-phosphonate monomers having a 2'-substitution (US2006/0074035) and other modified 5'-phosphonate monomers (WO1997/35869). Unnatural nucleic acids can include 5'-modified methylenephosphonate monomers (EP614907 and EP629633). Unnatural nucleic acids can include analogs of 5' or 6'-phosphonate ribonucleosides comprising a hydroxyl group at the 5' and/or 6'-position (Chen et al., Phosphorus, Sulfur and Silicon, 2002, 777, 1783-1786; Jung et al., Bioorg. Med. Chem., 2000, 8, 2501-2509; Gallier et al., Eur. J. Org. Chem., 2007, 925-933; and Hampton et al., J. Med. Chem., 1976, 19(8), 1029-1033). Unnatural nucleic acids can include 5'-phosphonate deoxyribonucleoside monomers and dimers having a 5'-phosphate group (Nawrot et al., Oligonucleotides, 2006, 16(1), 68-82). Unnatural nucleic acids can include nucleosides having a 6'-phosphonate group wherein the 5' or/and 6'-position is unsubstituted or substituted with a thio-tert-butyl group ($SC(CH_3)_3$) (and analogs thereof); a methyleneamino group ($CH_2NH_2$) (and analogs thereof) or a cyano group (CN) (and analogs thereof) (Fairhurst et al., Synlett, 2001, 4, 467-472; Kappler et al., J. Med. Chem., 1986, 29, 1030-1038; Kappler et al., J. Med. Chem., 1982, 25, 1179-1184; Vrudhula et al., J. Med. Chem., 1987, 30, 888-894; Hampton et al., J. Med. Chem., 1976, 19, 1371-1377; Geze et al., J. Am. Chem. Soc, 1983, 105(26), 7638-7640; and Hampton et al., J. Am. Chem. Soc, 1973, 95(13), 4404-4414).

In some embodiments, unnatural nucleic acids also include modifications of the sugar moiety. In some cases, nucleic acids contain one or more nucleosides wherein the sugar group has been modified. Such sugar modified nucleosides may impart enhanced nuclease stability, increased binding affinity, or some other beneficial biological property. In certain embodiments, nucleic acids comprise a chemically modified ribofuranose ring moiety. Examples of chemically modified ribofuranose rings include, without limitation, addition of substituent groups (including 5' and/or 2' substituent groups; bridging of two ring atoms to form bicyclic nucleic acids (BNA); replacement of the ribosyl ring oxygen atom with S, N(R), or $C(R_1)(R_2)$ (R=H, $C_1$-$C_{12}$ alkyl or a protecting group); and combinations thereof. Examples of chemically modified sugars can be found in WO2008/101157, US2005/0130923, and WO2007/134181.

In some instances, a modified nucleic acid comprises modified sugars or sugar analogs. Thus, in addition to ribose and deoxyribose, the sugar moiety can be pentose, deoxypentose, hexose, deoxyhexose, glucose, arabinose, xylose, lyxose, or a sugar "analog" cyclopentyl group. The sugar can be in a pyranosyl or furanosyl form. The sugar moiety may be the furanoside of ribose, deoxyribose, arabinose or 2'-O-alkylribose, and the sugar can be attached to the respective heterocyclic bases either in [alpha] or [beta] anomeric configuration. Sugar modifications include, but are not limited to, 2'-alkoxy-RNA analogs, 2'-amino-RNA analogs, 2'-fluoro-DNA, and 2'-alkoxy- or amino-RNA/DNA chimeras. For example, a sugar modification may include 2'-O-methyl-uridine or 2'-O-methyl-cytidine. Sugar modifications include 2'-O-alkyl-substituted deoxyribonucleosides and 2'-O-ethyleneglycol like ribonucleosides. The preparation of these sugars or sugar analogs and the respective "nucleosides" wherein such sugars or analogs are attached to a heterocyclic base (nucleic acid base) is known. Sugar modifications may also be made and combined with other modifications.

Modifications to the sugar moiety include natural modifications of the ribose and deoxy ribose as well as unnatural modifications. Sugar modifications include, but are not limited to, the following modifications at the 2' position. OH; F; O-, S-, or N-alkyl; O-, S-, or N-alkenyl; O-, S- or N-alkynyl; or O-alkyl-O-alkyl, wherein the alkyl, alkenyl and alkynyl may be substituted or unsubstituted $C_1$ to $C_{10}$ alkyl or $C_2$ to $C_{10}$ alkenyl and alkynyl. 2' sugar modifications also include but are not limited to —O[$(CH_2)_nO]_m$ $CH_3$, —O$(CH_2)_n$O$CH_3$, —O$(CH_2)_n$N$H_2$, —O$(CH_2)_n$C$H_3$, —O$(CH_2)_n$O$NH_2$, and —O$(CH_2)_n$ON[$(CH_2)_n$ $CH_3)]_2$, where n and m are from 1 to about 10.

Other modifications at the 2' position include but are not limited to: $C_1$ to $C_{10}$ lower alkyl, substituted lower alkyl, alkaryl, aralkyl, O-alkaryl, O-aralkyl, SH, $SCH_3$, OCN, Cl, Br, CN, $CF_3$, $OCF_3$, $SOCH_3$, $SO_2$ $CH_3$, $ONO_2$, $NO_2$, $N_3$, $NH_2$, heterocycloalkyl, heterocycloalkaryl, aminoalkylamino, polyalkylamino, substituted silyl, an RNA cleaving group, a reporter group, an intercalator, a group for improving the pharmacokinetic properties of an oligonucleotide, or a group for improving the pharmacodynamic properties of an oligonucleotide, and other substituents having similar properties. Similar modifications may also be made at other positions on the sugar, particularly the 3' position of the sugar on the 3' terminal nucleotide or in 2'-5' linked oligonucleotides and the 5' position of the 5' terminal nucleotide. Modified sugars also include those that contain modifications at the bridging ring oxygen, such as $CH_2$ and S. Nucleotide sugar analogs may also have sugar mimetics such as cyclobutyl moieties in place of the pentofuranosyl sugar. There are numerous United States patents that teach the preparation of such modified sugar structures and which detail and describe a range of base modifications, such as U.S. Pat. Nos. 4,981,957; 5,118,800; 5,319,080; 5,359,044; 5,393,878; 5,446,137; 5,466,786; 5,514,785; 5,519,134; 5,567,811; 5,576,427; 5,591,722; 5,597,909; 5,610,300; 5,627,053; 5,639,873; 5,646,265; 5,658,873; 5,670,633; 4,845,205; 5,130,302; 5,134,066; 5,175,273; 5,367,066; 5,432,272; 5,457,187; 5,459,255; 5,484,908; 5,502,177; 5,525,711; 5,552,540; 5,587,469; 5,594,121; 5,596,091; 5,614,617; 5,681,941; and 5,700,920, each of which is herein incorporated by reference in its entirety.

Examples of nucleic acids having modified sugar moieties include, without limitation, nucleic acids comprising 5'-vinyl, 5'-methyl (R or S), 4'-S, 2'-F, 2'-$OCH_3$, and 2'-O$(CH_2)_2$O$CH_3$ substituent groups. The substituent at the 2' position can also be selected from allyl, amino, azido, thio, O-allyl, O—($C_1$-$C_{10}$ alkyl), $OCF_3$, O$(CH_2)_2SCH_3$, O$(CH_2)_2$—O—N($R_m$)($R_n$), and O—$CH_2$—C(=O)—N($R_m$) ($R_n$), where each $R_m$ and $R_n$ is, independently, H or substituted or unsubstituted $C_1$-$C_{10}$ alkyl.

In certain embodiments, nucleic acids described herein include one or more bicyclic nucleic acids. In certain such embodiments, the bicyclic nucleic acid comprises a bridge between the 4' and the 2' ribosyl ring atoms. In certain embodiments, nucleic acids provided herein include one or more bicyclic nucleic acids wherein the bridge comprises a 4' to 2' bicyclic nucleic acid. Examples of such 4' to 2' bicyclic nucleic acids include, but are not limited to, one of the formulae: 4'-($CH_2$)—O-2' (LNA); 4'-($CH_2$)—S-2'; 4'-($CH_2$)$_2$—O-2' (ENA); 4'-CH($CH_3$)—O-2' and 4'-CH ($CH_2OCH_3$)—O-2', and analogs thereof (see, U.S. Pat. No. 7,399,845); 4'-C($CH_3$)($CH_3$)—O-2' and analogs thereof, (see WO2009/006478, WO2008/150729, US2004/0171570, U.S. Pat. No. 7,427,672, Chattopadhyaya et al., J. Org. Chem., 209, 74, 118-134, and WO2008/154401). Also see, for example: Singh et al., Chem. Commun., 1998, 4, 455-456; Koshkin et al., Tetrahedron, 1998, 54, 3607-3630; Wahlestedt et al., Proc. Natl. Acad. Sci. U.S.A., 2000, 97, 5633-5638; Kumar et al., Bioorg. Med. Chem. Lett., 1998, 8, 2219-2222; Singh et al., J. Org. Chem., 1998, 63, 10035-10039; Srivastava et al., J. Am. Chem. Soc., 2007, 129(26) 8362-8379; Elayadi et al., Curr. Opinion Invens. Drugs, 2001, 2, 558-561; Braasch et al., Chem. Biol, 2001, 8, 1-7; Oram et al., Curr. Opinion Mol. Ther., 2001, 3, 239-243; U.S. Pat. Nos. 4,849,513; 5,015,733; 5,118,800; 5,118,802; 7,053,207; 6,268,490; 6,770,748; 6,794,499; 7,034,133; 6,525,191; 6,670,461; and 7,399,845; International Publication Nos. WO2004/106356, WO1994/14226, WO2005/021570, WO2007/090071, and WO2007/134181; U.S. Patent Publication Nos. US2004/0171570, US2007/0287831, and US2008/0039618; U.S. Provisional Application Nos. 60/989,574, 61/026,995, 61/026,998, 61/056,564, 61/086,231, 61/097,787, and 61/099,844; and International Applications Nos. PCT/US2008/064591, PCT US2008/066154, PCT US2008/068922, and PCT/DK98/00393.

In certain embodiments, nucleic acids comprise linked nucleic acids. Nucleic acids can be linked together using any inter nucleic acid linkage. The two main classes of inter nucleic acid linking groups are defined by the presence or absence of a phosphorus atom. Representative phosphorus containing inter nucleic acid linkages include, but are not limited to, phosphodiesters, phosphotriesters, methylphosphonates, phosphoramidate, and phosphorothioates (P=S). Representative non-phosphorus containing inter nucleic acid linking groups include, but are not limited to, methylenemethylimino (—$CH_2$—$N(CH_3)$—O—$CH_2$—), thiodiester (—O—C(O)—S—), thionocarbamate (—O—C(O)(NH)—S—); siloxane (—O—$Si(H)_2$—O—); and N,N*-dimethylhydrazine (—$CH_2$—$N(CH_3)$—$N(CH_3)$). In certain embodiments, inter nucleic acids linkages having a chiral atom can be prepared as a racemic mixture, as separate enantiomers, e.g., alkylphosphonates and phosphorothioates. Unnatural nucleic acids can contain a single modification. Unnatural nucleic acids can contain multiple modifications within one of the moieties or between different moieties.

Backbone phosphate modifications to nucleic acid include, but are not limited to, methyl phosphonate, phosphorothioate, phosphoramidate (bridging or non-bridging), phosphotriester, phosphorodithioate, phosphodithionate, and boranophosphate, and may be used in any combination. Other non-phosphate linkages may also be used.

In some embodiments, backbone modifications (e.g., methylphosphonate, phosphorothioate, phosphoroamidate and phosphorodithioate internucleotide linkages) can confer immunomodulatory activity on the modified nucleic acid and/or enhance their stability in vivo.

In some instances, a phosphorous derivative (or modified phosphate group) is attached to the sugar or sugar analog moiety in and can be a monophosphate, diphosphate, triphosphate, alkylphosphonate, phosphorothioate, phosphorodithioate, phosphoramidate or the like. Exemplary polynucleotides containing modified phosphate linkages or non-phosphate linkages can be found in Peyrottes et al., 1996, Nucleic Acids Res. 24: 1841-1848; Chaturvedi et al., 1996, Nucleic Acids Res. 24:2318-2323; and Schultz et al., (1996) Nucleic Acids Res. 24:2966-2973; Matteucci, 1997, "Oligonucleotide Analogs: an Overview" in Oligonucleotides as Therapeutic Agents, (Chadwick and Cardew, ed.) John Wiley and Sons, New York, NY; Zon, 1993, "Oligonucleoside Phosphorothioates" in Protocols for Oligonucleotides and Analogs, Synthesis and Properties, Humana Press, pp. 165-190; Miller et al., 1971, JACS 93:6657-6665; Jager et al., 1988, Biochem. 27:7247-7246; Nelson et al., 1997, JOC 62:7278-7287; U.S. Pat. No. 5,453,496; and Micklefield, 2001, Curr. Med. Chem. 8: 1157-1179.

In some cases, backbone modification comprises replacing the phosphodiester linkage with an alternative moiety such as an anionic, neutral or cationic group. Examples of such modifications include: anionic internucleoside linkage; N3' to P5' phosphoramidate modification; boranophosphate DNA; prooligonucleotides; neutral internucleoside linkages such as methylphosphonates; amide linked DNA; methylene (methylimino) linkages; formacetal and thioformacetal linkages; backbones containing sulfonyl groups; morpholino oligos; peptide nucleic acids (PNA); and positively charged deoxyribonucleic guanidine (DNG) oligos (Micklefield, 2001, Current Medicinal Chemistry 8: 1157-1179). A modified nucleic acid may comprise a chimeric or mixed backbone comprising one or more modifications, e.g. a combination of phosphate linkages such as a combination of phosphodiester and phosphorothioate linkages.

Substitutes for the phosphate include, for example, short chain alkyl or cycloalkyl internucleoside linkages, mixed heteroatom and alkyl or cycloalkyl internucleoside linkages, or one or more short chain heteroatomic or heterocyclic internucleoside linkages. These include those having morpholino linkages (formed in part from the sugar portion of a nucleoside); siloxane backbones; sulfide, sulfoxide and sulfone backbones; formacetyl and thioformacetyl backbones; methylene formacetyl and thioformacetyl backbones; alkene containing backbones; sulfamate backbones; methyleneimino and methylenehydrazino backbones; sulfonate and sulfonamide backbones; amide backbones; and others having mixed N, O, S and $CH_2$ component parts. Numerous United States patents disclose how to make and use these types of phosphate replacements and include but are not limited to U.S. Pat. Nos. 5,034,506; 5,166,315; 5,185,444; 5,214,134; 5,216,141; 5,235,033; 5,264,562; 5,264,564; 5,405,938; 5,434,257; 5,466,677; 5,470,967; 5,489,677; 5,541,307; 5,561,225; 5,596,086; 5,602,240; 5,610,289; 5,602,240; 5,608,046; 5,610,289; 5,618,704; 5,623,070; 5,663,312; 5,633,360; 5,677,437; and 5,677,439. It is also understood in a nucleotide substitute that both the sugar and the phosphate moieties of the nucleotide can be replaced, by for example an amide type linkage (aminoethylglycine) (PNA). U.S. Pat. Nos. 5,539,082; 5,714,331; and 5,719,262 teach how to make and use PNA molecules, each of which is herein incorporated by reference. See also Nielsen et al., Science, 1991, 254, 1497-1500. It is also possible to link other types of molecules (conjugates) to nucleotides or nucleotide analogs to enhance for example, cellular uptake. Conjugates can be chemically linked to the nucleotide or nucleotide analogs. Such conjugates include but are not limited to lipid moieties such as a cholesterol moiety (Letsinger et al., Proc. Natl. Acad. Sci. USA, 1989, 86, 6553-6556), cholic acid (Manoharan et al., Bioorg. Med. Chem. Let., 1994, 4, 1053-1060), a thioether, e.g., hexyl-S-tritylthiol (Manoharan et al., Ann. KY. Acad. Sci., 1992, 660, 306-309; Manoharan et al., Bioorg. Med. Chem. Let., 1993, 3, 2765-2770), a thiocholesterol (Oberhauser et al., Nucl. Acids Res., 1992, 20, 533-538), an aliphatic chain, e.g., dodecandiol or undecyl residues (Saison-Behmoaras et al., EM5OJ, 1991, 10, 1111-1118; Kabanov et al., FEBS Lett., 1990, 259, 327-330; Svinarchuk et al., Biochimie, 1993, 75, 49-54), a phospholipid, e.g., di-hexadecyl-rac-glycerol or triethylammonium 1-di-O-hexadecyl-rac-glycero-S—H-phosphonate (Manoharan et al., Tetrahedron Lett., 1995, 36, 3651-3654; Shea et al., Nucl. Acids Res., 1990, 18, 3777-3783), a polyamine or a polyethylene glycol chain (Manoharan et al., Nucleosides & Nucleotides, 1995, 14, 969-973), or adamantane acetic acid (Manoharan et al., Tetrahedron Lett., 1995, 36, 3651-3654), a palmityl moiety (Mishra et al., Biochem. Biophys. Acta, 1995, 1264, 229-237), or an octadecylamine or hexylamino-carbonyl-oxycholesterol moiety (Crooke et al., J. Pharmacol. Exp. Ther., 1996, 277, 923-937). Numerous United States patents teach the preparation of such conjugates and include, but are not limited to U.S. Pat. Nos. 4,828,979; 4,948,882; 5,218,105; 5,525,465; 5,541,313; 5,545,730; 5,552,538; 5,578,717, 5,580,731; 5,580,731; 5,591,584; 5,109,124; 5,118,802; 5,138,045; 5,414,077; 5,486,603; 5,512,439; 5,578,718; 5,608,046; 4,587,044; 4,605,735; 4,667,025; 4,762,779; 4,789,737; 4,824,941; 4,835,263; 4,876,335; 4,904,582; 4,958,013; 5,082,830; 5,112,963; 5,214,136; 5,082,830; 5,112,963; 5,214,136; 5,245,022; 5,254,469; 5,258,506; 5,262,536; 5,272,250; 5,292,873; 5,317,098; 5,371,241, 5,391,723; 5,416,203, 5,451,463; 5,510,475; 5,512,667; 5,514,785; 5,565,552; 5,567,810; 5,574,142; 5,585,481; 5,587,371; 5,595,726; 5,597,696; 5,599,923; 5,599,928 and 5,688,941.

In some cases, the unnatural nucleic acids further form unnatural base pairs. Exemplary unnatural nucleotides capable of forming an unnatural DNA or RNA base pair (UBP) under conditions in vivo includes, but is not limited to, 5SICS, d5SICS, NAM, dNaM, and combinations thereof. In some embodiments, unnatural nucleotides include:

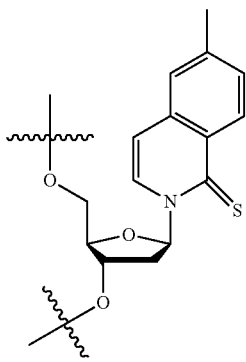

d5SICS

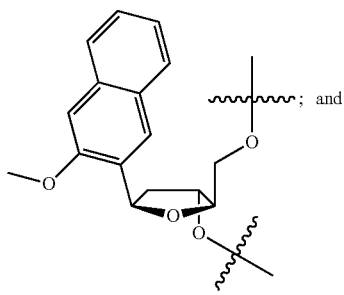

dNAM; and

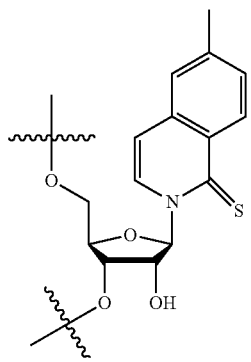

5SICS

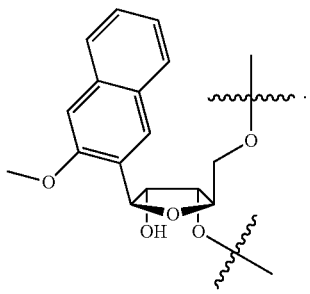

NAM

In some cases, the unnatural nucleic acids further form unnatural base pairs. Exemplary unnatural nucleotides capable of forming an unnatural DNA or RNA base pair (UBP) under conditions in vivo includes, but is not limited to, TPT3, dTPT3, 5SICS, d5SICS, NaM, dNaM, CNMO, dCNMO, and combinations thereof. Other examples of unnatural nucleotides capable of forming unnatural UBPs that may be used to prepare the IL-10 conjugates disclosed herein may be found in Dien et al., J Am Chem Soc., 2018, 140:16115-16123; Feldman et al., J Am Chem Soc, 2017, 139:11427-11433; Ledbetter et al., J Am Chem Soc., 2018, 140:758-765; Dhami et al., Nucleic Acids Res. 2014, 42:10235-10244; Malyshev et al., Nature, 2014, 509:385-388; Betz et al., J Am Chem Soc., 2013, 135:18637-18643; Lavergne et al., J Am Chem Soc. 2013, 135:5408-5419; and Malyshev et al. Proc Natl Acad Sci USA, 2012, 109:12005-12010.

In some embodiments, the unnatural nucleotides that may be used to prepare the IL-10 conjugates disclosed herein may be derived from a compound of the formula

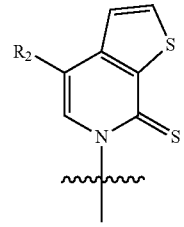

wherein $R_2$ is selected from the group consisting of hydrogen, alkyl, alkenyl, alkynyl, methoxy, methanethiol, methaneseleno, halogen, cyano, and azido; and the wavy line indicates a bond to a ribosyl or 2'-deoxyribosyl, wherein the 5'-hydroxy group of the ribosyl or 2'-deoxyribosyl moiety is in free form, or is optionally bonded to a monophosphate, a diphosphate, or a triphosphate group.

In some embodiments, the unnatural nucleotides that may be used to prepare the IL-10 conjugates disclosed herein may be derived from and

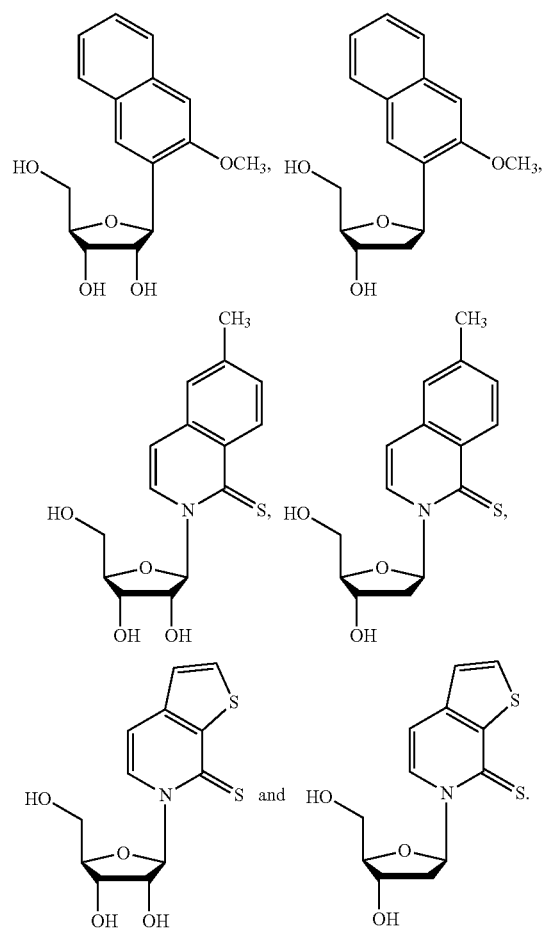

In some embodiments, the unnatural nucleotides that may be used to prepare the IL-10 conjugates disclosed herein include

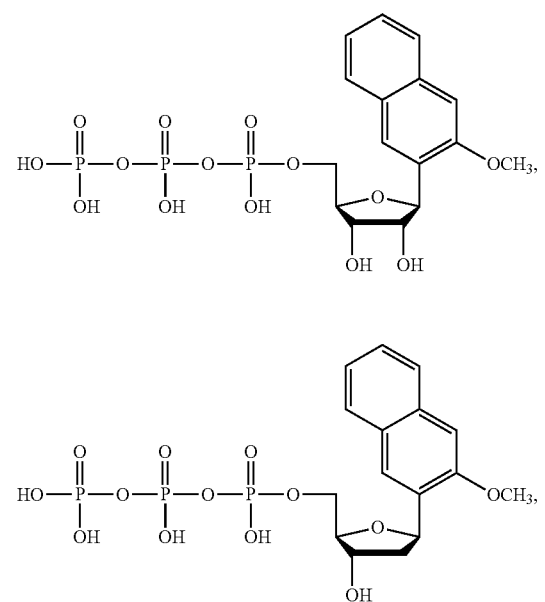

-continued 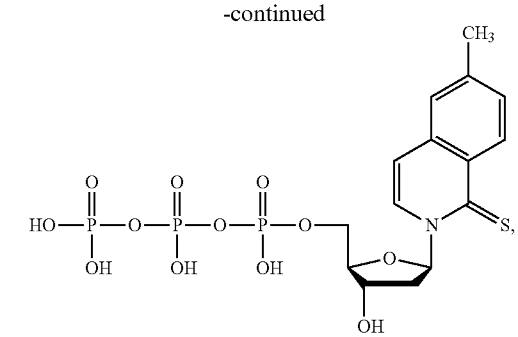 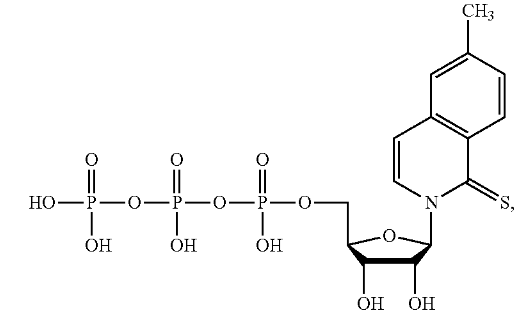 and

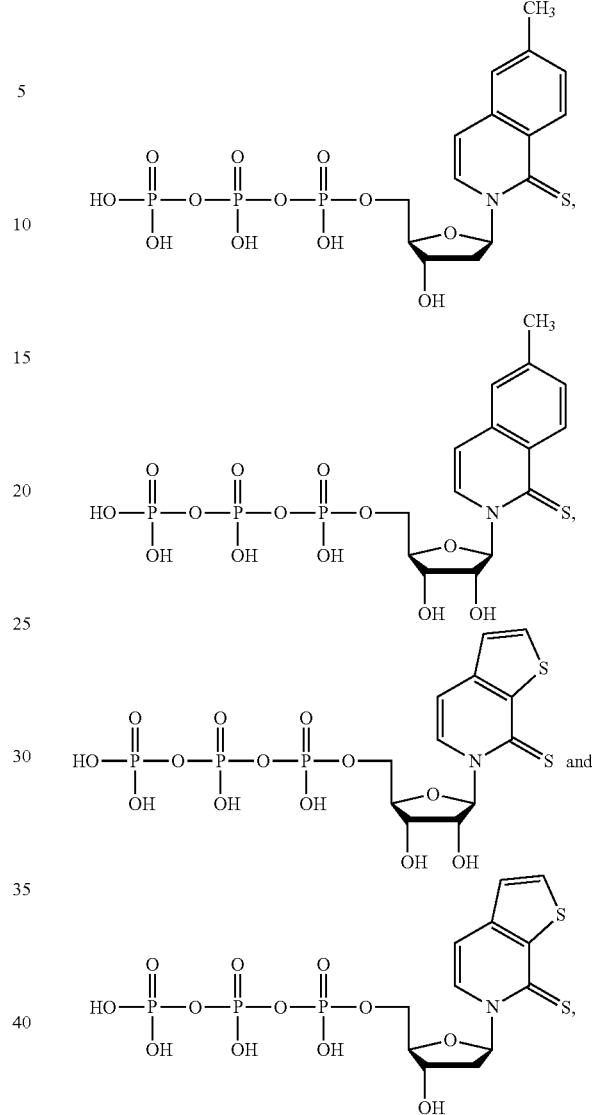

or salts thereof.

In some embodiments, the unnatural amino acid is incorporated into the IL-10 polypeptide by a synthetic codon/anticodon pair comprising those listed below:

| Codon (mRNA) | Anticodon (tRNA) |
|---|---|
| UUX | YAA or XAA |
| UGX | YCA or XCA |
| CGX | YCG or XCG |
| AGX | YCU or XCU |
| GAX | YUC or XUC |
| CAX | YUG or XUG |
| GXU | AYC |
| CXU | AYG |
| GXG | CYC |
| AXG | CYU |
| GXC | GYC |
| AXC | GYU |
| GXA | UYC |
| CXC | GYG |
| UXC | GYA |
| AUX | YAU or XAU |
| CUX | XAG or YAG |

-continued

| Codon (mRNA) | Anticodon (tRNA) |
|---|---|
| GUX | XAC or YAC |
| UAX | XUA or YUA |
| GGX | XCC or YCC | wherein X and Y comprise an unnatural base as disclosed herein. For example, X may be a nucleotide derived from

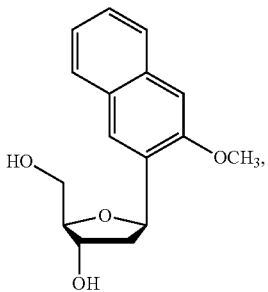

and Y may be a nucleotide derived from

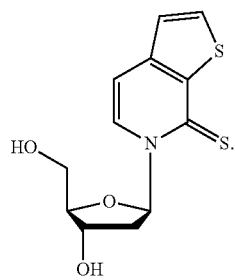

In some embodiments, an unnatural base pair generate an unnatural amino acid described in Dumas et al., "Designing logical codon reassignment—Expanding the chemistry in biology," *Chemical Science*, 6: 50-69 (2015).

The host cell into which the constructs or vectors disclosed herein are introduced is cultured or maintained in a suitable medium such that the tRNA, the tRNA synthetase and the protein of interest are produced. The medium also comprises the unnatural amino acid(s) such that the protein of interest incorporates the unnatural amino acid(s).

The orthogonal tRNA synthetase/tRNA pair charges a tRNA with an unnatural amino acid and incorporates the unnatural amino acid into the polypeptide chain in response to the codon. Exemplary aaRS-tRNA pairs include, but are not limited to, *Methanococcus jannaschii* (Mj-Tyr) aaRS/tRNA pairs, *E. coli* TyrRS (Ec-Tyr)/*B. stearothermophilus* tRNA$_{CUA}$ pairs, *E. coli* LeuRS (Ec-Leu)/*B. stearothermophilus* tRNA$_{CUA}$ pairs, and pyrrolysyl-tRNA pairs.

An IL-10 polypeptide comprising an unnatural amino acid(s) are prepared by introducing the nucleic acid constructs described herein comprising the tRNA and tRNA synthetase and comprising a nucleic acid sequence of interest with one or more in-frame orthogonal (stop) codons into a host cell. The host cell is exposed to a physiological solution comprising the unnatural amino acid(s), and the host cells are then maintained under conditions which permit expression of the protein of interest's encoding sequence. The unnatural amino acid(s) is incorporated into the polypeptide chain in response to the codon. For example, one or more unnatural amino acids are incorporated into the IL-10 polypeptide. Alternatively, two or more unnatural amino acids may be incorporated into the IL-10 polypeptide at two or more sites in the protein.

When multiple unnatural amino acids are to be incorporated into an IL-10 polypeptide, it will be understood that multiple codons will need to be incorporated into the encoding nucleic acid sequence at the desired positions such that the tRNA synthetase/tRNA pairs can direct the incorporation of the unnatural amino acids in response to the codon(s). At least 1, 2, 3, 4, or more codon encoding nucleic acids may be incorporated into the nucleic acid sequence of interest.

When it is desired to incorporate more than one type of unnatural amino acid into the protein of interest into a single protein, a second or further orthogonal tRNA-tRNA synthetase pair may be used to incorporate the second or further unnatural amino acid; suitably said second or further orthogonal tRNA-tRNA synthetase pair recognizes a different codon in the nucleic acid encoding the protein of interest so that the two or more unnatural amino acids can be specifically incorporated into different defined sites in the protein in a single manufacturing step. In certain embodiments, two or more orthogonal tRNA-tRNA synthetase pairs may therefore be used.

Once the IL-10 polypeptide incorporating the unnatural amino acid(s) has been produced in the host cell it can be extracted therefrom by a variety of techniques known in the art, including enzymatic, chemical and/or osmotic lysis and physical disruption. The IL-10 polypeptide can be purified by standard techniques known in the art such as preparative chromatography, affinity purification or any other suitable technique.

Suitable host cells may include bacterial cells (e.g., *E. coli*), but most suitably host cells are eukaryotic cells, for example insect cells (e.g. *Drosophila* such as *Drosophila melanogaster*), yeast cells, nematodes (e.g. *Caenorhabditis elegans*), mice (e.g. *Mus musculus*), or mammalian cells (such as Chinese hamster ovary cells (CHO) or COS cells, human 293T cells, HeLa cells, NIH 3T3 cells, and mouse erythroleukemia (MEL) cells) or human cells or other eukaryotic cells. Other suitable host cells are known to those skilled in the art. Suitably, the host cell is a mammalian cell—such as a human cell or an insect cell.

Suitable host cells may include bacterial cells (e.g., *E. coli*, BL21(DE3)), but most suitably host cells are eukaryotic cells, for example insect cells (e.g. *Drosophila* such as *Drosophila melanogaster*), yeast cells, nematodes (e.g. *C. elegans*), mice (e.g. *Mus musculus*), or mammalian cells (such as Chinese hamster ovary cells (CHO) or COS cells, human 293T cells, HeLa cells, NIH 3T3 cells, and mouse erythroleukemia (MEL) cells) or human cells or other eukaryotic cells. Other suitable host cells are known to those skilled in the art. Suitably, the host cell is a mammalian cell—such as a human cell or an insect cell. In some embodiments, the suitable host cells comprise *E. coli*.

Other suitable host cells which may be used generally in the embodiments of the invention are those mentioned in the examples section. Vector DNA can be introduced into host cells via conventional transformation or transfection techniques. As used herein, the terms "transformation" and "transfection" are intended to refer to a variety of well-recognized techniques for introducing a foreign nucleic acid molecule (e.g., DNA) into a host cell, including calcium phosphate or calcium chloride co-precipitation, DEAE-dextran-mediated transfection, lipofection, or electroporation. Suitable methods for transforming or transfecting host cells are well known in the art.

When creating cell lines, it is generally preferred that stable cell lines are prepared. For stable transfection of mammalian cells for example, it is known that, depending upon the expression vector and transfection technique used, only a small fraction of cells may integrate the foreign DNA into their genome. In order to identify and select these integrants, a gene that encodes a selectable marker (for example, for resistance to antibiotics) is generally introduced into the host cells along with the gene of interest. Preferred selectable markers include those that confer resistance to drugs, such as G418, hygromycin, or methotrexate. Nucleic acid molecules encoding a selectable marker can be introduced into a host cell on the same vector or can be introduced on a separate vector. Cells stably transfected with the introduced nucleic acid molecule can be identified by drug selection (for example, cells that have incorporated the selectable marker gene will survive, while the other cells die).

In one embodiment, the constructs described herein are integrated into the genome of the host cell. An advantage of stable integration is that the uniformity between individual cells or clones is achieved. Another advantage is that selection of the best producers may be carried out. Accordingly, it is desirable to create stable cell lines. In another embodiment, the constructs described herein are transfected into a host cell. An advantage of transfecting the constructs into the host cell is that protein yields may be maximized. In one aspect, there is described a cell comprising the nucleic acid construct or the vector described herein.

Pharmaceutical Compositions and Formulations

In some embodiments, the pharmaceutical composition and formulations described herein are administered to a subject by multiple administration routes, including but not limited to, parenteral, oral, or transdermal administration routes. In some cases, parenteral administration comprises intravenous, subcutaneous, intramuscular, intracerebral, intranasal, intra-arterial, intra-articular, intradermal, intravitreal, intraosseous infusion, intraperitoneal, or intrathecal administration. In some instances, the pharmaceutical composition is formulated for local administration. In other instances, the pharmaceutical composition is formulated for systemic administration.

In some embodiments, the pharmaceutical formulations include, but are not limited to, aqueous liquid dispersions, self-emulsifying dispersions, liposomal dispersions, aerosols, immediate release formulations, controlled release formulations, delayed release formulations, extended release formulations, pulsatile release formulations, and mixed immediate and controlled release formulations.

In some embodiments, the pharmaceutical formulations include a carrier or carrier materials selected on the basis of compatibility with the composition disclosed herein, and the release profile properties of the desired dosage form. See, e.g., *Remington: The Science and Practice of Pharmacy*, Nineteenth Ed (Easton, Pa.: Mack Publishing Company, 1995), Hoover, John E., *Remington's Pharmaceutical Sciences*, Mack Publishing Co., Easton, Pennsylvania 1975, Liberman, H. A. and Lachman, L., Eds., *Pharmaceutical Dosage Forms*, Marcel Decker, New York, N.Y., 1980, and *Pharmaceutical Dosage Forms and Drug Delivery Systems*, Seventh Ed. (Lippincott Williams & Wilkins 1999).

In some cases, the pharmaceutical composition is formulated as an immunoliposome, which comprises a plurality of IL-10 conjugates bound either directly or indirectly to lipid bilayer of liposomes. Exemplary lipids include, but are not limited to, fatty acids; phospholipids; sterols such as cholesterols; sphingolipids such as sphingomyelin; glycosphingolipids such as gangliosides, globosides, and cerebrosides; surfactant amines such as stearyl, oleyl, and linoleyl amines. In some instances, the lipid comprises a cationic lipid. In some instances, the lipid comprises a phospholipid. Exemplary phospholipids include, but are not limited to, phosphatidic acid ("PA"), phosphatidylcholine ("PC"), phosphatidylglycerol ("PG"), phophatidylethanolamine ("PE"), phophatidylinositol ("PI"), and phosphatidylserine ("PS"), sphingomyelin (including brain sphingomyelin), lecithin, lysolecithin, lysophosphatidylethanolamine, cerebrosides, diarachidoylphosphatidylcholine ("DAPC"), didecanoyl-L-alpha-phosphatidylcholine ("DDPC"), dielaidoylphosphatidylcholine ("DEPC"), dilauroylphosphatidylcholine ("DLPC"), dilinoleoylphosphatidylcholine, dimyristoylphosphatidylcholine ("DMPC"), dioleoylphosphatidylcholine ("DOPC"), dipalmitoylphosphatidylcholine ("DPPC"), distearoylphosphatidylcholine ("DSPC"), 1-palmitoyl-2-oleoyl-phosphatidylcholine ("POPC"), diarachidoylphosphatidylglycerol ("DAPG"), didecanoyl-L-alpha-phosphatidylglycerol ("DDPG"), dielaidoylphosphatidylglycerol ("DEPG"), dilauroylphosphatidylglycerol ("DLPG"), dilinoleoylphosphatidylglycerol, dimyristoylphosphatidylglycerol ("DMPG"), dioleoylphosphatidylglycerol ("DOPG"), dipalmitoylphosphatidylglycerol ("DPPG"), distearoylphosphatidylglycerol ("DSPG"), 1-palmitoyl-2-oleoyl-phosphatidylglycerol ("POPG"), diarachidoylphosphatidylethanolamine ("DAPE"), didecanoyl-L-alpha-phosphatidylethanolamine ("DDPE"), dielaidoylphosphatidylethanolamine ("DEPE"), dilauroylphosphatidylethanolamine ("DLPE"), dilinoleoylphosphatidylethanolamine, dimyristoylphosphatidylethanolamine ("DMPE"), dioleoylphosphatidylethanolamine ("DOPE"), dipalmitoylphosphatidylethanolamine ("DPPE"), distearoylphosphatidylethanolamine ("DSPE"), 1-palmitoyl-2-oleoyl-phosphatidylethanolamine ("POPE"), diarachidoylphosphatidylinositol ("DAPI"), didecanoyl-L-alpha-phosphatidylinositol ("DDPI"), dielaidoylphosphatidylinositol ("DEPI"), dilauroylphosphatidylinositol ("DLPI"), dilinoleoylphosphatidylinositol, dimyristoylphosphatidylinositol ("DMPI"), dioleoylphosphatidylinositol ("DOPI"), dipalmitoylphosphatidylinositol ("DPPI"), distearoylphosphatidylinositol ("DSPI"), 1-palmitoyl-2-oleoyl-phosphatidylinositol ("POPI"), diarachidoylphosphatidylserine ("DAPS"), didecanoyl-L-alpha-phosphatidylserine ("DDPS"), dielaidoylphosphatidylserine ("DEPS"), dilauroylphosphatidylserine ("DLPS"), dilinoleoylphosphatidylserine, dimyristoylphosphatidylserine ("DMPS"), dioleoylphosphatidylserine ("DOPS"), dipalmitoylphosphatidylserine ("DPPS"), distearoylphosphatidylserine ("DSPS"), 1-palmitoyl-2-oleoyl-phosphatidylserine ("POPS"), diarachidoyl sphingomyelin, didecanoyl sphingomyelin, dielaidoyl sphingomyelin, dilauroyl sphingomyelin, dilinoleoyl sphingomyelin, dimyristoyl sphingomyelin, sphingomyelin, dioleoyl sphingomyelin, dipalmitoyl sphingomyelin, distearoyl sphingomyelin, and 1-palmitoyl-2-oleoyl-sphingomyelin.

In some instances, the pharmaceutical formulations further include pH adjusting agents or buffering agents which include acids such as acetic, boric, citric, lactic, phosphoric and hydrochloric acids, bases such as sodium hydroxide, sodium phosphate, sodium borate, sodium citrate, sodium acetate, sodium lactate and tris-hydroxymethylaminomethane, and buffers such as citrate/dextrose, sodium bicarbonate and ammonium chloride. Such acids, bases and buffers are included in an amount required to maintain pH of the composition in an acceptable range.

In some instances, the pharmaceutical formulation includes one or more salts in an amount required to bring osmolality of the composition into an acceptable range. Such salts include those having sodium, potassium or ammonium cations and chloride, citrate, ascorbate, borate, phosphate, bicarbonate, sulfate, thiosulfate or bisulfite anions, suitable salts include sodium chloride, potassium chloride, sodium thiosulfate, sodium bisulfite and ammonium sulfate.

In some embodiments, the pharmaceutical formulations include, but are not limited to, sugars like trehalose, sucrose, mannitol, sorbitol, maltose, glucose, or salts like potassium phosphate, sodium citrate, ammonium sulfate and/or other agents such as heparin to increase the solubility and in vivo stability of polypeptides.

In some instances, the pharmaceutical formulations further include diluent which are used to stabilize compounds because they can provide a more stable environment. Salts dissolved in buffered solutions (which also can provide pH control or maintenance) are utilized as diluents in the art, including, but not limited to a phosphate buffered saline solution.

Stabilizers include compounds such as any antioxidation agents, buffers, acids, preservatives and the like. Exemplary stabilizers include L-arginine hydrochloride, tromethamine, albumin (human), citric acid, benzyl alcohol, phenol, disodium biphosphate dehydrate, propylene glycol, metacresol or m-cresol, zinc acetate, polysorbate-20 or Tween® 20, or trometamol.

Surfactants include compounds such as sodium lauryl sulfate, sodium docusate, Tween 60 or 80, triacetin, vitamin E TPGS, sorbitan monooleate, polyoxyethylene sorbitan monooleate, polysorbates, polaxomers, bile salts, glyceryl monostearate, copolymers of ethylene oxide and propylene oxide, e.g., Pluronic® (BASF), and the like. Additional surfactants include polyoxyethylene fatty acid glycerides and vegetable oils, e.g., polyoxyethylene (60) hydrogenated castor oil, and polyoxyethylene alkylethers and alkylphenyl ethers, e.g., octoxynol 10, octoxynol 40. Sometimes, surfactants is included to enhance physical stability or for other purposes.

Therapeutic Regimens

In some embodiments, the pharmaceutical compositions described herein are administered for therapeutic applications. In some embodiments, the pharmaceutical composition is administered daily, every day, every alternate day, five days a week, once a week, every other week, two weeks per month, three weeks per month, once a month, twice a month, three times per month, or more. The pharmaceutical composition is administered for at least 1 month, 2 months, 3 months, 4 months, 5 months, 6 months, 7 months, 8 months, 9 months, 10 months, 11 months, 12 months, 18 months, 2 years, 3 years, or more.

In the case wherein the patient's status does improve, upon the doctor's discretion the administration of the composition is given continuously, alternatively, the dose of the composition being administered is temporarily reduced or temporarily suspended for a certain length of time (i.e., a "drug holiday"). In some instances, the length of the drug holiday varies between 2 days and 1 year, including by way of example only, 2 days, 3 days, 4 days, 5 days, 6 days, 7 days, 10 days, 12 days, 15 days, 20 days, 28 days, 35 days, 50 days, 70 days, 100 days, 120 days, 150 days, 180 days, 200 days, 250 days, 280 days, 300 days, 320 days, 350 days, or 365 days. The dose reduction during a drug holiday is from 10%-100%, including, by way of example only, 10%, 15%, 20%, 25%, 30%, 35%, 40%, 45%, 50%, 55%, 60%, 65%, 70%, 75%, 80%, 85%, 90%, 95%, or 100%.

Once improvement of the patient's conditions has occurred, a maintenance dose is administered if necessary. Subsequently, the dosage or the frequency of administration, or both, can be reduced, as a function of the symptoms, to a level at which the improved disease, disorder or condition is retained.

In some embodiments, the amount of a given agent that correspond to such an amount varies depending upon factors such as the particular compound, the severity of the disease, the identity (e.g., weight) of the subject or host in need of treatment, but nevertheless is routinely determined in a manner known in the art according to the particular circumstances surrounding the case, including, e.g., the specific agent being administered, the route of administration, and the subject or host being treated. In some instances, the desired dose is conveniently presented in a single dose or as divided doses administered simultaneously (or over a short period of time) or at appropriate intervals, for example as two, three, four or more sub-doses per day.

The foregoing ranges are merely suggestive, as the number of variables in regard to an individual treatment regime is large, and considerable excursions from these recommended values are not uncommon. Such dosages are altered depending on a number of variables, not limited to the activity of the compound used, the disease or condition to be treated, the mode of administration, the requirements of the individual subject, the severity of the disease or condition being treated, and the judgment of the practitioner.

In some embodiments, toxicity and therapeutic efficacy of such therapeutic regimens are determined by standard pharmaceutical procedures in cell cultures or experimental animals, including, but not limited to, the determination of the LD50 (the dose lethal to 50% of the population) and the ED50 (the dose therapeutically effective in 50% of the population). The dose ratio between the toxic and therapeutic effects is the therapeutic index and it is expressed as the ratio between LD50 and ED50. Compounds exhibiting high therapeutic indices are preferred. The data obtained from cell culture assays and animal studies are used in formulating a range of dosage for use in human. The dosage of such compounds lies preferably within a range of circulating concentrations that include the ED50 with minimal toxicity. The dosage varies within this range depending upon the dosage form employed and the route of administration utilized.

Kits/Article of Manufacture

Disclosed herein, in certain embodiments, are kits and articles of manufacture for use with one or more methods and compositions described herein. Such kits include a carrier, package, or container that is compartmentalized to receive one or more containers such as vials, tubes, and the like, each of the container(s) comprising one of the separate elements to be used in a method described herein. Suitable containers include, for example, bottles, vials, syringes, and test tubes. In one embodiment, the containers are formed from a variety of materials such as glass or plastic.

The articles of manufacture provided herein contain packaging materials. Examples of pharmaceutical packaging materials include, but are not limited to, blister packs, bottles, tubes, bags, containers, bottles, and any packaging material suitable for a selected formulation and intended mode of administration and treatment.

For example, the container(s) include one or more IL-10 polypeptides or conjugates disclosed herein, and optionally one or more pharmaceutical excipients described herein to facilitate the delivery of the IL-10 polypeptides or conjugates. Such kits further optionally include an identifying description or label or instructions relating to its use in the methods described herein.

A kit typically includes labels listing contents and/or instructions for use, and package inserts with instructions for use. A set of instructions will also typically be included.

In one embodiment, a label is on or associated with the container. In one embodiment, a label is on a container when letters, numbers or other characters forming the label are attached, molded or etched into the container itself, a label is associated with a container when it is present within a receptacle or carrier that also holds the container, e.g., as a package insert. In one embodiment, a label is used to indicate that the contents are to be used for a specific therapeutic application. The label also indicates directions for use of the contents, such as in the methods described herein.

In certain embodiments, the pharmaceutical compositions are presented in a pack or dispenser device which contains one or more unit dosage forms containing a compound provided herein. The pack, for example, contains metal or plastic foil, such as a blister pack. In one embodiment, the pack or dispenser device is accompanied by instructions for administration. In one embodiment, the pack or dispenser is also accompanied with a notice associated with the container in form prescribed by a governmental agency regulating the manufacture, use, or sale of pharmaceuticals, which notice is reflective of approval by the agency of the form of the drug for human or veterinary administration. Such notice, for example, is the labeling approved by the U.S. Food and Drug Administration for drugs, or the approved product insert. In one embodiment, compositions containing a compound provided herein formulated in a compatible pharmaceutical carrier are also prepared, placed in an appropriate container, and labeled for treatment of an indicated condition.

Certain Terminologies

Unless defined otherwise, all technical and scientific terms used herein have the same meaning as is commonly understood by one of skill in the art to which the claimed subject matter belongs. It is to be understood that the detailed description are exemplary and explanatory only and are not restrictive of any subject matter claimed. In this application, the use of the singular includes the plural unless specifically stated otherwise. It must be noted that, as used in the specification, the singular forms "a," "an" and "the" include plural referents unless the context clearly dictates otherwise. In this application, the use of "or" means "and/or" unless stated otherwise. Furthermore, use of the term "including" as well as other forms, such as "include", "includes," and "included," is not limiting.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

As used herein, ranges and amounts can be expressed as "about" a particular value or range. About also includes the exact amount. Hence "about 5 µL" means "about 5 µL" and also "5 µL." Generally, the term "about" includes an amount that would be expected to be within experimental error, such as for example, within 15%, 10%, or 5%.

The section headings used herein are for organizational purposes only and are not to be construed as limiting the subject matter described.

As used herein, the terms "individual(s)", "subject(s)" and "patient(s)" mean any mammal. In some embodiments, the mammal is a human. In some embodiments, the mammal is a non-human. None of the terms require or are limited to situations characterized by the supervision (e.g. constant or intermittent) of a health care worker (e.g. a doctor, a registered nurse, a nurse practitioner, a physician's assistant, an orderly or a hospice worker).

As used herein, the terms "significant" and "significantly" in reference to receptor binding means a change sufficient to impact binding of the IL-10 polypeptide to a target receptor. In some instances, the term refers to a change of at least 10%, 20%, 30%, 40%, 50%, 60%, 70%, 80%, 90%, 95%, or more. In some instances, the term means a change of at least 2-fold, 3-fold, 4-fold, 5-fold, 6-fold, 7-fold, 8-fold, 9-fold, 10-fold, 50-fold, 100-fold, 500-fold, 1000-fold, or more.

In some instances, the term "substantially" in reference to dimerization means a change sufficient to prevent formation of an IL-10 dimer.

As used herein, the term "tumor infiltrating immune cell(s)" refers to immune cells that have infiltrated into a region comprising tumor cells (e.g., in a tumor microenvironment). In some instances, the tumor infiltrating immune cells are associated with tumor cell destruction, a decrease in tumor cell proliferation, a reduction in tumor burden, or combinations thereof. In some instances, the tumor infiltrating immune cells comprise tumor infiltration lymphocytes (TILs). In some instances, the tumor infiltrating immune cells comprise T cells, B cells, natural killer cells, macrophages, neutrophils, dendritic cells, mast cells, eosinophils or basophils. In some instances, the tumor infiltrating immune cells comprise CD4+ or CD8+ T cells.

EXAMPLES

These examples are provided for illustrative purposes only and not to limit the scope of the claims provided herein.

Example 1

Biochemical Interactions of PEGylated IL-10 with Human IL-10 Receptor

The kinetic and equilibrium dissociation constants of PEGylated IL-10 compound interaction with human IL-10 receptor are measured using Surface Plasmon Resonance (SPR) at Biosensor Tools LLC. For these studies, human IgG1 Fc-fused IL-10R extracellular domain is captured on the surface of a Protein A-coated CM4 biosensor chip. The surface is probed in duplicate, with two=fold dilution series starting at 2 µM of either native IL-10 or IL-10 muteins using a Biacore 2000 or similar SPR instrument. Test samples are injected for 60 s or more to allow measurement of association until a plateau is reached, followed by buffer only (wash) for 30 s or more to measure dissociation. Response units (RU, Y-axis) are plotted versus time (s, X-axis).

Ex-Vivo Immune Response Profiling of an IL-10 Mutein in Primary Human Leukocyte Reduction System (LRS)-Derived PBMC Samples To determine how the differential receptor specificity of an IL-10 mutein affects activation of primary immune cell subpopulations, concentration-response profiling of lymphocyte activation in human LRS-derived peripheral blood mononuclear cell (PBMC) samples is performed using multi-color flow cytometry. These studies are performed at PrimityBio LLC (Fremont, CA). Fresh LRS-derived samples are treated with either native IL-10 or an IL-10 mutein in 5-fold dilution series starting with a top concentration of 30 μg/mL. After a 45 min incubation, samples are fixed and stained with antibodies to detect the phosphorylated form of the transcription factor STAT3 (pSTAT3), a marker of upstream engagement and activation of IL-10 receptor signaling complexes, and a panel of surface markers (Table 1) to follow pSTAT3 formation in specific T cell and natural killer (NK) cell subpopulations.

TABLE 1

Staining panel for flow cytometry study of LRS-derived PBMC samples

| Cell type | marker profile |
|---|---|
| Effector T cells (Teff) | CD3, CD4+, CD8+, CD127+ |
| NK cells | CD3−, CD16+ |
| Regulatory T cells (Treg) | CD3+, CD4+, CD8−, IL-2Rα+, CD127− |

Example 2

TABLE 2

IL-10 sequences described herein.

| Name | Sequence | SEQ ID NO: |
|---|---|---|
| IL-10 (homo sapiens) (mature form) | SPGQGTQSENSCTHFPGNLPNMLRDLRDAF SRVKTFFQMKDQLDNLLLKESLLEDFKGYL GCQALSEMIQFYLEEVMPQAENQDPDIKAH VNSLGENLKTLRLRLRRCHRFLPCENKSKA VEQVKNAFNKLQEKGIYKAMSEFDIFINYI EAYMTMKIRN | 1 |
| IL-10 (homo sapiens) (precursor) NCBI Accession No.: NP_000563.1 | MHSSALLCCLVLLTGVRASPGQGTQSENSC THFPGNLPNMLRDLRDAFSRVKTFFQMKDQ LDNLLLKESLLEDFKGYLGCQALSEMIQFY LEEVMPQAENQDPDIKAHVNSLGENLKTLR LRLRRCHRFLPCENKSKAVEQVKNAFNKLQ EKGIYKAMSEFDIFINYIEAYMTMKIRN | 2 |

While preferred embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. It is intended that the following claims define the scope of the disclosure and that methods and structures within the scope of these claims and their equivalents be covered thereby.

What is claimed is:

1. A modified interleukin 10 (IL-10) polypeptide comprising (i) an IL-10 polypeptide comprising at least one unnatural amino acid, and (ii) at least one conjugating moiety covalently attached to the at least one unnatural amino acid, wherein the IL-10 polypeptide comprises an amino acid sequence that is 99% identical to amino acids 33 to 158 of SEQ ID NO: 1, wherein the at least one unnatural amino acid is an azide-containing lysine derivative, and wherein the at least one unnatural amino acid is located at a position selected from N82, K99, K125, N129, and K130 as set forth in SEQ ID NO: 1.

2. The modified IL-10 polypeptide of claim 1, wherein the IL-10 polypeptide comprises an amino acid sequence that is at least 95% identical to amino acids 1 to 160 of SEQ ID NO: 1.

3. The modified IL-10 polypeptide of claim 1, wherein the IL-10 polypeptide comprises an amino acid sequence that is at least 97% identical to amino acids 1 to 160 of SEQ ID NO: 1.

4. The modified IL-10 polypeptide of claim 1, wherein the IL-10 polypeptide comprises an amino acid sequence that is at least 98% identical to amino acids 1 to 160 of SEQ ID NO: 1.

5. The modified IL-10 polypeptide of claim 1, wherein the IL-10 polypeptide sequence comprises 13 lysine amino acid residues.

6. The modified IL-10 polypeptide of claim 1, wherein the azide-containing lysine derivative is N6-((2-azidoethoxy)-carbonyl)-L-lysine (AzK).

7. The modified IL-10 polypeptide of claim 1, wherein the at least one conjugating moiety comprises a water-soluble polymer, a lipid, a protein, or a peptide.

8. The modified IL-10 polypeptide of claim 7, wherein the at least one conjugating moiety comprises a water-soluble polymer, and the water-soluble polymer comprises polyethylene glycol (PEG).

9. The modified IL-10 polypeptide of claim 1, wherein the IL-10 polypeptide is isolated and purified.

10. A pharmaceutical composition comprising the modified IL-10 polypeptide of claim 1 and a pharmaceutically acceptable excipient.

11. The pharmaceutical composition of claim 10, wherein the pharmaceutical composition is formulated for systemic delivery.

12. A modified IL-10 homodimer comprising two of the modified IL-10 polypeptides of claim 1.

13. A composition comprising the modified IL-10 homodimer of claim 12 bound to an IL-10 receptor (IL-10R).

14. The modified IL-10 polypeptide of claim 1, wherein the IL-10 polypeptide sequence comprises the amino acid sequence of SEQ ID NO: 1 in which one amino acid is modified to the at least one unnatural amino acid covalently attached to the at least one conjugating moiety.

15. The modified IL-10 polypeptide of claim 8, wherein the PEG has a molecular weight from about 10 kDa to about 85 kDa.

16. The modified IL-10 polypeptide of claim 15, wherein the PEG has a molecular weight of about 20 kDa.

17. The modified IL-10 polypeptide of claim 1, wherein the IL-10 polypeptide sequence comprises an N-terminal deletion.

18. The modified IL-10 polypeptide of claim 17, wherein the N-terminal deletion comprises a deletion of the first 1, 2, 3, 4, 5, 6, 7, 8, 9, 10, 11, 12, 13, 14, 15, 20, 25, or 30 residues from the N-terminus, wherein the residue positions correspond to the positions as set forth in SEQ ID NO: 1.

* * * * *

SEQUENCE LISTING

```
<160> NUMBER OF SEQ ID NOS: 5

<210> SEQ ID NO 1
<211> LENGTH: 160
<212> TYPE: PRT
<213> ORGANISM: Homo sapiens

<400> SEQUENCE: 1

Ser Pro Gly Gln Gly Thr Gln Ser Glu Asn Ser Cys Thr His Phe Pro
1               5                   10                  15

Gly Asn Leu Pro Asn Met Leu Arg Asp Leu Arg Asp Ala Phe Ser Arg
            20                  25                  30

Val Lys Thr Phe Phe Gln Met Lys Asp Gln Leu Asp Asn Leu Leu Leu
        35                  40                  45

Lys Glu Ser Leu Leu Glu Asp Phe Lys Gly Tyr Leu Gly Cys Gln Ala
    50                  55                  60

Leu Ser Glu Met Ile Gln Phe Tyr Leu Glu Glu Val Met Pro Gln Ala
65                  70                  75                  80

Glu Asn Gln Asp Pro Asp Ile Lys Ala His Val Asn Ser Leu Gly Glu
                85                  90                  95

Asn Leu Lys Thr Leu Arg Leu Arg Leu Arg Arg Cys His Arg Phe Leu
            100                 105                 110

Pro Cys Glu Asn Lys Ser Lys Ala Val Glu Gln Val Lys Asn Ala Phe
        115                 120                 125

Asn Lys Leu Gln Glu Lys Gly Ile Tyr Lys Ala Met Ser Glu Phe Asp
    130                 135                 140
```

```
Ile Phe Ile Asn Tyr Ile Glu Ala Tyr Met Thr Met Lys Ile Arg Asn
145                 150                 155                 160
```

<210> SEQ ID NO 2
<211> LENGTH: 178
<212> TYPE: PRT
<213> ORGANISM: Homo sapiens

<400> SEQUENCE: 2

```
Met His Ser Ser Ala Leu Leu Cys Cys Leu Val Leu Leu Thr Gly Val
1               5                   10                  15

Arg Ala Ser Pro Gly Gln Gly Thr Gln Ser Glu Asn Ser Cys Thr His
                20                  25                  30

Phe Pro Gly Asn Leu Pro Asn Met Leu Arg Asp Leu Arg Asp Ala Phe
            35                  40                  45

Ser Arg Val Lys Thr Phe Phe Gln Met Lys Asp Gln Leu Asp Asn Leu
    50                  55                  60

Leu Leu Lys Glu Ser Leu Leu Glu Asp Phe Lys Gly Tyr Leu Gly Cys
65                  70                  75                  80

Gln Ala Leu Ser Glu Met Ile Gln Phe Tyr Leu Glu Glu Val Met Pro
                85                  90                  95

Gln Ala Glu Asn Gln Asp Pro Asp Ile Lys Ala His Val Asn Ser Leu
            100                 105                 110

Gly Glu Asn Leu Lys Thr Leu Arg Leu Arg Leu Arg Arg Cys His Arg
        115                 120                 125

Phe Leu Pro Cys Glu Asn Lys Ser Lys Ala Val Glu Gln Val Lys Asn
    130                 135                 140

Ala Phe Asn Lys Leu Gln Glu Lys Gly Ile Tyr Lys Ala Met Ser Glu
145                 150                 155                 160

Phe Asp Ile Phe Ile Asn Tyr Ile Glu Ala Tyr Met Thr Met Lys Ile
                165                 170                 175

Arg Asn
```

<210> SEQ ID NO 3
<211> LENGTH: 5
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 3

```
Gly Gly Gly Gly Ser
1               5
```

<210> SEQ ID NO 4
<211> LENGTH: 5
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MOD_RES
<222> LOCATION: (4)..(4)
<223> OTHER INFORMATION: Any amino acid except proline

<400> SEQUENCE: 4

```
Val Pro Gly Xaa Gly
1               5
```

```
<210> SEQ ID NO 5
<211> LENGTH: 30
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 5

Phe Gln Ser Ser Ser Ser Lys Ala Pro Pro Pro Ser Leu Pro Ser Pro
1               5                   10                  15

Ser Arg Leu Pro Gly Pro Ser Asp Thr Pro Ile Leu Pro Gln
            20                  25                  30
```